US010626768B2

(12) United States Patent
Tanaka

(10) Patent No.: US 10,626,768 B2
(45) Date of Patent: Apr. 21, 2020

(54) EXHAUST PURIFICATION SYSTEM OF INTERNAL COMBUSTION ENGINE

(71) Applicant: TOYOTA JIDOSHA KABUSHIKI KAISHA, Toyota-shi, Aichi-ken (JP)

(72) Inventor: Takayoshi Tanaka, Shizuoka (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 205 days.

(21) Appl. No.: 15/866,779

(22) Filed: Jan. 10, 2018

(65) Prior Publication Data

US 2018/0258815 A1    Sep. 13, 2018

(30) Foreign Application Priority Data

Mar. 10, 2017  (JP) ................. 2017-045658

(51) Int. Cl.

| F01N 3/10 | (2006.01) |
|---|---|
| F01N 3/20 | (2006.01) |
| F01N 9/00 | (2006.01) |
| F01N 11/00 | (2006.01) |
| F02D 41/02 | (2006.01) |

(Continued)

(52) U.S. Cl.
CPC ........... *F01N 3/2073* (2013.01); *F01N 3/103* (2013.01); *F01N 9/00* (2013.01); *F01N 11/007* (2013.01);

(Continued)

(58) Field of Classification Search
CPC .......... F01N 3/2073; F01N 3/103; F01N 9/00; F01N 11/007; F01N 2560/025;

(Continued)

(56) References Cited

U.S. PATENT DOCUMENTS

| 7,416,572 B2 * | 8/2008 | Wakao ................ F02M 25/12 |
|---|---|---|
| | | 436/34 |
| 2009/0071420 A1 * | 3/2009 | Huber ................ C01B 3/34 |
| | | 123/3 |

(Continued)

FOREIGN PATENT DOCUMENTS

| DE | 10 2012 021 573 A1 | 5/2014 |
|---|---|---|
| DE | 10 2015 111 200 A1 | 1/2016 |

(Continued)

OTHER PUBLICATIONS

U.S. Appl. No. 15/635,756, filed Jun. 28, 2017.

*Primary Examiner* — Thai Ba Trieu
*Assistant Examiner* — Dapinder Singh
(74) *Attorney, Agent, or Firm* — Finnegan, Henderson, Farabow, Garrett & Dunner, LLP

(57) ABSTRACT

An exhaust purification system of an internal combustion engine provided with a heat and hydrogen generation device (50) and an exhaust purification catalyst (14) comprised of the three way catalyst. Heat and hydrogen generated in the heat and hydrogen generation device (50) is fed to the exhaust purification catalyst (14). When an air-fuel ratio of the air and fuel made to burn in the heat and hydrogen generation device (50) is made a predetermined target set air-fuel ratio, the air-fuel ratio of the exhaust gas discharged from the engine is controlled to the target adjusted air-fuel ratio required for making the air-fuel ratio of the gas flowing into the exhaust purification catalyst (14) the stoichiometric air-fuel ratio.

3 Claims, 24 Drawing Sheets

(51) Int. Cl.
*F02D 41/14* (2006.01)
*F02D 41/22* (2006.01)

(52) U.S. Cl.
CPC ....... *F02D 41/024* (2013.01); *F02D 41/1441* (2013.01); *F02D 41/1454* (2013.01); *F02D 41/1475* (2013.01); *F02D 41/22* (2013.01); *F01N 2240/30* (2013.01); *F01N 2430/06* (2013.01); *F01N 2560/025* (2013.01); *F01N 2610/04* (2013.01); *Y02T 10/47* (2013.01)

(58) Field of Classification Search
CPC ............. F01N 2240/30; F01N 2430/06; F01N 2610/04; F02D 41/024; F02D 41/1454; F02D 41/1441; F02D 41/1475; F02D 41/22; Y02T 10/47
USPC ........................... 60/274, 286, 295, 299–301
See application file for complete search history.

(56) References Cited

U.S. PATENT DOCUMENTS

| | | | |
|---|---|---|---|
| 2010/0275581 A1* | 11/2010 | Wada | B01D 53/9409 60/276 |
| 2010/0287917 A1* | 11/2010 | Wada | B01D 53/9409 60/299 |
| 2011/0137537 A1* | 6/2011 | Leone | F02D 41/0027 701/102 |
| 2015/0298061 A1* | 10/2015 | Irisawa | F01N 3/0842 422/169 |
| 2016/0025021 A1 | 1/2016 | Hilditch et al. | |

FOREIGN PATENT DOCUMENTS

| | | |
|---|---|---|
| EP | 2 233 711 A1 | 9/2010 |
| JP | 2010-270664 | 12/2010 |

* cited by examiner

FIG. 2

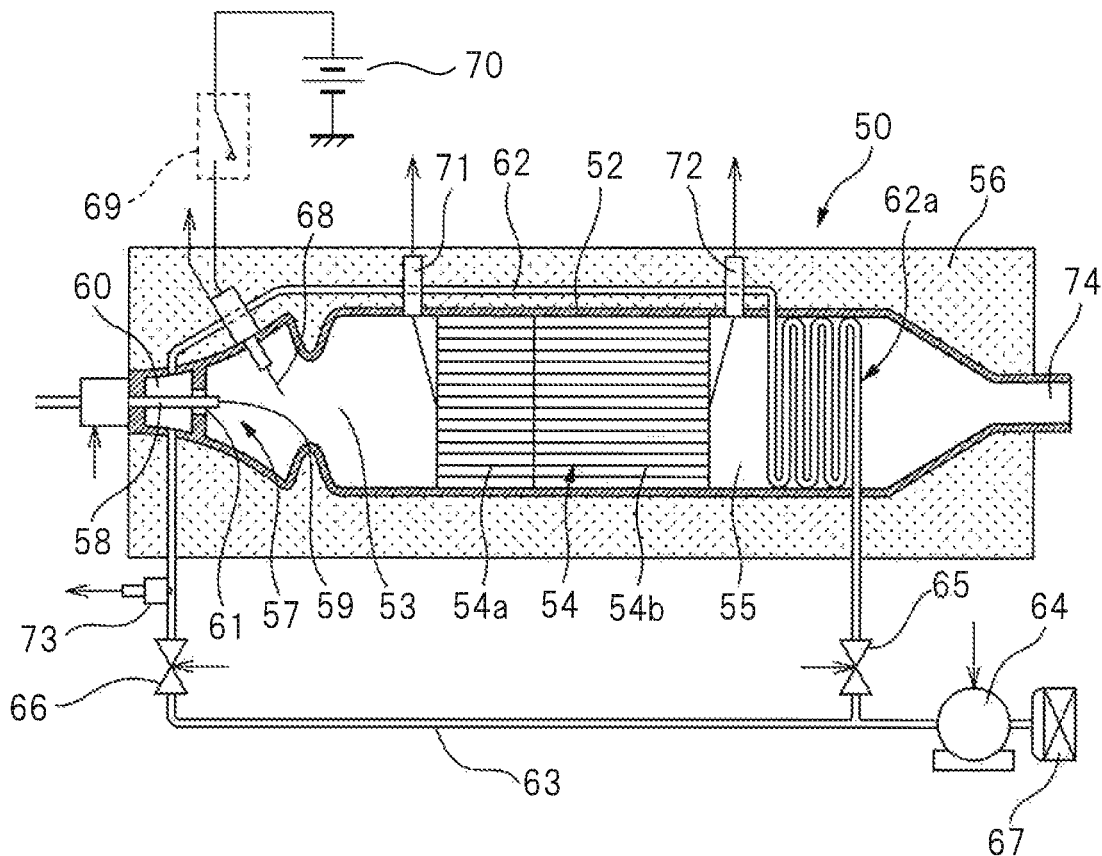

FIG. 3

REFORMING REACTION OF FUEL

LHV NOTATION (a) COMPLETE OXIDATION REACTION
$CH_{1.83} + 1.4575 O_2 \rightarrow CO_2 + 0.915 H_2O, \Delta H^0 = -600 kJ/mol\text{-}C$ (b) PARTIAL OXIDATION REFORMING REACTION
$CH_{1.83} + 0.5 O_2 \rightarrow CO + 0.915 H_2, \Delta H^0 = -86 kJ/mol\text{-}C$ (c) STEAM REFORMING REACTION
$CH_{1.83} + H_2O \rightarrow CO + 1.915 H_2, \Delta H^0 = +146 kJ/mol\text{-}C$ (d) WATER GAS SHIFT REACTION
$CO + H_2O \rightarrow CO_2 + H_2, \Delta H^0 = -41 kJ/mol\text{-}C$

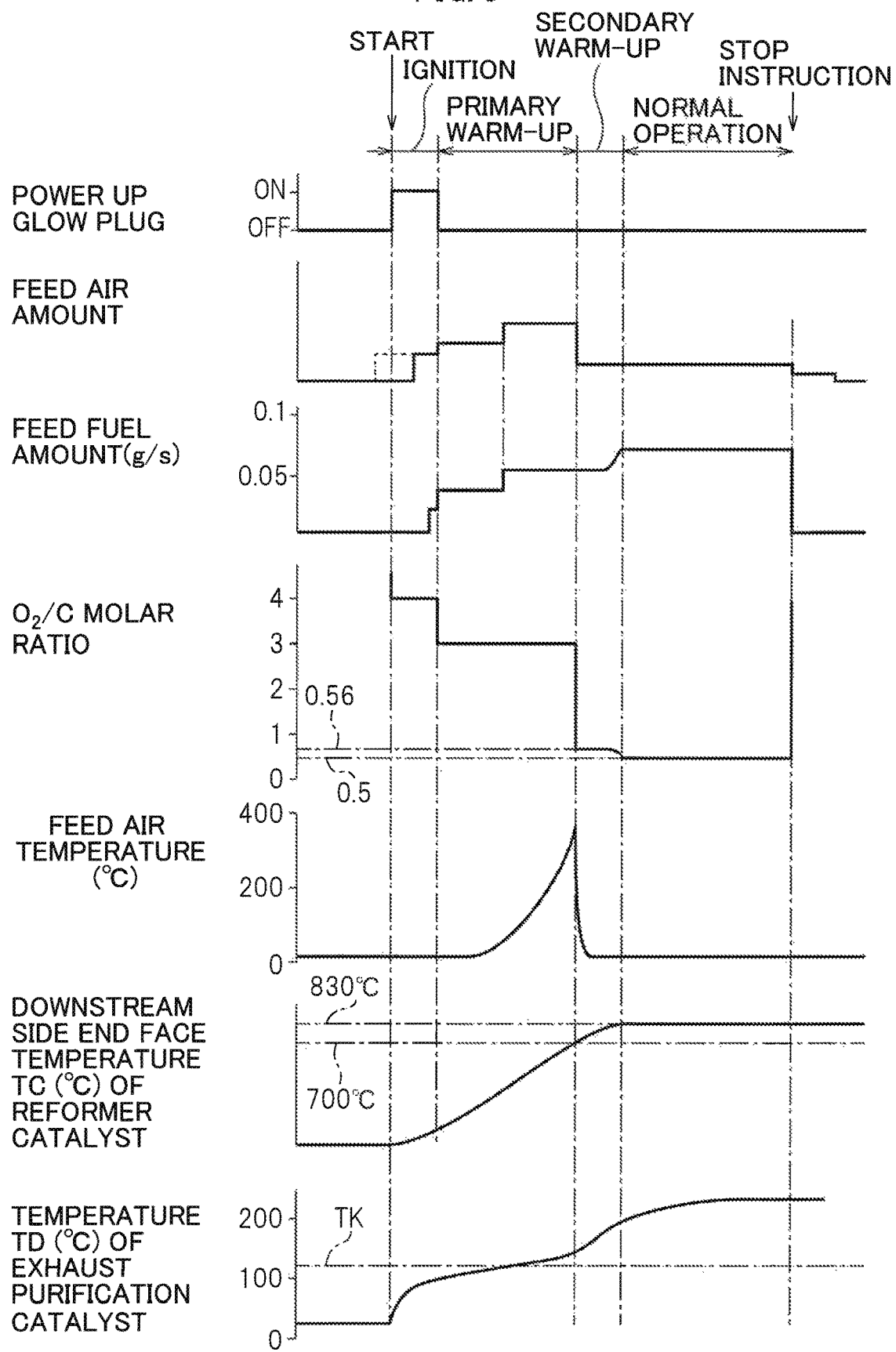

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine provided with an $NO_x$ purification catalyst arranged in an engine exhaust passage and a fuel reformer for generating reformed gas containing hydrogen. This $NO_x$ purification catalyst stores $NO_x$ contained in exhaust gas when an air-fuel ratio of the inflowing exhaust gas is lean, and releases stored $NO_x$ when the air-fuel ratio of the inflowing exhaust gas becomes rich. At the time of engine startup, the reformed gas containing hydrogen generated at the fuel reformer is fed to the $NO_x$ purification catalyst to thereby raise the $NO_x$ removal rate of the $NO_x$ purification catalyst (for example, see Japanese Patent Publication No. 2010-270664A).

SUMMARY OF INVENTION

Technical Problem

On the other hand, when arranging in an engine exhaust passage an exhaust purification catalyst able to simultaneously reduce the HC, CO, and $NO_x$ contained in exhaust gas when the air-fuel ratio of exhaust gas is the stoichiometric air-fuel ratio and feeding reformed gas to the exhaust purification catalyst, in order to simultaneously reduce the HC, CO, and $NO_x$ contained in the exhaust gas, it is necessary to control the air-fuel ratio determined by both the air-fuel ratio of the exhaust gas discharged from the engine and the air-fuel ratio of the reformed gas to the stoichiometric air-fuel ratio.

In this case, if the air-fuel ratio determined from both the air-fuel ratio of the exhaust gas and the air-fuel ratio of the reformed gas deviates from the stoichiometric air-fuel ratio, the HC, CO, and $NO_x$ contained in the exhaust gas can no longer be removed well. However, the above-mentioned Japanese Patent Publication does not suggest at, all air-fuel ratio control designed to be able to efficiently remove the HC, CO, and $NO_x$ contained in the exhaust gas when feeding reformed gas to the exhaust purification catalyst.

Solution to Problem.

According to the present invention, there is provided an exhaust purification system of an internal combustion engine comprising:

a heat and hydrogen generation device able to generate only heat or heat and hydrogen by burning fuel and air, an exhaust purification catalyst arranged in an engine exhaust passage and able to simultaneously reduce HC, CO, and $NO_x$ contained in gas flowing in when an air-fuel ratio of inflowing gas is a stoichiometric air-fuel ratio, a combustion gas discharged from the heat and hydrogen generation device being fed to the exhaust purification catalyst, and an electric control unit, wherein the electric control unit is configured to make an air-fuel ratio of the air and fuel made to burn in the heat and hydrogen generation device a predetermined target set air-fuel ratio, and the electric control unit is configured to control the air-fuel ratio of the exhaust gas discharged from the engine to a target adjusted air-fuel ratio required for making the air-fuel ratio of the gas flowing into the exhaust purification catalyst the stoichiometric air-fuel ratio in accordance with the target set air-fuel ratio when the air-fuel ratio of the air and fuel made to burn in the heat and hydrogen generation device is made the predetermined target set air-fuel ratio.

Advantageous Effects of Invention

Even if combustion gas discharged from the heat and hydrogen generation device is fed to the exhaust purification catalyst, the air-fuel ratio of the gas flowing into the exhaust purification catalyst is maintained at the stoichiometric air-fuel ratio. Therefore, it is possible to simultaneously reduce well the HC, CO, and $NO_x$ contained in the gas in the exhaust purification catalyst.

BRIEF DESCRIPTION OF DRAWINGS

FIG. 2 is an overall view of a heat and hydrogen generation device.

FIG. 3 is a view for explaining a reforming reaction of fuel.

FIG. 9 is a time chart showing heat and hydrogen generation control.

in FIG. 21.

DESCRIPTION OF EMBODIMENTS

Figure 1:
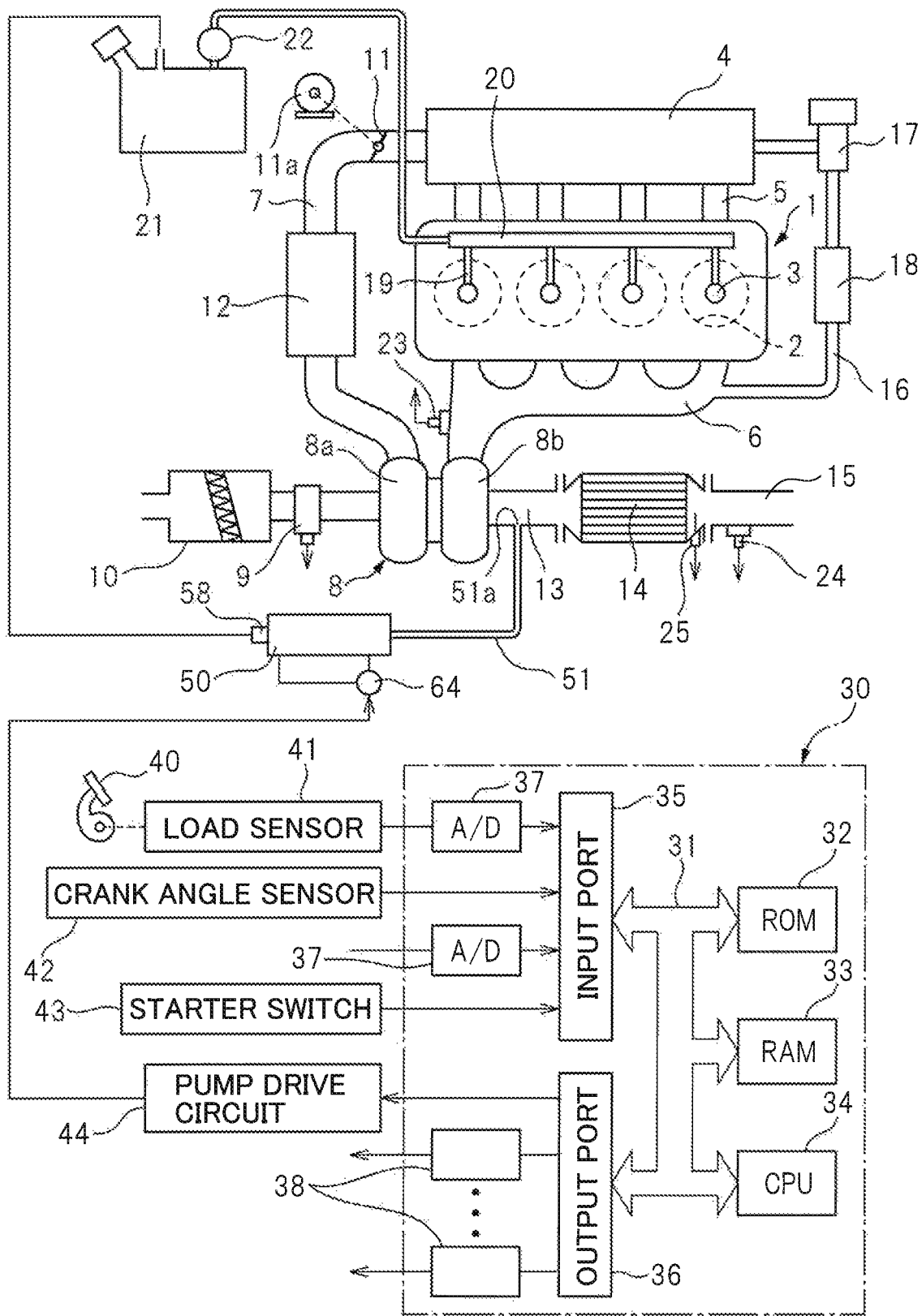
FIG. 1 is an overall view of an internal combustion engine.

FIG. 1 shows an overall view of a gasoline engine. Referring to FIG. 1, 1 indicates an engine body, 2 a combustion chamber of a cylinder, 3 an electronically controlled fuel injector for injecting fuel into each combustion chamber 2, 4 a surge tank, 5 an intake branch pipe and 6 an exhaust manifold. The surge tank 4 is connected through an intake duct 7 to the outlet of a compressor 8a of an exhaust turbocharger 8. The inlet of the compressor 8a is connected through an intake air amount detector 9 to an air cleaner 10. Inside of the intake duct 7, a throttle valve 11 driven by an actuator 11e is arranged. Around the intake duct 7, an intercooler 12 is arranged for cooling the intake air flowing through the inside of the intake duct 7.

On the other hand, the exhaust manifold 6 is connected to the inlet of an exhaust turbine 8b of the exhaust turbocharger 8, and the outlet of the exhaust turbine 8b is connected through an exhaust pipe 13 to the inlet of an exhaust purification catalyst 14. The outlet of the exhaust purification catalyst 14 is connected to an exhaust pipe 15. The exhaust manifold 5 and the surge tank 4 are connected with each other through an exhaust gas recirculation (hereinafter referred to as an "EGR") passage 16. Inside the EGR passage 16, an electronic control type EGR control valve 17 and an EGR cooler 18 for cooling the EGR gas are arranged. Each fuel injector 3 is connected through a fuel feed pipe 19 to a fuel delivery pipe 20, and this fuel delivery pipe 20 is connected to a fuel tank 21 via a fuel pump 22.

Intake air is fed to the surge tank 4 via the intake air amount detector 9, the compressor 8a, the intercooler 12 and the intake duct 7, and the intake air fed to the surge tank 4 is fed to each combustion chamber 2 via the intake branch pipe 5. On the other hand, fuel, i.e, gasoline stored in the fuel tank 21 is fed to the fuel delivery pipe 20 by the fuel pump 22, and the fuel fed to the fuel delivery pipe 20 is injected to each combustion chamber 2 from the fuel injector 3 via the corresponding fuel feed pipe 19. The exhaust gas discharged from the combustion chamber 2 is discharged to the outside air via the exhaust manifold 6, the exhaust turbine 8b, the exhaust pipe 13, the exhaust purification catalyst 14 and the exhaust pipe 15.

In an embodiment of the present invention, the exhaust purification catalyst 14 is comprised of a catalyst which is able to simultaneously reduce an amount of HC, CO and $NO_x$ contained in a gas when the air-fuel ratio of the gas flowing into the exhaust purification catalyst 14, for example, the air-fuel ratio of the exhaust gas is the stoichiometric air-fuel ratio. A precious metal such as platinum Pt, palladium Pd, and rhodium Rh, and cerium Ce are carried on this exhaust purification catalyst 14. A representative example of the exhaust purification catalyst 14 is a three way catalyst. On the other hand, an $NO_x$ storage reduction catalyst, storing $NO_x$ contained in the exhaust gas when the air-fuel ratio of the inflow exhaust gas is lean and releasing the stored $NO_x$ when the air-fuel ratio of the inflow exhaust gas is rich, is also able to simultaneously reduce an amount of HC, CO and $NO_x$ contained in a gas when the air-fuel ratio of the gas flowing into the $NO_x$ storage reduction catalyst, for example, the air-fuel ratio of the exhaust gas is the stoichiometric air-fuel ratio. Accordingly, this $NO_x$ storage reduction catalyst may be used as the exhaust purification catalyst 14. Note that, in the embodiment of the present invention, the three way catalyst is used as the exhaust purification catalyst 14, and accordingly, the present invention will be explained with reference to, as an example, the case of using the three way catalyst as the exhaust purification catalyst 14.

Referring to FIG. 1, the electronic control unit 30 is comprised of a digital computer provided with a ROM (read only memory) 32, RAM (random access memory) 33, CPU (microprocessor) 34, input port 35, and output port 36, which are interconnected with each other by a bidirectional bus 31. As shown in FIG. 1, an upstream air-fuel ratio sensor 23 for detecting the air-fuel ratio of the exhaust gas discharged from the engine is arranged in the exhaust manifold 6, and a downstream air-fuel ratio sensor 24 for detecting the air-fuel ratio of the gas discharged from the exhaust purification catalyst 14 is arranged in the exhaust pipe 15 downstream of the exhaust purification catalyst 14. In addition, a temperature sensor 25 for detecting the temperature of the exhaust purification catalyst 14 is arranged in the exhaust pipe 15 downstream of the exhaust purification catalyst 14. The output signals of the upstream air-fuel ratio sensor 23, the downstream air-fuel ratio sensor 24, the temperature sensor 25 and the intake air amount detector 9 are input through corresponding AD converters 37 to the input port 35.

Further, an accelerator pedal 40 is connected to a load sensor 41 generating an output voltage proportional to the amount of depression of the accelerator pedal 40. The output voltage of the load sensor 41 is input through a corresponding AD converter 37 to the input port 35. Furthermore, the input port 35 is connected to a crank angle sensor 42 generating an output pulse each time a crankshaft rotates by for example 15°. In addition, the operation signal of a starter switch 43 of the engine is input to the input port 35. On the other hand, the output port 36 is connected through corresponding drive circuits 38 to the fuel injectors 3, the actuator 11a for driving the throttle valve 11, the EGR control valve 17 and the fuel pump 22.

As shown in FIG. 1, a heat and hydrogen generation device 50 which is able to generate heat and hydrogen or only heat is provided, and this heat and hydrogen generation device 50 is connected to the exhaust pipe 13 upstream of the exhaust purification catalyst 14 via a feed passage 51. This heat and hydrogen generation device 50 is started to operate, for example, at the time of the start of operation of the engine, and heat and hydrogen or only heat which are generated in the heat and hydrogen generation device 50 are fed to the exhaust purification catalyst 14 via the feed passage 51. Due to this, a warm up operation of the exhaust purification catalyst 14 is performed by these heat and hydrogen or only heat. This heat and hydrogen generation device 50 is arranged, for example, inside the engine compartment of the vehicle.

FIG. 2 shows an overall view of the heat and hydrogen generation device 50. This heat and hydrogen generation device 50 is cylindrically shaped as a whole. Referring to FIG. 2, 52 indicates a cylindrical housing of the heat and hydrogen generation device 50, 53 a burner combustion chamber formed in the housing 52, 54 a reformer catalyst arranged in the housing 52, and 55 a gas outflow chamber formed in the housing 52. In the embodiment shown in FIG. 2, the reformer catalyst 54 is arranged at the center of the housing 52 in the longitudinal direction, the burner combustion chamber 53 is arranged at one end part of the housing 52 in the longitudinal direction, and the gas outflow chamber 55 is arranged at the other end part of the housing 52 in the longitudinal direction. As shown in FIG. 2, in this embodiment, the entire outer circumference of the housing 52 is covered by a heat insulating material 56.

As shown in FIG. 2, a burner 57 provided with a fuel injector 58 is arranged at one end part of the burner combustion chamber 53. The tip of the fuel injector 58 is arranged in the burner combustion chamber 53, and a fuel injection port 59 is formed at the tip of the fuel injector 58. Further, an air chamber 60 is formed around the fuel injector 58, and an air feed port 61 for ejecting air in the air chamber 60 toward the inside of the burner combustion chamber 53 is formed around the tip of the fuel injector 58. In the embodiment shown in FIG. 2, the fuel injector 58 is connected to the fuel tank 24 as shown in FIG. 1, and fuel inside the fuel tank 24 is injected from the fuel injection port 59 of the fuel injector 58. In the embodiment shown in FIGS. 1 and 2, this fuel is comprised of gasoline.

The air chamber 60 is connected on one hand through a high temperature air flow passage 62 to an air pump 64 able to control the discharge rate and is connected on the other hand through a low temperature air flow passage 63 to the air pump 64 able to control the discharge rate. As shown in FIG. 2, a high temperature air valve 65 and low temperature air valve 66 are arranged in the high temperature air flow passage 62 and the low temperature air flow passage 63, respectively. Further, as shown in FIG. 2, the high temperature air flow passage 62 is provided with a heat exchange part arranged in the gas outflow chamber 55. This heat exchange part is shown diagrammatically in FIG. 1 by reference notation 62a. Note that, this heat exchange part 62a may also be formed downstream of the reformer catalyst 54 around the housing 52 defining the gas outflow chamber 55. That is, it is preferable that this heat exchange part 62a is arranged or formed at a location where a heat exchange action is performed using the heat of the high temperature gas flowing out from the gas outflow chamber 55. On the other hand, the low temperature air flow passage 63 does not have a heat exchange part performing the heat exchange action using the heat of the high temperature gas flowing out from the gas outflow chamber 55 in this way.

If the high temperature air valve 65 opens and the low temperature air valve 66 is made to close, the outside air is fed through the air cleaner 67, a feed air amount detector 74, the air pump 64, the high temperature air flow passage 62, and the air chamber 60 into the burner combustion chamber 53 from the air feed port 61. At this time, the outside air, that is, air, is made to flow within the heat exchange part 62a. As opposed to this, if the low temperature air valve 66 opens and the high temperature air valve 65 is made to close, the outside air, that is, the air, is fed through the air cleaner 67, the feed air amount detector 74, the air pump 64, the low temperature air flow passage 63, and the air chamber 60 from the air feed port 61. Therefore, the high temperature air valve 65 and low temperature air valve 66 form a switching device able to switch the air flow passage for feeding air through the air chamber 60 to the air feed port 61 between the high temperature air flow passage 62 and the low temperature air flow passage 63.

On the other hand, an ignition device 68 is arranged in the burner combustion chamber 53. In the embodiment shown in FIG. 2, this ignition device 68 is comprised of a glow plug. This glow plug 68 is connected through a switch 69 to a power supply 70. On the other hand, in the embodiment shown in FIG. 2, the reformer catalyst 54 is comprised of an oxidizing part 54a and a reforming part 54b. In the example shown in FIG. 2, the substrate of the reformer catalyst 54 is comprised of zeolite. On this substrate, at the oxidizing part 54a, mainly palladium Pd is carried, while at the reforming part 54b, mainly rhodium Rh is carried. Further, a temperature sensor 71 for detecting the temperature of the upstream side end face of the oxidizing part 54a of the reformer catalyst 54 is arranged in the burner combustion chamber 53, and a temperature sensor 72 for detecting the temperature of the downstream side end face of the reforming part 54b of the reformer catalyst 54 is arranged in the gas outflow chamber 55. Furthermore, a temperature sensor 73 for detecting the temperature of the air flowing within the low temperature air flow passage 63 is arranged in the low temperature air flow passage 63 positioned at the outside of the heat insulating material 56.

The output signals of these temperature sensors 71, 72 and 73 are input to the input port 35 through corresponding AD converters 37 shown in FIG. 1, respectively. Further, the output signal showing the resistance value of the glow plug 68 is input to the input port 35 through a corresponding AD converter 37 shown in FIG. 1. On the other hand, the output port 36 shown in FIG. 1 is connected through corresponding drive circuits 38 to the fuel injectors 58, high temperature air valve 65, low temperature air valve 66, and switch 69. Furthermore, as shown in FIG. 1, the output port 36 is connected to a pump drive circuit 44 controlling the discharge rate of the air pump 64. The discharge rate of the air pump 64 is controlled by the pump drive circuit 44 so that the amount of air detected by the feed air amount detector 74 becomes equal to a target feed air amount. Accordingly, the amount of air fed to the burner combustion chamber 53 is maintained at the target feed air amount at all times.

At the time of start of operation of the heat and hydrogen generation device 50, fuel injected from the burner 57 is ignited by the glow plug 68. Due to this, the fuel and air which are fed from the burner 57 react in the burner combustion chamber 53, and whereby burner combustion is started. If burner combustion is started, the temperature of the reformer catalyst 54 gradually rises. At this time, the burner combustion is performed under a lean air-fuel ratio. Next, if the temperature of the reformer catalyst 54 reaches a temperature able to reform the fuel, the air-fuel ratio is normally switched from the lean air-fuel ratio to the rich air-fuel ratio and the reforming action of the fuel at the reformer catalyst 54 is started. If the reforming action of the fuel is started, hydrogen is generated and high temperature gas containing the generated hydrogen is made to flow out from a gas outflow port 74 of the gas outflow chamber 55. The high temperature gas flowing out from gas outflow port 74 is fed to the exhaust purification catalyst 14 via the feed passage 51 as shown in FIG. 1.

In this way, in the embodiment of the present invention, the heat and hydrogen generation device 50 is provided with the burner combustion chamber 53, the burner 57 arranged in the burner combustion chamber 53 for performing burner combustion, a fuel feed device able to control the amount of feed of the fuel fed from the burner 57 into the burner combustion chamber 53, an air feed device able to control the temperature and amount of feed of air fed from the burner 57 into the burner combustion chamber 53, the ignition device 68 for making the fuel ignite, and the reformer catalyst 54 to which the burner combustion gas is fed, and the air feed device is provided with the heat exchange part 62a for heating the air fed from the burner 57 into the burner combustion chamber 53 by the burner combustion gas. In this case, in the embodiment of the present invention, the fuel injector 58 forms the above-mentioned fuel feed device. The air chamber 60, air feed port 61, high temperature air flow passage 62, heat exchange part 62a, low temperature air flow passage 63, air pump 64, high temperature air valve 65, and low temperature air valve 66 form the above-mentioned air feed device.

Now then, in the embodiment of the present invention, hydrogen is generated by reforming fuel in the heat and hydrogen generation device 50. Therefore, first, referring to FIG. 3, reforming reactions of fuel will be explained.

(a) to (c) in FIG. 3 show a reaction formula when a complete oxidation reaction is performed, a reaction formula when a partial oxidation reforming reaction is performed, and a reaction formula when a steam reforming reaction is performed, respectively, with respect to the reaction of fuel. Note that, the heating value $\Delta H^o$ in the reaction formulas are shown by the lower heating value (LHV). Now, as will be understood from (b) and (c) in FIG. 3, to generate hydrogen from fuel, there are two methods: the method of performing the partial oxidation reforming reaction and the method of performing the steam reforming reaction. The steam reforming reaction is the method of adding steam to fuel, and as will be understood from (C) in FIG. 3, this steam reforming reaction is an endothermic reaction. Therefore, to cause the steam reforming reaction, it is necessary to add heat from the outside. In large scale hydrogen generating plants, usually, to raise the efficiency of generation of hydrogen, in addition to the partial oxidation reforming reaction, the steam reforming reaction in which the generated heat is not discarded, but using the generated heat for generating hydrogen is used.

As opposed to this, in the present invention, to generate both hydrogen and heat, the steam reforming reaction using the generated heat for generating hydrogen is not used. In the present invention, only the partial oxidation reforming reaction is used to generate hydrogen. This partial oxidation reforming reaction, as will be understood from (b) in FIG. 3, is an exothermic reaction. Therefore, the reforming reaction proceeds by the heat generated on its own even without adding heat from the outside, and hydrogen is generated. Now, as shown by the reaction formula of the partial oxidation reforming reaction of (b) in FIG. 3, the partial oxidation reforming reaction is performed by a rich air-fuel ratio in which an $O_2/C$ molar ratio, showing the ratio of the air and fuel which are made to react, is 0.5. At this time, CO and $H_2$ are generated.

Figure 4:
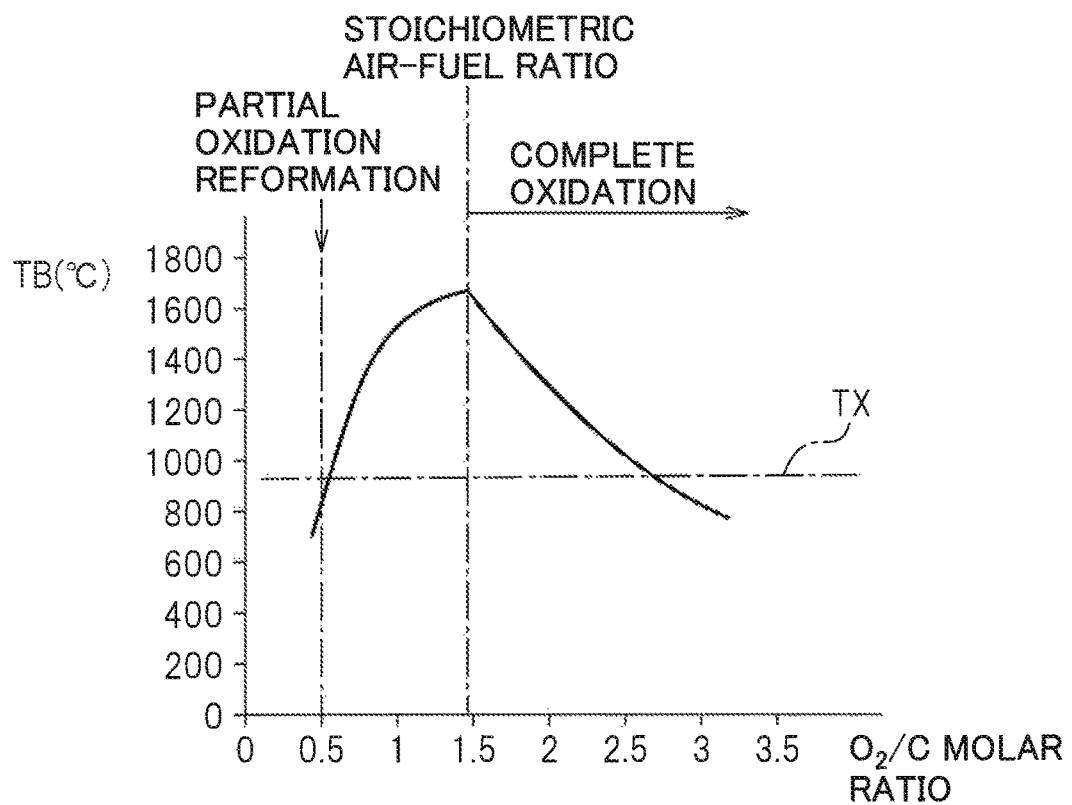
FIG. 4 is a view showing a relationship between a reaction equilibrium temperature TB and an $O_2/C$ molar ratio.

FIG. 4 shows the relationship between the $O_2/C$ molar ratio of the air and fuel and a reaction equilibrium temperature TB when the air and fuel are reacted at the reformer catalyst and reach equilibrium. Note that, the solid line in FIG. 4 shows the theoretical value when the air temperature is 25° C. As shown by the solid line in FIG. 4, when the partial oxidation reforming reaction is performed by a rich air-fuel ratio of an $O_2/C$ molar ratio=0.5, the equilibrium reaction temperature TB becomes substantially 830° C. Note that, the actual equilibrium reaction temperature TB at this time becomes somewhat lower than 830° C., but below, the equilibrium reaction temperature TB will be explained for an embodiment according to the present invention as the value shown by the solid line in FIG. 4.

On the other hand, as will be understood from the reaction formula of the complete oxidation reaction of (a) in FIG. 3, when the $O_2/C$ molar ratio=1.4575, the ratio of the air and fuel becomes the stoichiometric air-fuel ratio. As shown in FIG. 4, the reaction equilibrium temperature TB becomes the highest when the ratio of the air and fuel becomes the stoichiometric air-fuel ratio. When an $O_2/C$ molar ratio is between 0.5 and 1.4575, partially the partial oxidation reforming reaction is performed, while partially the complete oxidation reaction is performed. In this case, the larger the $O_2/C$ molar ratio, the greater the ratio by which the complete oxidation reaction is performed compared with the ratio by which the partial oxidation reforming reaction is performed, so the larger the $O_2/C$ molar ratio, the higher the reaction equilibrium temperature TB.

Figure 5:
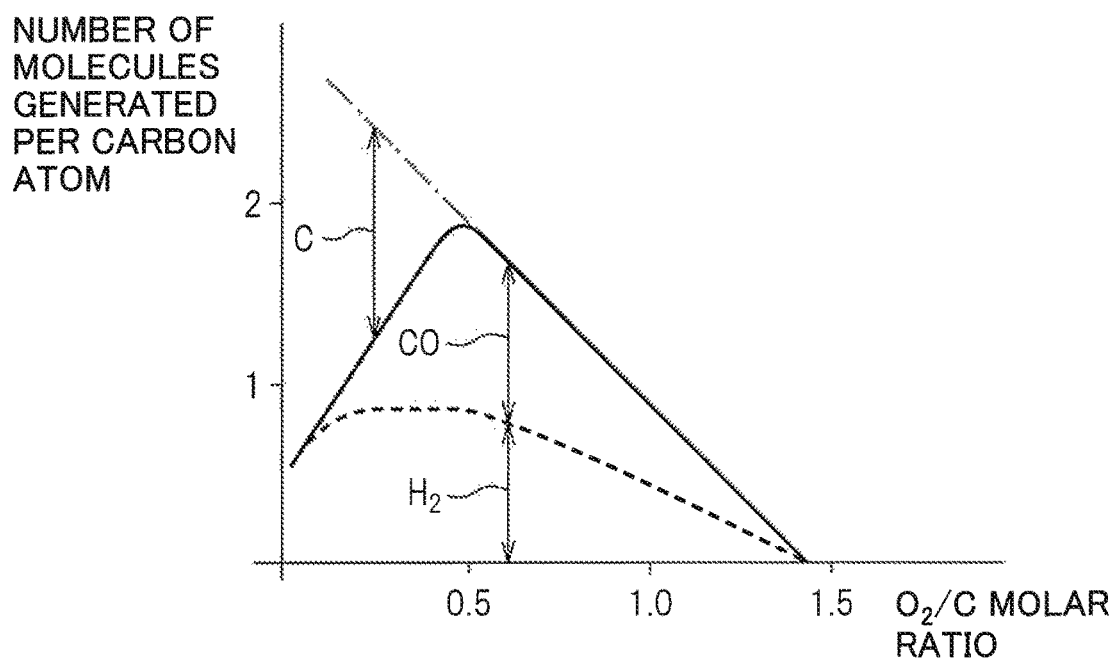
FIG. 5 is a view showing a relationship between the number of molecules generated per carbon atom and an $O_2/C$ molar ratio.

On the other hand, FIG. 5 shows the relationship between the number of molecules ($H_2$ and CO) produced per atom of carbon and the $O_2/C$ molar ratio. As explained above, the more the $O_2/C$ molar ratio exceeds 0.5, the less the ratio by which the partial oxidation reforming reaction is performed. Therefore, as shown in FIG. 5, the more the $O_2/C$ molar ratio exceeds 0.5, the smaller the amounts of generation of $H_2$ and CO. Note that, while not described in FIG. 5, if the $O_2/C$ molar ratio becomes larger than 0.5, due to the complete oxidation reaction shown in (a) of FIG. 3, the amounts of generation of $CO_2$ and $H_2O$ increase. In this regard, FIG. 5 shows the amounts of generation of $H_2$ and CO when assuming no water gas shift reaction shown in (d) of FIG. 3 occurs. However, in actuality, the water gas shift reaction shown in (d) of FIG. 3 occurs due to the CO generated by the partial oxidation reforming reaction and the $H_2O$ generated by the complete oxidation reaction, and hydrogen is generated by this water gas shift reaction as well.

Now then, as explained above, the more the $O_2/C$ molar ratio exceeds 0.5, the less the amounts of generation or $H_2$ and CO. On the other hand, as shown in FIG. 5, if the $O_2/C$ molar ratio becomes smaller than 0.5, excess carbon C unable to be reacted with increases. This excess carbon C deposits inside the pores of the substrate of the reformer catalyst, that is, a coking occurs. If the coking occurs, the reforming ability of the reformer catalyst remarkably falls. Therefore, to avoid the coking occurring, the $O_2/C$ molar ratio has to be kept from becoming smaller than 0.5. Further, as will, be understood from FIG. 5, in a range where no excess carbon is produced, the amount of generation of hydrogen becomes largest when the $O_2/C$ molar ratio is 0.5. Therefore, in the embodiment of the present invention, when the partial oxidation reforming reaction is performed for generating hydrogen, to avoid the occurrence of the coking and enable hydrogen to be generated most efficiently, the $O_2/C$ molar ratio is in principle made 0.5.

On the other hand, even if the $O_2/C$ molar ratio is made larger than the stoichiometric air-fuel ratio of the $O_2/C$ molar ratio=1.4575, the complete oxidation reaction is performed, but the larger the $O_2/C$ molar ratio becomes, the greater the amount of air to be raised in temperature. Therefore, as shown in FIG. 4, if the $O_2/C$ molar ratio is made greater than the $O_2/C$ molar ratio=1.4575 showing the stoichiometric air-fuel ratio, the larger the $O_2/C$ molar ratio becomes, the more the reaction equilibrium temperature TB will fall. In this case, for example, if the $O_2/C$ molar ratio is made a lean air-fuel ratio of 2.6, when the air temperature is 25° C., the reaction equilibrium temperature TB becomes about 920° C.

Figure 6:
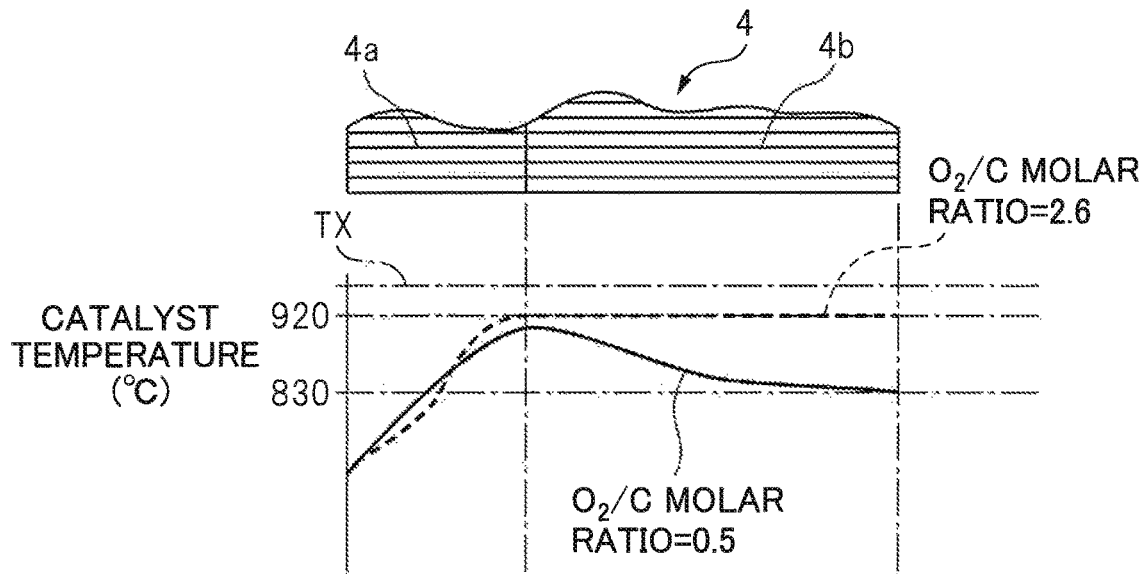
FIG. 6 is a view showing a temperature distribution in a reformer catalyst.

Now then, as explained above, when the operation of the heat and hydrogen generation device 50 shown in FIG. 2 is started, the burner combustion is performed under a lean air-fuel ratio, and thereby the temperature of the reformer catalyst 54 gradually rises. Next, if the temperature of the reformer catalyst 54 reaches a temperature able to reform the fuel, the air-fuel ratio is normally switched from a lean air-fuel ratio to a rich air-fuel ratio and a reforming action of fuel at the reformer catalyst 54 is started. If the reforming action of fuel is started, hydrogen is generated. FIG. 6 shows the temperature distribution inside the oxidizing part 54*a* and reforming part 54*b* of the reformer catalyst 54 when the reaction at the reformer catalyst 54 becomes an equilibrium state. Note that, this FIG. 6 shows the temperature distribution in the case where the outside air temperature is 25° C. and this outside air is fed through the low temperature air flow passage 63 shown in FIG. 2 from the burner 57 to the inside of the burner combustion chamber 53.

The solid line of FIG. 6 shows the temperature distribution inside the reformer catalyst 54 when the $O_2/C$ molar ratio of the air and fuel fed from the burner 57 is 0.5. As shown in FIG. 6, in this case, at the oxidizing part 54*a* of the reformer catalyst 54, the temperature of the reformer catalyst 54 rises toward the downstream side due to the heat of oxidation reaction due to the remaining oxygen. About when the combustion gas proceeds from inside the oxidizing part 54*a* of the reformer catalyst 54 to the inside of the reforming part 54*b*, the remaining oxygen in the combustion gas is consumed and a fuel reforming action is performed at the reforming part 54*b* of the reformer catalyst 54. This reforming reaction is an endothermic reaction. Therefore, the temperature inside the reformer catalyst 54 falls as the reforming action proceeds, that is, toward the downstream side of the reformer catalyst 54. The temperature of the downstream side end face of the reformer catalyst 54 at this time is 830° C. and matches the reaction equilibrium temperature TB when the $O_2/C$ molar ratio=0.5 shown in FIG. 4.

On the other hand, FIG. 6 shows by a broken line the temperature distribution inside the reformer catalyst 54 when the $O_2/C$ molar ratio of the air and fuel fed from the burner 57 is a lean air-fuel ratio of 2.6. In this case as well, the temperature inside the reformer catalyst 54 rises toward the downstream side reformer catalyst 54 due to the heat of oxidation reaction of the fuel inside the oxidizing part 54*a* of the reformer catalyst 54. On the other hand, in this case, no reforming action is performed inside the reforming part 54*b* of the reformer catalyst 54, so the temperature of the reformer catalyst 54 is maintained constant in the reforming part 54*b*. The temperature of the downstream side end face of the reformer catalyst 54 at this time is 920° C. and matches the reaction equilibrium temperature TB when the $O_2/C$ molar ratio=2.6 shown in FIG. 4. That is, the reaction equilibrium temperature TB of FIG. 4 shows the temperature of the downstream side end face of the reformer catalyst 54 when the outside air temperature is 25° C. and this outside air is fed through the low temperature air flow passage 63 shown in FIG. 2 from the burner 57 to the inside of the burner combustion chamber 53.

Figure 7:
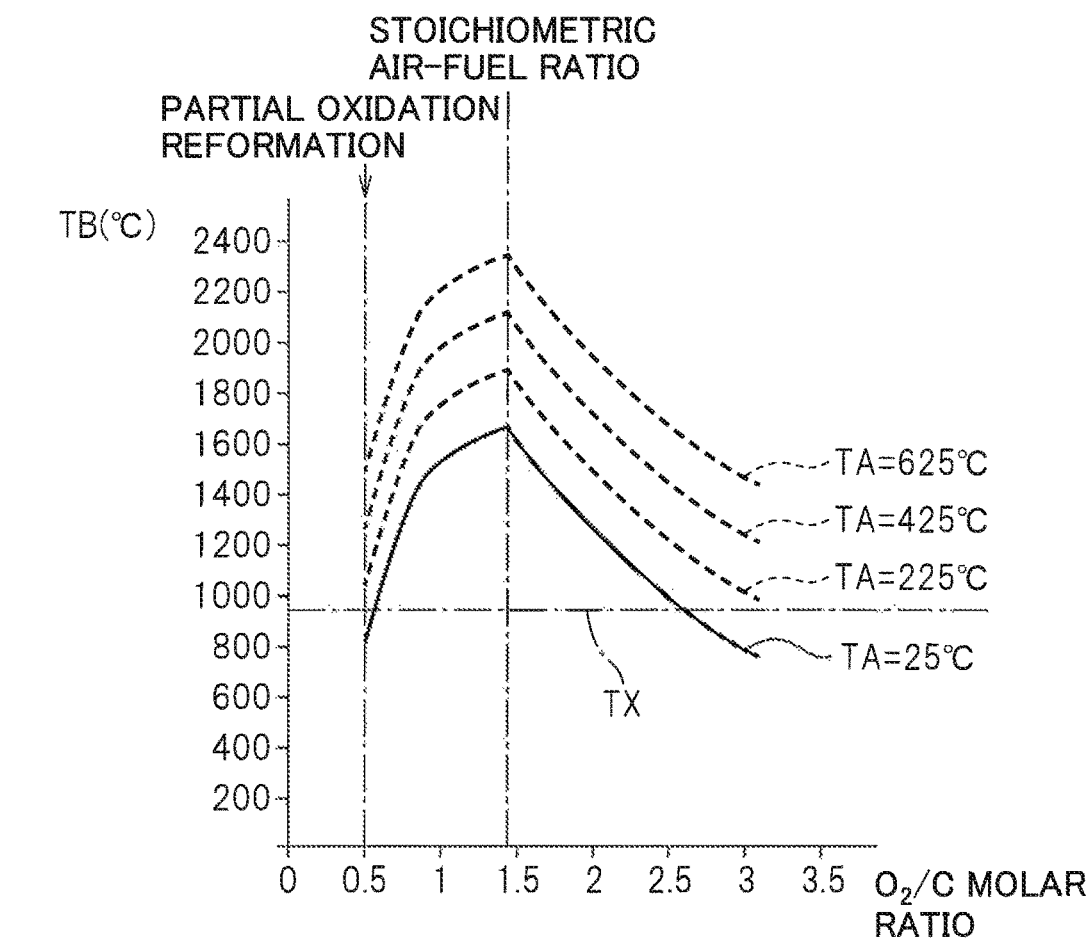
FIG. 7 is a view showing a relationship between a reaction equilibrium temperature TB and an $O_2/C$ molar ratio when a fed air temperature TA changes.

Next, referring to FIG. 7, the reaction equilibrium temperature TB when changing the temperature of the air reacted with the fuel at the reformer catalyst will be explained. FIG. 7, in the same way as FIG. 4, shows the relationship between the $O_2/C$ molar ratio of the air and fuel and the reaction equilibrium temperature TB when the air and fuel are made to react at the reformer catalyst and reach equilibrium. Note that, in FIG. 7, TA shows the air temperature. In this FIG. 7, the relationship between the $O_2/C$ molar ratio and the reaction equilibrium temperature TB shown by the solid line in FIG. 4 is shown again by a solid line. FIG. 7 further shows the relationships between the $O_2/C$ molar ratio and the reaction equilibrium temperature TB when changing the air temperature TA to 225° C., 425° C., and 625° C. by broken lines. From FIG. 7, it will be understood that the reaction equilibrium temperature TB becomes higher overall regardless of the $O_2/C$ molar ratio if the air temperature TA rises.

On the other hand, it is confirmed that the reformer catalyst 54 used in the embodiment of the present invention does not greatly deteriorate due to heat if the catalyst temperature is 950° C. or less. Therefore, in the embodiment of the present invention, 950° C. is made the allowable catalyst temperature TX enabling heat degradation of the reformer catalyst 54 to be avoided. This allowable catalyst temperature TX is shown in FIG. 4, FIG. 6, and FIG. 7. As will be understood from FIG. 6, if the air temperature TA is 25° C., both when the $O_2/C$ molar ratio is 0.5 or when the $O_2/C$ molar ratio is 2.6, the temperature of the reformer catalyst 54 when the reaction at the reformer catalyst 54 reaches an equilibrium state becomes the allowable catalyst temperature TX or less at all locations of the reformer catalyst 54. Therefore, in this case, it is possible to continue to use the reformer catalyst 54 without being concerned about heat degradation in practice.

On the other hand, as will be understood from FIG. 4, even when the air temperature T is 25° C., if the $O_2/C$ molar ratio becomes slightly larger than 0.5, the temperature of the downstream side end face of the reformer catalyst 54 when the reaction at the reformer catalyst 54 reaches the equilibrium state, that is, the reaction equilibrium temperature TB, will end up exceeding the allowable catalyst temperature TX. If the $O_2/C$ molar ratio becomes slightly smaller than 2.6, the temperature of the downstream side end face of the reformer catalyst 54 when the reaction at the reformer catalyst 54 reaches the equilibrium state will end up exceeding the allowable catalyst temperature TX. Therefore, for example, when the reaction at the reformer catalyst 54 is in the equilibrium state, if causing a partial oxidation reforming reaction, the $O_2/C$ molar ratio can be made larger than 0.5, but the range by which the $O_2/C$ molar ratio can be enlarged is limited.

On the other hand, as will be understood from FIG. 7, if the air temperature TA becomes higher, when the reaction at the reformer catalyst 54 reaches the equilibrium state, even if making the $O_2/C$ molar ratio 0.5, the temperature of the downstream side end face of the reformer catalyst 54 when the reaction at the reformer catalyst 54 reaches the equilibrium state will become higher than the allowable catalyst temperature TX and, therefore, the reformer catalyst 54 will deteriorate due to heat. Therefore, when the air temperature TA becomes high, if the reaction at the reformer catalyst 54 becomes the equilibrium state, the $O_2/C$ molar ratio cannot be made 0.5. Therefore, in the embodiment of the present invention, when the reaction at the reformer catalyst 54 reaches the equilibrium state, the air temperature TA is made a low temperature of about 25° C., and the $O_2/C$ molar ratio is made 0.5 in a state maintaining the air temperature TA at about 25° C.

As explained above, in the embodiment of the present invention, when operation of the heat and hydrogen generation device 50 is started, burner combustion is started under a lean air-fuel ratio. This burner combustion under a lean air-fuel ratio is performed until the reforming action by the reformer catalyst 54 becomes possible. In other words, in the embodiment of the present invention, a warm-up operation of the heat and hydrogen generation device 50 is performed under a lean air-fuel ratio after startup of the heat and hydrogen generation device 50 until a reforming action by the reformer catalyst 54 becomes possible. In this case, if the temperature of the reformer catalyst 54 becomes 700° C. or so, a reforming action by the reformer catalyst 54 becomes possible. Therefore, in the embodiment of the present invention, a warm-up operation of the heat and hydrogen generation device 50 is performed under a lean air-fuel ratio after startup of the heat and hydrogen generation device 50 until the temperature of the reformer catalyst 54 becomes 700° C. During this time, the combustion gas generated at the heat and hydrogen generation device 50 is made to flow out from the gas outflow port 74 of the gas outflow chamber 55, then, is fed through the feed passage 51 to the exhaust purification catalyst 14. Next, if a reforming action by the reformer catalyst becomes possible, that is, if the temperature of the reformer catalyst 54 becomes 700° C., normally the air-fuel ratio is switched from a lean air-fuel ratio to a rich air-fuel ratio and the partial oxidation reforming reaction is performed. If the partial oxidation reforming reaction is performed, heat and hydrogen are generated at the reformer catalyst 54. These heat and hydrogen are made to flow out from the gas outflow port 74 of the gas outflow chamber 55, and the combustion gas containing hydrogen is fed to the exhaust purification catalyst 14 via the feed passage 51.

Now that, in the embodiment of the present invention, at the time of startup of the engine, to make the temperature of the exhaust purification catalyst 14 rise up to the target warm-up temperature quickly, the operation of the heat and hydrogen generation device 50 is started at the same time as startup of the engine, and the warm-up action of the exhaust purification catalyst 14 is promoted by the heat and hydrogen or the heat fed from the heat and hydrogen generation device 50 to the exhaust purification catalyst 14. Therefore, first, while referring to FIG. 8A and FIG. 8B, the action of promoting warm-up of the exhaust purification catalyst 14 due to this heat and hydrogen generation device 50 will be explained.

Figure 8A:
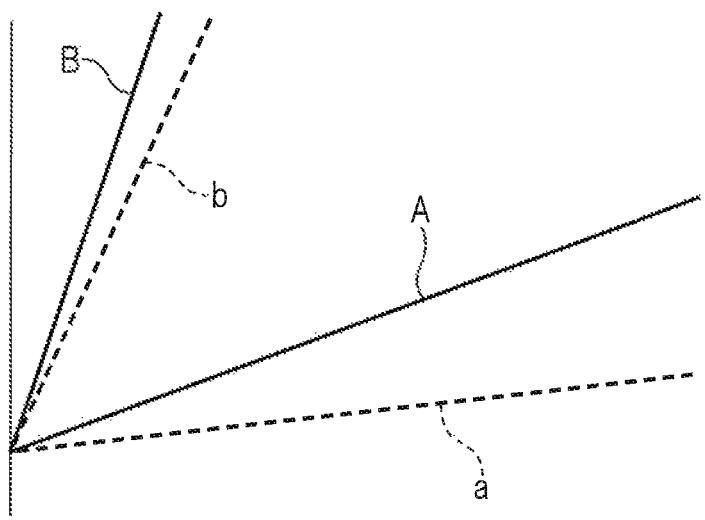
FIGS. 8A and 8B are views showing a temperature change of an exhaust purification catalyst.
Figure 8B:
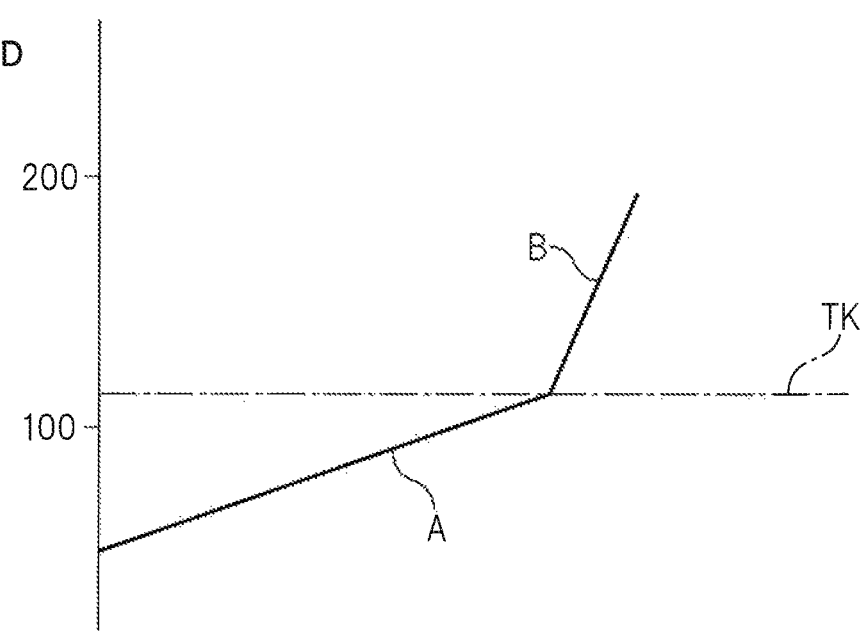

FIG. 8A and FIG. 8B show the change of the temperature TD of the exhaust purification catalyst 14 when the warm up operation of the exhaust purification catalyst 14 is performed by using the heat and hydrogen generation device 50. Note that, in FIG. 8A and FIG. 8B, the abscissa shows the elapse of time. In these FIG. 8A and FIG. 8B, to facilitate the explanation, the warm-up action of the exhaust purification catalyst 14 by the exhaust gas discharged from the engine is ignored. Further, in FIG. 8B, TK shows the temperature at which the precious metal carried on the exhaust purification catalyst 14 becomes activated with respect to the oxidation reaction of hydrogen. In the example shown in FIG. 8B, this temperature TK at which the precious metal becomes activated is made 110° C. Note that, below, this temperature TK, at which the precious metal becomes activated will be called the "activation temperature TK of the exhaust purification catalyst 14".

Now, as will be understood from FIG. 3, if comparing the complete oxidation reaction and the partial oxidation reforming reaction, the complete oxidation reaction is far greater in amount of heat generated compared with the partial oxidation reforming reaction. Therefore, if the amount of fuel used is the same, the amount of heat fed to the exhaust purification catalyst 14 is far larger when the complete oxidation reaction is performed in the heat and hydrogen generation device 50 compared to when the partial oxidation reforming reaction is performed in the heat and hydrogen generation device 50. In FIG. 8A, the change of temperature of the exhaust purification catalyst 14 in case where the exhaust purification catalyst 14 is warmed up by the heat generated when the complete oxidation reaction is performed by an $O_2/C$ molar ratio=2.6 is shown by the solid line A, while the change of temperature of the exhaust purification catalyst 14 in case where the exhaust purification catalyst 14 is warmed up by only the heat generated when the partial oxidation reforming reaction is performed by an $O_2/C$ molar ratio=0.5 is shown by the broken line "a". Note that FIG. 8A shows when the amount of fuel used is the same. As will be understood by a comparison of the solid line A and broken line "a", the rate of rise of the temperature TD of the exhaust purification catalyst 14 when the exhaust purification catalyst 14 is warmed up by only the heat generated at the heat and hydrogen generation device 50 is faster in the case of the complete oxidation reaction than the partial oxidation reforming reaction.

On the other hand, at the time of warm-up of the exhaust purification catalyst 14, if hydrogen is fed to the exhaust purification catalyst 14 and an oxidation reaction of the hydrogen is performed on the precious metal, the temperature TD of the exhaust purification catalyst 14 rapidly rises due to the heat of the oxidation reaction of the hydrogen. The broken line "b" of FIG. 8A shows the changes in temperature of the exhaust purification catalyst 14 in case where the exhaust purification catalyst 14 is warmed up by only the hydrogen generated when the partial oxidation reforming reaction is performed by $O_2/C$ molar ratio=0.5 under the same amount of fuel used, while the solid line B of FIG. 8A shows the changes in temperature of the exhaust purification catalyst 14 in case where the exhaust purification catalyst 14 is warmed up by the heat generated and the hydrogen generated when the partial oxidation reforming reaction is performed by $O_2/C$ molar ratio=0.5 under the same amount of fuel used. As will be understood by comparing the solid line A and the solid line B in FIG. 8A, when a warm-up action of the exhaust purification catalyst 14 by hydrogen is also performed, the rate of rise of the temperature TD of the exhaust purification catalyst 14 is far faster in the partial oxidation reforming reaction than the complete oxidation reaction.

That is, part of the heat of the combustion gas generated at the heat and hydrogen generation device 50 escapes to the outside while the combustion gas flows through the inside of the feed passage 51. Further, this heat of combustion gas is just fed by heat transfer to the exhaust purification catalyst 14, so in actuality the amount of heat used for heating the exhaust purification catalyst 14 is not that great. As opposed to this, the hydrogen generated at the heat and hydrogen generation device 50 is not consumed until reaching the exhaust purification catalyst 14, and the exhaust purification catalyst 14 itself is directly heated by the heat of the oxidation reaction of hydrogen. Therefore, the exhaust purification catalyst 14 is made to rapidly rise in temperature by the heat of the oxidation reaction of the hydrogen.

In this regard, when the temperature TD of the exhaust purification catalyst 14 is lower than the activation temperature TK of the exhaust purification catalyst 14 shown in FIG. 8B, even if hydrogen is fed to the exhaust purification catalyst 14, no oxidation reaction of hydrogen is performed on the precious metal. Therefore, at this time, no heat of oxidation reaction is caused due to the oxidation reaction of hydrogen. Therefore, when the temperature TD of the exhaust purification catalyst 14 is lower than the activation temperature TK of the exhaust purification catalyst 14, as will be understood from FIG. 8A, the rate of rise of temperature of the exhaust purification catalyst 14 becomes far faster when the complete oxidation reaction is performed at the heat and hydrogen generation device 50 compared with the partial oxidation reforming reaction in the heat and hydrogen generation device 50.

As opposed to this, when the temperature TD of the exhaust purification catalyst 14 is higher than the activation temperature TK of the exhaust purification catalyst 14, if the partial oxidation reforming reaction is performed at the heat and hydrogen generation device 50 and thereby hydrogen is fed to the exhaust purification catalyst 14, the exhaust purification catalyst 14 is made to quickly rise in temperature by the heat of oxidation reaction of the hydrogen. Therefore, it will be understood that to make the exhaust purification catalyst 14 rise in temperature as quickly as possible, when the temperature TD of the exhaust purification catalyst 14 is lower than the activation temperature TK of the exhaust purification catalyst 14, as shown by the solid line A in FIG. 8B, it is preferable to perform the complete oxidation reaction at the heat and hydrogen generation device 50 to feed only heat to the exhaust purification catalyst 14 and, when the temperature TD of the exhaust purification catalyst 14 becomes higher than the activation temperature TK of the exhaust purification catalyst 14, as shown by the solid line B in FIG. 8B, it is preferable to perform the partial oxidation reforming reaction at the heat and hydrogen generation device 50 to feed heat and hydrogen to the exhaust purification catalyst 14.

However, in actuality, it is difficult to switch the reaction at the heat and hydrogen generation device 50 from the complete oxidation reaction to the partial oxidation reforming reaction at all times when the temperature TD of the exhaust purification catalyst 14 becomes the activation temperature TK as shown in FIG. 8B. Therefore, in the embodiment of the present invention, when the reforming action by the reformer catalyst 54 becomes possible after startup of the heat and hydrogen generation device 50, if the temperature TD of the exhaust purification catalyst 14 is higher than the activation temperature TK of the exhaust purification catalyst 14 shown in FIG. 8B, the reaction at the heat and hydrogen generation device 50 is immediately switched from the complete oxidation reaction to the partial oxidation reforming reaction. On the other hand, when the reforming action by the reformer catalyst 54 becomes possible after startup of the heat and hydrogen generation device 50, if the temperature TD of the exhaust purification catalyst 14 is lower than the activation temperature TK, the complete oxidation reaction is made to continue at the heat and hydrogen generation device 50 until the temperature TD of the exhaust purification catalyst 14 becomes higher than the activation temperature TK, and when the temperature TD of the exhaust purification catalyst 14 becomes higher than the activation temperature TK, the reaction at the heat and hydrogen generation device 50 is switched from the complete oxidation reaction to the partial oxidation reforming reaction. By doing this, it is possible to speed up the warmup of the exhaust purification catalyst 14 the fastest.

That is, in the embodiment of the present invention, when the reforming action by the reformer catalyst 54 becomes possible after the warm-up operation of the heat and hydrogen generation device 50 is completed, if the temperature TD of the exhaust purification catalyst 14 is the preset activation temperature TK or more, the partial oxidation reaction is performed at the heat and hydrogen generation device 50 and the generated heat and hydrogen are fed to the exhaust purification catalyst 14. As opposed to this, when a reforming action by the reformer catalyst 54 becomes possible after the warm-up operation of the heat and hydrogen generation device 50 is completed, if the temperature TD of the exhaust purification catalyst 14 is less than the preset activation temperature TK, the complete oxidation reaction by the lean air-fuel ratio is continued and only heat is fed to the exhaust purification catalyst 14.

Next, referring to FIG. 9, the method of heat and hydrogen generation by the heat and hydrogen generation device 50 shown in FIG. 2 will be explained in brief. Note that this FIG. 9 shows the case where the temperature TD of the exhaust purification catalyst 14 is the preset activation temperature TK or more when the warm-up operation of the heat and hydrogen generation device 50 is completed and the reforming action by the reformer catalyst 54 becomes possible. Further, in this FIG. 9, the operating state of the glow plug 68, the amount of feed of air from the burner 57, the amount of feed of fuel from the burner 57, the $O_2/C$ molar ratio of the air and fuel which are reacted, the temperature of the air fed from the burner 57, the temperature TD of the downstream side end face of the reformer catalyst 54, and the temperature TD of the exhaust purification catalyst 14 are shown. Note that, the target temperatures for the temperature TC of the downstream side end face of the reformer catalyst 54 shown in FIG. 9 etc. and the target temperatures for the temperature of the reformer catalyst 54 are theoretical values, and in the embodiment of the present invention, as explained above, for example, the actual equilibrium reaction temperature TB becomes somewhat lower than the target temperature of 830° C. These target temperatures change depending on the structure of the heat and hydrogen generation device 50 etc. Therefore, in actuality, it is necessary to perform experiments to set in advance the optimum target temperatures corresponding to the structure of the heat and hydrogen generation device 50.

If the engine is started, the heat and hydrogen generation device 50 is simultaneously started. If the heat and hydrogen generation device 50 is started, the glow plug 68 is turned on. Next, air is fed through the high temperature air flow passage 62 to the burner combustion chamber 53. In this case, in FIG. 9, as shown by the broken line, the air can be fed through the high temperature air flow passage 62 to the burner combustion chamber 53, then the glow plug 68 turned on. Next, fuel is injected from the burner 57. If the fuel injected from the burner 57 is ignited by the glow plug 68, the amount of fuel is increased, the $O_2/C$ molar ratio of the air and fuel which are reacted is decreased from 4.0 to 3.0, and burner combustion is started in the burner combustion chamber 53. In the time period from when the feed of fuel is started to when the fuel is ignited, the air-fuel ratio is made a lean air-fuel ratio so as to keep down the amount of generation of HC as much as possible.

Next, burner combustion, that is, the complete oxidation reaction by a lean air-fuel ratio is continued. Due to this, the temperature of the reformer catalyst 54 is gradually made to rise. On the other hand, if burner combustion is started, the temperature of the gas flowing out through the reformer catalyst 54 to the gas outflow chamber 55 gradually rises. Therefore, the temperature of the air heated at the heat exchanger 62a due to this gas also gradually rises and as a result the temperature of the air fed from the high temperature air flow passage 62 to the burner combustion chamber 53 gradually rises. Due to this, the warm-up of the reformer catalyst 54 is promoted. In the embodiment of the present invention, the warm-up of the reformer catalyst 54 performed under a lean air-fuel ratio in this way will be referred to as "primary warmup" as shown in FIG. 9. Note that, in the example shown in FIG. 9, the amount of feed of air and the amount of fuel are increased during this primary warm-up operation.

This primary warm-up operation, that is, the warm-up operation of the heat and hydrogen generation device 50, is continued until the fuel can be reformed at the reformer catalyst 54. In the example shown in FIG. 9, if the temperature TC of the downstream side end face of the reformer catalyst 54 becomes 700° C., it is judged that the fuel can be reformed at the reformer catalyst 54. Therefore, in the example shown in FIG. 9, the primary warm-up operation is continued until the temperature TC of the downstream side end face of the reformer catalyst 54 becomes 700° C. Note that, in the example shown in FIG. 9, as shown in FIG. 9, the $O_2/C$ molar ratio of the air and fuel which are made to react is made 3.0 to 4.0 and the complete oxidation reaction by a lean air-fuel ratio is performed from when operation of the hydrogen generation device 50 is started to when primary warm-up of the reformer catalyst 54 is completed. Of course, at this time, the temperature of the reformer catalyst 54 is considerably lower than the allowable catalyst temperature TX, so the $O_2/C$ molar ratio of the air and fuel which are made to react may also, for example, be made an $O_2/C$ molar ratio close to the stoichiometric air-fuel ratio such as 2.0 to 3.0.

On the other hand, if the engine is started, the temperature TD of the exhaust purification catalyst 14 immediately rises a bit, as shown in FIG. 9. Next, in the example shown in FIG. 9, while the primary warm-up operation, that is, the warm-up operation of the heat and hydrogen generation device 50, is being performed, the temperature TD of the exhaust purification catalyst 14 rises a bit at a time, and the temperature TD of the exhaust purification catalyst 14 exceeds the preset activation temperature TK while the primary warm-up operation is being performed. Even if the temperature TD of the exhaust purification catalyst 14 exceeds the preset activation temperature TK in this way, in the heat and hydrogen generation device 50, the complete oxidation reaction by a lean air-fuel ratio is continued. Next, the temperature TD of the exhaust purification catalyst 14 further rises a bit at a time. In the example shown in FIG. 9, when the temperature TD of the downstream side end face of the reformer catalyst 54 becomes 700° C., the temperature TD of the exhaust purification catalyst 14 becomes the preset activation temperature TK or more.

Next, if the temperature TD of the downstream side end face of the reformer catalyst 54 becomes 700° C., it is judged that fuel can be reformed at the reformer catalyst 54. At this time, the temperature TD of the exhaust purification catalyst 14 becomes the preset activation temperature TK or more, and therefore the partial oxidation reforming reaction for generating hydrogen is started. In the embodiment of the present invention, at this time, as shown in FIG. 9, first, the secondary warm-up operation is performed, and if the secondary warm-up operation is completed, the normal operation is performed. This secondary warm-up operation is performed for generating hydrogen while further making the temperature of the reformer catalyst 54 rise. If the secondary warm-up operation is started, the heat and hydrogen generated at the heat and hydrogen generation device 50 are fed to the exhaust purification catalyst 14. As a result, as shown in FIG. 9, the temperature TD of the exhaust purification catalyst 14 rapidly rises.

On the other hand, this secondary warm-up operation is continued until the temperature TC of the downstream side end face or the reformer catalyst 54 reaches the reaction equilibrium temperature TB and shifts to the normal operation when the temperature TC of the downstream side end face of the reformer catalyst 54 reaches the reaction equilibrium temperature TB. Note that, when the secondary warm-up operation is started, the demanded value of the output heat amount (kW) of the heat and hydrogen generation device 50 required for making the temperature TD of the exhaust purification catalyst 14 rise to the target warm-up temperature is calculated. In this case, the demanded value of this output heat amount (kW) basically is calculated based on the product of the temperature difference between the target warm-up temperature of the exhaust purification catalyst 14 and the current exhaust gas temperature and the amount of exhaust gas discharged from the engine. If the demanded value of the output heat amount (kW) of the heat and hydrogen generation device 50 is calculated, the target fuel feed amount required for generating this demanded output heat amount (kW) is calculated. When the secondary warm-up operation is started, the amount of feed of fuel from the burner 57 is made this target fuel feed amount.

Note that, when the temperature of the exhaust purification catalyst 14 exceeds a fixed temperature, it becomes possible to simultaneously reduce an amount of NC, CO and $NO_x$ contained in the exhaust gas by the exhaust purification catalyst 14 in a state where the air-fuel ratio of the exhaust gas is the stoichiometric air-fuel ratio. Hereinafter, this fixed temperature of the exhaust purification catalyst 14 is called a three way activation temperature TE. This three way activation temperature TE is higher than the activation temperature TK for the oxidation reaction of hydrogen and, as shown in FIG. 9, this three way activation temperature TE is, for example, 180° C. The above-mentioned target warm-up temperature of the exhaust purification catalyst 14 is made slightly higher than the three way activation temperature TE and, in the example shown in FIG. 9, this target warm-up temperature of the exhaust purification catalyst 14 is made for example 220° C. Therefore, in the example shown in FIG. 9, the output heat amount (kW) of the heat and hydrogen generation device 50 required for making the temperature TD of the exhaust purification catalyst 14 rise to 220° C. is made the demanded value. On the other hand, in FIG. 10A, the operating region GG of the heat and hydrogen generation device 50 where this secondary warm-up operation is performed is shown by the hatched region surrounded by the solid lines GL, GU, and GS. Note that in FIG. 10A, the ordinate shows the $O_2/C$ molar ratio of air and fuel which are made to react, while the abscissa shows the temperature TC of the downstream side end face of the reformer catalyst 54.

Figure 10A:
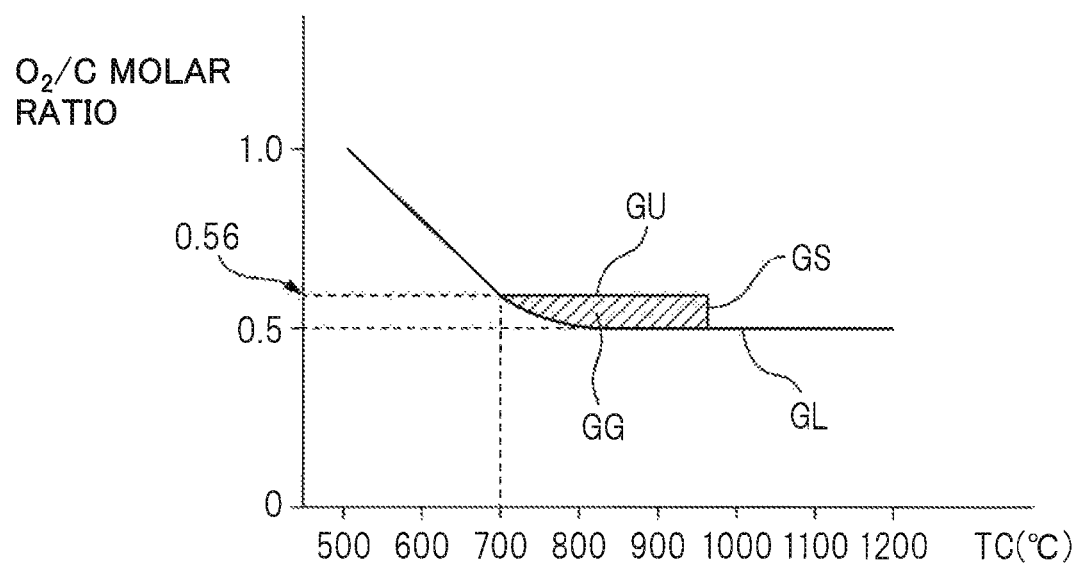
FIGS. 10A and 10B are views showing operation regions where secondary warm-up is performed.

As explained while referring to FIG. 5, if the $O_2/C$ molar ratio between the air and fuel which are made to react becomes smaller than 0.5, coking occurs. The solid line GL in FIG. 10A shows the boundary of the $O_2/C$ molar ratio with respect to the occurrence of coking. In the region where the $O_2/C$ molar ratio is smaller than this boundary GL, coking occurs. Note that, if the temperature of the reformer catalyst 54 becomes lower, even if the $O_2/C$ molar ratio becomes larger, that is, even if the degree of richness of the air-fuel ratio falls, the carbon C will deposit in the pores of the substrate of the reformer catalyst without being oxidized and coking will occur. Therefore, as shown in FIG. 10A, the boundary GL of the $O_2/C$ molar ratio causing coking becomes higher the lower the temperature of the reformer catalyst 54. Therefore, to avoid the occurrence of coking, the partial oxidation reforming reaction, that is, the secondary warm-up operation and the normal operation of the heat and hydrogen generation device 50, is performed on the boundary GL of this $O_2/C$ molar ratio or above the boundary GL.

On the other hand, in FIG. 10A, the solid line GU shows the upper limit guard value of the $O_2/C$ molar ratio for preventing the temperature of the reformer catalyst 54 from exceeding the allowable catalyst temperature TX at the time of the secondary warm-up operation of the heat and hydrogen generation device 50, while the solid line GS shows the upper limit guard value of the temperature TC of the downstream side end face of the reformer catalyst 54 for preventing the temperature of the reformer catalyst 54 from exceeding the allowable catalyst temperature TX at the time of the secondary warm-up operation of the heat and hydrogen generation device 50. After the secondary warm-up operation is started, the $O_2/C$ molar ratio is made 0.5. If the temperature TC of the downstream side end face of the reformer catalyst 54 reaches the reaction equilibrium temperature TB when $O_2/C$ molar ratio=0.5, the operation of the heat and hydrogen generation device 50 is shifted to the normal operation and hydrogen continues to be generated in the state maintaining the temperature TC of the downstream side end face of the reformer catalyst 54 at the reaction equilibrium temperature TB.

Figure 10B:
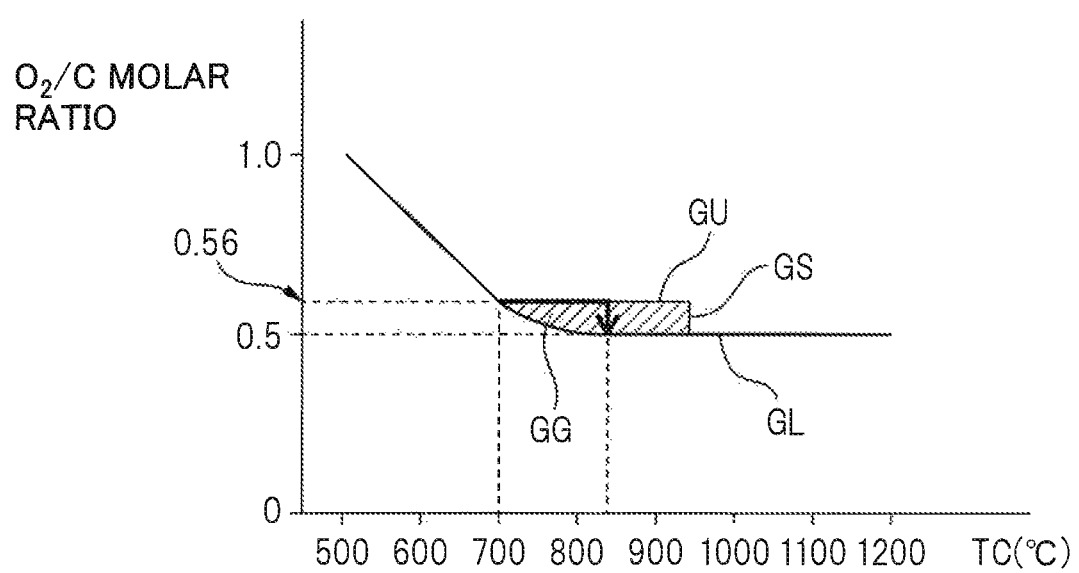

FIG. 10B shows one example of the secondary warm-up operation control until shifting to normal operation. In the example shown in FIG. 10B, as shown by the arrow, if the temperature of the downstream side end face of the reformer catalyst 54 becomes 700° C., to promote the secondary warm-up of the reformer catalyst 54, the partial oxidation reforming reaction is started by the $O_2/C$ molar ratio=0.56, then the partial oxidation reforming reaction is continued by $O_2/C$ molar ratio=0.56 until the temperature TC of the downstream side end face of the reformer catalyst 54 becomes 830° C. Next, if the temperature of the downstream side end face of the reformer catalyst 54 becomes 830° C., the $O_2/C$ molar ratio is made to decrease until $O_2/C$ molar ratio=0.5. Next, if the $O_2/C$ molar ratio=0.5, the reforming reaction at the reformer catalyst 54 becomes the equilibrium state. Next, the $O_2/C$ molar ratio is maintained at 0.5 and the operation of the heat and hydrogen generation device 50 is shifted to the normal operation.

Now, in this way, when the reforming reaction in the reformer catalyst 54 becomes the equilibrium state, if the temperature TA of the air which is made to react with the fuel is high, as explained referring to FIG. 7, the reaction equilibrium temperature TB becomes higher. As a result, the temperature of the reformer catalyst 54 becomes higher than the allowable catalyst temperature TX, so the reformer catalyst 54 degrades under heat. Therefore, in the embodiment of the present invention, when the $O_2/C$ molar ratio is maintained at 0.5 and the reforming reaction at the reformer catalyst 54 is in the equilibrium state, the feed of the high temperature air from the high temperature air flow passage 62 to the burner combustion chamber 53 is stopped and low temperature air is fed from the low temperature air flow passage 63 to the burner combustion chamber 53. At this time, the temperature TC of the downstream side end face of the reformer catalyst 54 is maintained at 830° C., and therefore, the temperature of the reformer catalyst 54 is maintained at the allowable catalyst temperature TX or less. Therefore, it is possible to avoid heat degradation of the reformer catalyst 54 while generating hydrogen by the partial oxidation reforming reaction.

Note that, in the operating region GG shown in FIG. 10A and 10B, when the secondary warm-up operation is being performed, the reforming reaction at the reformer catalyst 54 is not in the equilibrium state, so even if the air temperature TA is high, the temperature of the reformer catalyst 54 does not rise as shown in FIG. 7. However, this secondary warm-up operation is performed in the state of a high temperature of the reformer catalyst 54, so there is a danger of the temperature of the reformer catalyst 54 ending up becoming higher than the allowable catalyst temperature TX due to some reason or other. Therefore, in the embodiment of the present invention, to prevent the temperature of the reformer catalyst 54 from becoming higher than the allowable catalyst temperature TX, at the same time as the secondary warm-up operation is started, the feed of high temperature air from the high temperature air flow passage 62 to the burner combustion chamber 53 is stopped and low temperature air is fed from the low temperature air flow passage 63 to the burner combustion chamber 53. That is, as shown in FIG. 9, the temperature of the feed air is lowered. After that, low temperature air continues to be fed from the low temperature air flow passage 63 to the burner combustion chamber 53 until the normal operation is ended.

As explained above, when the temperature TA of the air which is made to react with the fuel is 25° C., the equilibrium reaction temperature TB when the $O_2/C$ molar ratio=0.5 becomes 830° C. Therefore, generally speaking, when the temperature of the air which is made to react with the fuel is TA° C., the equilibrium reaction temperature TB when the $O_2/C$ molar ratio=0.5 becomes (TA+805° C.) Therefore, in the embodiment of the present invention, when the temperature of the air which is made to react with the fuel is TA, if the secondary warm-up operation is started, the partial oxidation reforming reaction is continued by the $O_2/C$ molar ratio=0.56 until the temperature TC of the downstream side end face of the reformer catalyst 4 becomes (TA+805° C.) Next, when the temperature TC of the downstream side end face of the reformer catalyst 54 becomes (TA+805° C.), the $O_2/C$ molar ratio is decreased down to the $O_2/C$ molar ratio=0.5. Next, if the $O_2/C$ molar ratio=0.5, the $O_2/C$ molar ratio is maintained at 0.5.

Note that, the temperature TA of the air which is made to react with the fuel explained above means the temperature of the air used when calculating the equilibrium reaction temperature TB such as shown in FIG. 4 and is the temperature of air not affected by the heat of reaction of the burner combustion in the burner combustion chamber 53. For example, the air fed from the air feed port 61 or the air inside the air chamber 60 is affected by the heat of reaction of the burner combustion. These airs absorb the energy of the heat of reaction of the burner combustion and rise in temperature. Therefore, the temperature of these airs shows the temperature of the air already in the reaction process. Therefore, it is not the temperature of the air when calculating the equilibrium reaction temperature TB.

In this regard, it becomes necessary to calculate the equilibrium reaction temperature TB when the partial oxidation reforming reaction is being performed, that is, when low temperature air is being fed from the low temperature air flow passage 63 to the burner combustion chamber 53. Therefore, in the embodiment of the present invention, to detect the temperature of the air not affected by the heat of reaction of the burner combustion in the burner combustion chamber 53, as shown in FIG. 2, the temperature sensor 73 is arranged at the low temperature air flow passage 63 positioned at the outside of the heat insulating material 56. The temperature detected by this temperature sensor 73 is used as the temperature TA of the air when calculating the equilibrium reaction temperature TB.

On the other hand, if a stop instruction is issued, as shown in FIG. 9, the feed of fuel is stopped. At, this time, if stopping the feed of air, there is the danger of the reformer catalyst 54 suffering from coking due to the fuel remaining inside the heat and hydrogen generation device 50. Therefore, in the embodiment of the present invention, to burn away the fuel remaining inside the heat and hydrogen generation device 50, as shown in FIG. 9, air continues to be fed for a while after a stop instruction is issued.

In this way, in the embodiment of the present invention, to prevent the temperature of the reformer catalyst 54 from becoming higher than the allowable catalyst temperature TX, at the same time as the secondary warm-up operation is started, the feed of high temperature air from the high temperature air flow passage 62 to the burner combustion chamber 53 is stopped and low temperature air is fed from the low temperature air flow passage 63 to the burner combustion chamber 53. In another manner of speaking, at this time, the air flow route for feeding air to the burner combustion chamber 53 is switched from the high temperature air flow route for feeding high temperature air to the low temperature air flow route for feeding low temperature air. To make it possible to switch the air flow route for feeding air to the burner combustion chamber 53 between the high temperature air flow route and the low temperature air flow route in this way, in the embodiment of the present invention, a switching device comprised of the high temperature air valve 65 and the low temperature air valve 66 is provided. In this case, in the embodiment of the present invention, the air flow route from the air cleaner 67 through the high temperature air flow passage 62 to the air feed port 61 corresponds to the high temperature air flow route, while the air flow route from the air cleaner 67 through the low temperature air flow passage 63 to the air feed port 61 corresponds to the low temperature air flow route.

Next, referring to FIG. 11, the case where, when the warm-up operation of the heat and hydrogen generation device 50 is completed and the reforming action by the reformer catalyst 54 becomes possible, the temperature TD of the exhaust purification catalyst 14 is less than the preset activation temperature TK will be explained. Note that, in this FIG. 11, in the same way as FIG. 9, the operating state of the glow plug 68, the amount of feed of air from the burner 57, the amount of feed of fuel from the burner 57, the $O_2/C$ molar ratio of the air and fuel which are made to react, the temperature of the air fed from the burner 57, the temperature TC of the downstream side end face of the reformer catalyst 54, and the temperature TD of the exhaust purification catalyst 14 are shown.

Figure 11:
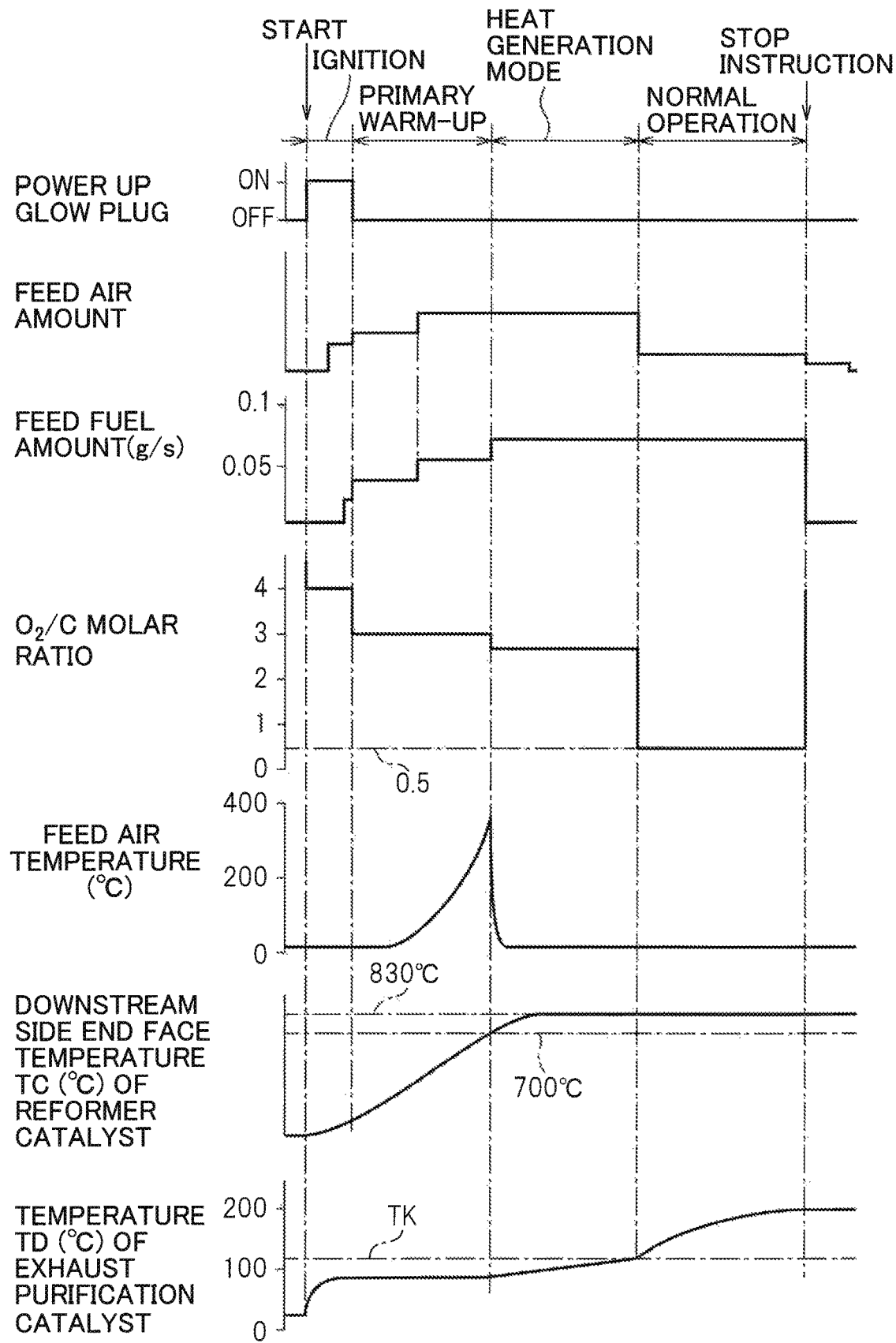
FIG. 11 is a time chart showing heat and hydrogen generation control.

Referring to FIG. 11, even in the case shown in FIG. 11, if the engine is started up, the heat and hydrogen generation device 50 is simultaneously started up. If the engine is started up, the temperature TD of the exhaust purification catalyst 14 immediately rises slightly. Next, while the primary warm-up operation is being performed, that is, while the complete oxidation reaction by a lean air-fuel ratio is continuing in the heat and hydrogen generation device 50, the temperature TD of the exhaust purification catalyst 14 rises a bit at a time. However, in the example shown in FIG. 11, unlike the case shown in FIG. 9, when a reforming action by the reformer catalyst 54 becomes possible, that is, when the temperature TC of a downstream side end face of the reformer catalyst 54 becomes 700° C., the temperature TD of the exhaust purification catalyst 14 is still maintained at less than the preset activation temperature TK.

Note that, the operating state of the glow plug 68, the change of the amount of feed of air from the burner 57, the change of the amount of feed of fuel from the burner 57, the change of the $O_2/C$ molar ratio, the change of the temperature of the air feed from the burner 57, and the change of the temperature TC of the downstream side end face of the reformer catalyst 54, which are shown in FIG. 11 at the time from when the heat and hydrogen generation device 50 is started to operate until the primary warm-up operation is ended, are the same as the case shown in FIG. 9. Therefore, the explanation of the operating state of the glow plug 68, the change of the amount of feed of air from the burner 57, the change of the amount of feed of fuel from the burner 57, the change of the $O_2/C$ molar ratio, the change of the temperature of the air feed from the burner 57, and the change of the temperature TC of the downstream side end face of the reformer catalyst 54, which are shown in FIG. 11 at the time from when the heat and hydrogen generation device 50 is started to operate until the primary warm-up operation, that is, the warm-up operation of the heat and hydrogen generation device 50, is ended, will be omitted.

Now, as shown in FIG. 11, when the reforming action by the reformer catalyst 54 becomes possible, that is, when the temperature TC of the downstream side end face of the reformer catalyst 54 becomes 700° C., if the temperature TD of the exhaust purification catalyst 14 is less than the preset activation temperature TK, the complete oxidation reaction by a lean air-fuel ratio is continued. At this time, only heat is fed from the heat and hydrogen generation device 50 to the exhaust purification catalyst 14 whereby the temperature TD of the exhaust purification catalyst 14 is made to rise a bit at a time. This complete oxidation reaction by a lean air-fuel ratio is continued until the temperature TD of the exhaust purification catalyst 14 reaches the preset activation temperature TK. Note that, in the embodiment of the present invention, the operation mode when the complete oxidation reaction by a lean air-fuel ratio is performed from when the temperature TC of the downstream side end face of the reformer catalyst 54 reaches 700° C. to when the temperature TD of the exhaust purification catalyst 14 reaches the preset activation temperature TK will be called the "heat generation mode" as shown in FIG. 11.

As shown in FIG. 11, when the operation mode is the heat generation mode, the complete oxidation reaction is performed by a lean air-fuel ratio of an. $O_2/C$ molar ratio–2.6. Note that, even in the case shown in FIG. 11, when the operation mode is made the heat generation mode, the demanded value of the output heat amount (kW) of the heat and hydrogen generation device 50 required for making the temperature TD of the exhaust purification catalyst 14 rise to the target warm-up temperature is calculated, then the target fuel feed amount required for generating the demanded output heat amount (kW) is calculated. In the example shown in FIG. 11, when the operation mode is made the heat generation mode, the amount of feed of fuel from the burner 57 is increased to this target fuel feed amount as shown in FIG. 11.

On the other hand, when the operation mode is made the heat generation mode, as will be understood from FIG. 11, the reforming action at the reformer catalyst 54 is not in the equilibrium state, so even if the air temperature TA is high, the temperature of the reformer catalyst 54 does not rise as shown in FIG. 7. However, at the time of the heat generation mode, the complete oxidation reaction by a lean air-fuel ratio is being performed in the state of a high temperature of the reformer catalyst 54, so there is the danger of the temperature of the reformer catalyst 54 ending up becoming higher than the allowable catalyst temperature TX for some reason or another. Therefore, in the embodiment of the present invention, to prevent the temperature of the reformer catalyst 54 from becoming higher than the allowable catalyst temperature TX, at the same time as the operation mode is made the heat generation mode, the feed of high temperature air from the high temperature air flow passage 62 to the burner combustion chamber 53 is stopped and low temperature air is fed from the low temperature air flow passage 63 to the burner combustion chamber 53. That is, as shown in FIG. 11, the temperature of the air feed is made to decrease.

After that, low temperature air continues to be fed from the low temperature air flow passage 63 to the burner combustion chamber 53.

On the other hand, when the operation mode is made the heat generation mode, if the temperature TD of the exhaust purification catalyst 14 reaches the preset activation temperature TK, the $O_2/C$ molar ratio is changed from 2.6 to 0.5 and the normal operation is started. At this time, the partial oxidation reforming reaction is performed by the $O_2/C$ molar ratio=0.5 and the heat and hydrogen generated at the heat and hydrogen generation device 50 are fed to the exhaust purification catalyst 14. As a result, as shown in FIG. 11, the temperature TD of the exhaust purification catalyst 14 is made to rapidly rise until the target warm-up temperature. Next, if a stop instruction is issued, as shown in FIG. 11, the feed of fuel is stopped then, after a while, the feed of air is stopped.

Next, the heat and hydrogen generation control routine shown from FIG. 12 to FIG. 15 will be explained. This heat and hydrogen generation control routine is performed when the starter switch 43 of the engine shown in FIG. 1 is turned on or when during engine operation, the temperature of the reformer catalyst 54 falls, for example, from the target warm-up temperature. Note that, the starter switch 43 of the engine sometimes is manually turned on by the driver and sometimes is automatically turned on like in a hybrid vehicle using an engine and electric motor as a drive source.

Figure 12:
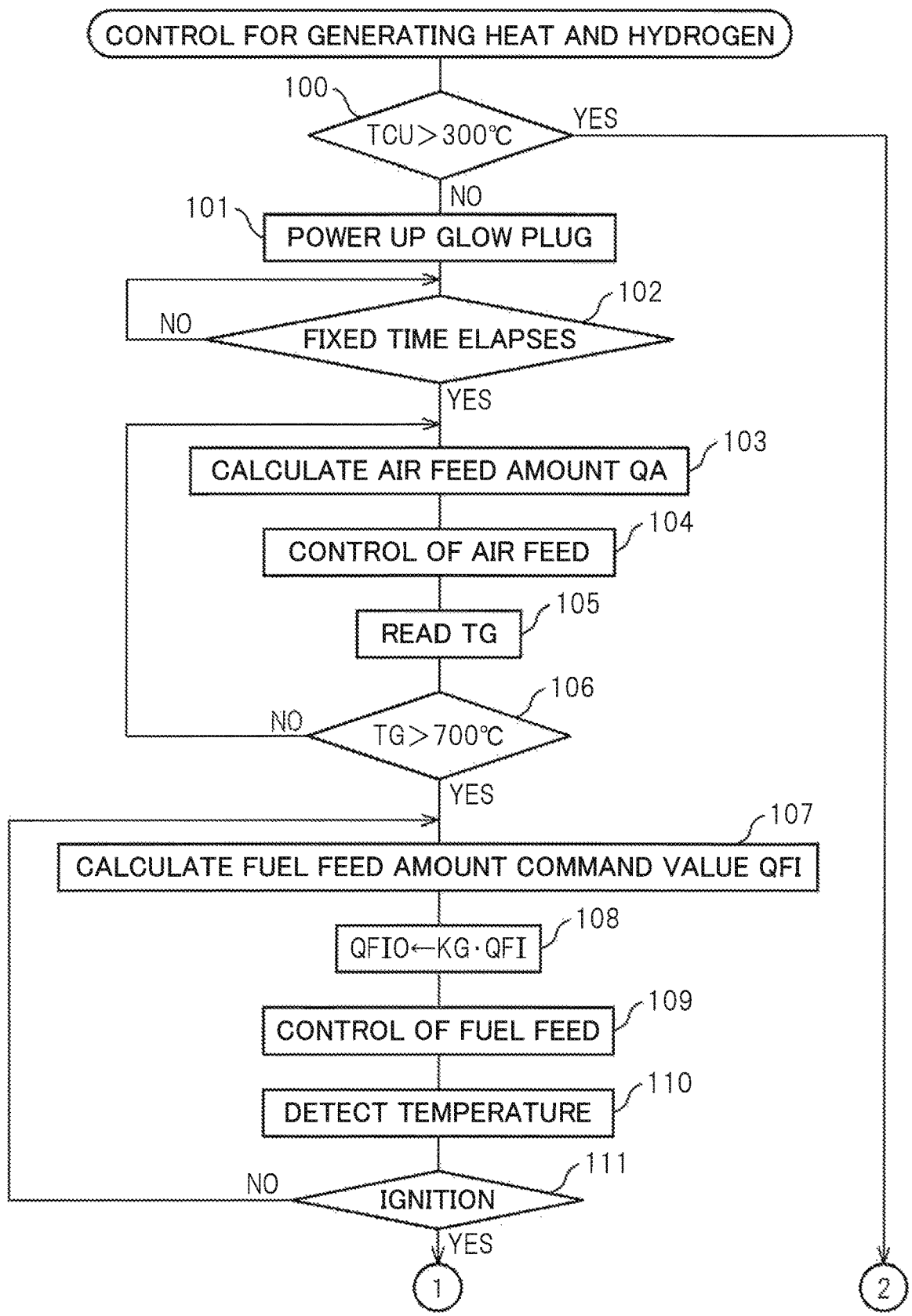
FIG. 12 is a flow chart for heat and hydrogen generation control.
Figure 13:
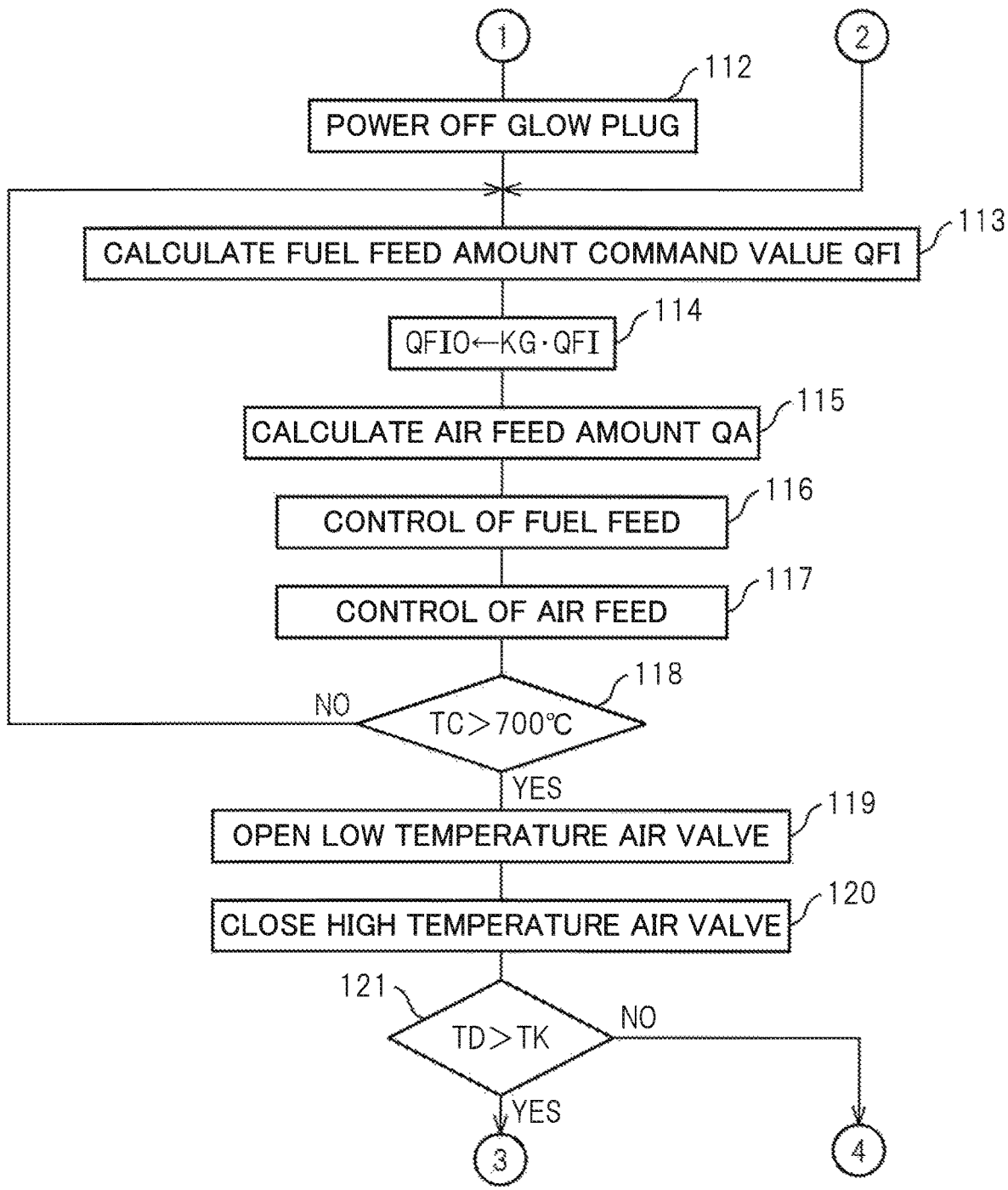
FIG. 13 is a flow chart for heat and hydrogen generation control.

If the heat and hydrogen generation control routine is performed, first, at step 100 of FIG. 12, it is judged based on the output signal of the temperature sensor 71 if the temperature TCU of the upstream side end face of the reformer catalyst 54 is a temperature at which an oxidation reaction can be performed on the upstream side end face of the reformer catalyst 54, for example, 300° C. or more. If the temperature TCU of the upstream side end face of the reformer catalyst 54 is 300° C. or less, the routine proceeds to step 101 where the glow plug 68 is turned on. Next, at step 102, it is judged if a fixed time has elapsed from when the glow plug 68 was turned on. When the fixed time has elapsed, the routine proceeds to step 103.

At step 103, the target feed air amount QA at the time of start and igniting operation is calculated. This target feed air amount QA is stored in the ROM 32 in advance. Next, at step 104, a pump drive electric power which is necessary for discharging this target feed air amount QA from the air pump 64 is supplied to the air pump 64, and air of the target feed air amount QA is discharged from the air pump 64. At this time, air discharged from the air pump 64 is fed through the high temperature air flow passage path 62 to the burner combustion chamber 53. Note that, when the operation of the heat and hydrogen generation device 50 is stopped, the high temperature air valve 65 is opened and the low temperature air valve 66 is closed. Therefore, when the heat and hydrogen generation device 50 is made to operate, air is fed through the high temperature air flow passage 62 to the burner combustion chamber 53.

Next, at step 105, the temperature TG of the glow plug 68 is calculated train the resistance value of the glow plug 68. Next, at step 106, it is judged if the temperature TG of the glow plus 68 exceeds 700° C. When it is judged that the temperature TG of the glow plug 68 does not exceed 700° C., the routine returns to step 103. As opposed to this, when it is judged that the temperature TG of the glow plug 68 exceeds 700° C., it is judged that ignition is possible and the routine proceeds to step 107.

At step 107, the fuel injection amount command value QFI, for example, the fuel injection valve drive voltage or the fuel injection valve drive electric current which is necessary to inject fuel from the fuel injector 58 with the target feed fuel amount QF at the time of start and igniting operation is calculated. The relationship between the fuel injection amount command value QFI and the target feed fuel amount QF is stored in the ROM 32 in advance. Next, at step 108, by multiplying the fuel injection amount command value QFI with a learning value KG, the final fuel injection amount command value QFIO(=KG·QFI) is calculated. Note that, this learning value KG will be explained later. Next, at step 109, the amount of fuel which corresponds to the final fuel injection amount command value QFIO is injected into the burner combustion chamber 53 from the fuel injector 58. Next, at step 110, based on the output signal of the temperature sensor 71, the temperature TCU of the upstream side end face of the reformer catalyst 54 is detected. Next, at step 111, it is judged from the output signal of the temperature sensor 71 if the fuel has been ignited.

If the fuel is ignited, the temperature TCU of the upstream side end face of the reformer catalyst 54 instantaneously rises. Therefore, from the output signal of the temperature sensor 71, it becomes possible to judge if the fuel has been ignited. When at step 111 it is judged that the fuel has not been ignited, the routine returns to step 107, while when at step 111 it is judged that the fuel has been ignited, the routine proceeds to step 112 where the glow plug 68 is turned off. Next, the routine proceeds to step 113. Note that, if the fuel has been ignited, the temperature TCD at the upstream side end face of the reformer catalyst 54 immediately becomes a temperature at which an oxidation reaction can be performed on the upstream side end face of the reformer catalyst 54, for example, 300° C. or more. On the other hand, when at step 100 it is judged that the temperature TCU at the upstream side end face of the reformer catalyst 54 is 300° C. or more, the routine proceeds to step 113.

At step 113 to step 118, a primary warm-up operation is performed. That is, at step 113, the fuel injection amount command value QFI which is necessary to inject fuel from the fuel injector 58 with the target feed fuel amount QF at the time of the primary warm-up operation is calculated. The relationship between the fuel injection amount command value QFI and the target feed fuel amount QF at the time of the primary warm-up operation is stored in the ROM 32 in advance. Next, at step 114, by multiplying the fuel injection amount command value QFI with the learning value KG, the final fuel injection amount command value QFIO (=KG·QFI) is calculated. Next, at step 115, the target feed air amount QA which is necessary to make the $O_2/C$ molar ratio to 3.0 is calculated from the target feed fuel amount QF at the time of the primary warm-up operation. Next, at step 116, the amount of fuel which corresponds to this final fuel injection amount command value GFIO is injected into the burner combustion chamber 53 from the fuel injector 58. Next, at step 117, a pump drive electric power which is necessary to discharge the target feed air amount QA at the time of the primary warm-up operation from the air pump 64 is supplied to the air pump 64, and air of the target feed air amount QA is discharged from the air pump 64.

Note that, in the embodiment of the present invention, when this primary warm-up operation is being performed, as shown in FIG. 9 and FIG. 11, the feed air amount and the feed fuel amount are increased in stages. Next, at step 118, it is judged based on the output signal of the temperature sensor 72 if the temperature TC of the downstream side end face of the reformer catalyst 54 exceeds 700° C. When it is judged that the temperature TC of the downstream side end face of the reformer catalyst 4 does not exceed 700° C., the routine returns to step 113 where the primary warm-up operation is continued. As opposed to this, when it is judged that the temperature TC of the downstream side end face of the reformer catalyst 54 exceeds 700° C., the routine proceeds to step 119. At step 119, the low temperature air valve 66 is opened, while at step 120, the high temperature air valve 65 is closed. Therefore, at this time, air is fed through the low temperature air flow passage 63 to the burner combustion chamber 53. Next, the routine proceeds to step 121.

At step 121, it is judged based on the output signal of the temperature sensor 25 if the temperature TD of the exhaust purification catalyst 14 is higher than the activation temperature TK. When at step 121 it is judged that the temperature TD of the exhaust purification catalyst 14 is higher than the activation temperature TK, the routine proceeds to step 122 where, as shown in FIG. 9, the secondary warm-up operation is started. That is, at step 122, the $O_2/C$ molar ratio at the heat and hydrogen generation device 50 is controlled so that the $O_2/C$ molar ratio becomes 0.56. This control of the $O_2/C$ molar ratio is executed by using the control routine shown in FIG. 16.

Figure 16:
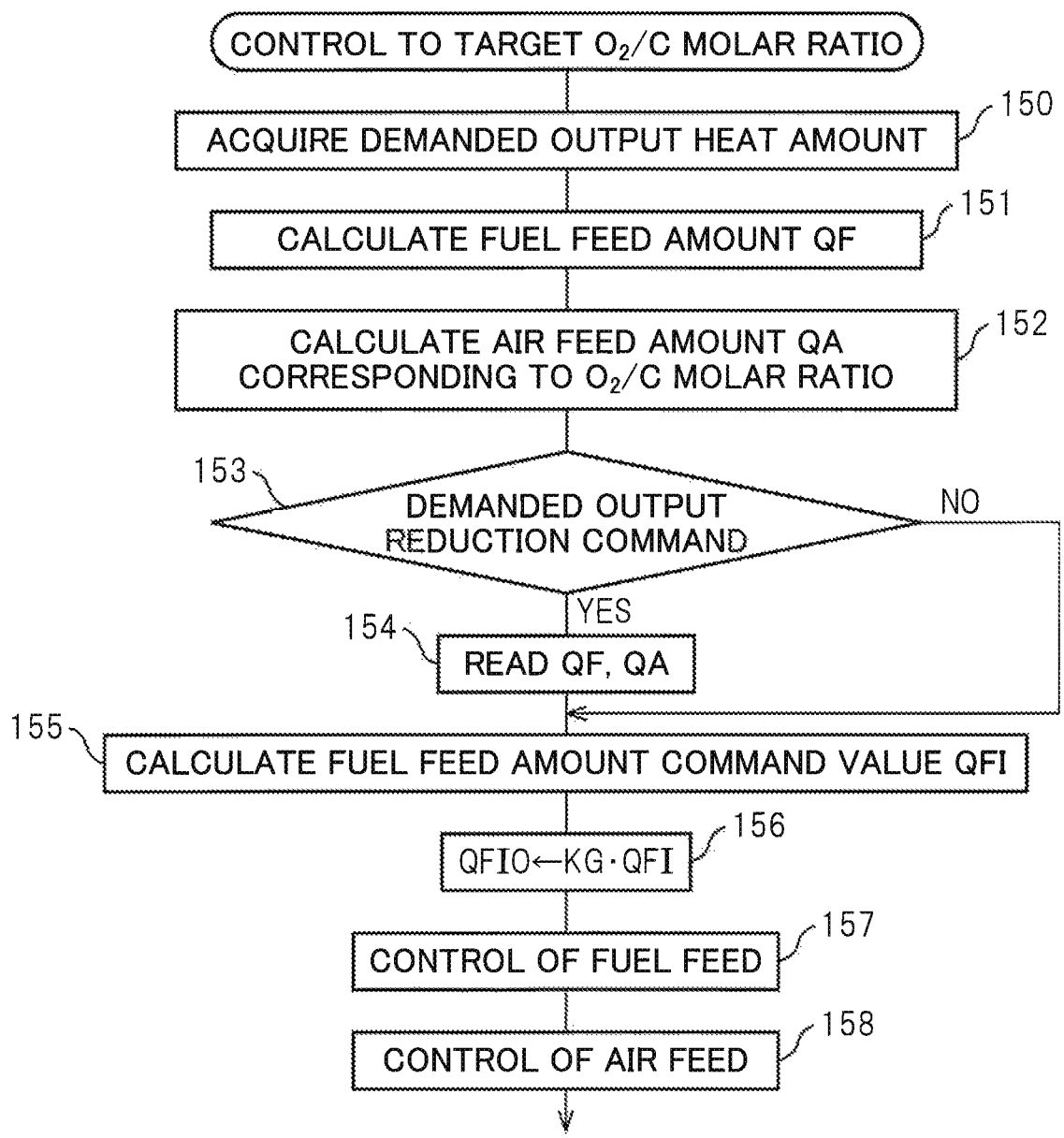
FIG. 16 is a flow chart for controlling an $O_2/C$ molar ratio to the target $O_2/C$ molar ratio.

Referring to FIG. 16, first, at step 150, the demanded value of the output heat amount (kW) of the heat and hydrogen generation device 50 required for making the temperature TD of the exhaust purification catalyst 14 rise to the target warm-up temperature is calculated. Next, at step 151, the target feed fuel amount QF required for generating this demanded value of the output heat amount (kW) is calculated. Next, at step 152, the target feed air amount QA which is necessary to make the $O_2/C$ molar ratio to the target $O_2/C$ molar ratio is calculated from this target feed fuel amount QF. Note that, when, at step 122 of FIG. 14, the control of the $O_2/C$ molar ratio is executed by using the control routine shown in FIG. 16, the target $O_2/C$ molar ratio is made 0.56. Next, at step 153, it is judged if the demanded output lowering command indicating that the demanded value of the output heat amount (kW) of the heat and hydrogen generation device 50 should be lowered is issued. This demanded output lowering command will be explained later. This demanded output lowering command normally is not issued, and accordingly, the routine normally jumps from step 153 to step 155.

At step 155, the fuel injection amount command value QFI which is necessary to inject fuel from the fuel injector 58 with the target feed fuel amount QF calculated at step 150 is calculated. The relationship between this fuel injection amount command value QFI and this target feed fuel amount QF is stored in the ROM 32 in advance. Next, at step 156, by multiplying this fuel injection amount command value QFI with the learning value KG, the final fuel injection amount command value QFIO (=KG·QFI) is calculated. Next, at step 157, the amount of fuel which corresponds to this final fuel injection amount command value QFIO is injected into the burner combustion chamber 53 from the fuel injector 58. Next, at step 158, a pump drive electric power which is necessary to discharge the target feed air amount QA calculated at step 152 from the air pump 64 is supplied to the air pump 64, and air of the target feed air amount QA is discharged from the air pump 64. At this time, the partial oxidation reforming reaction is started, and heat and hydrogen are produced at the heat and hydrogen generation device 50. Next, the routine proceeds to step 123 of FIG. 14.

Figure 14:
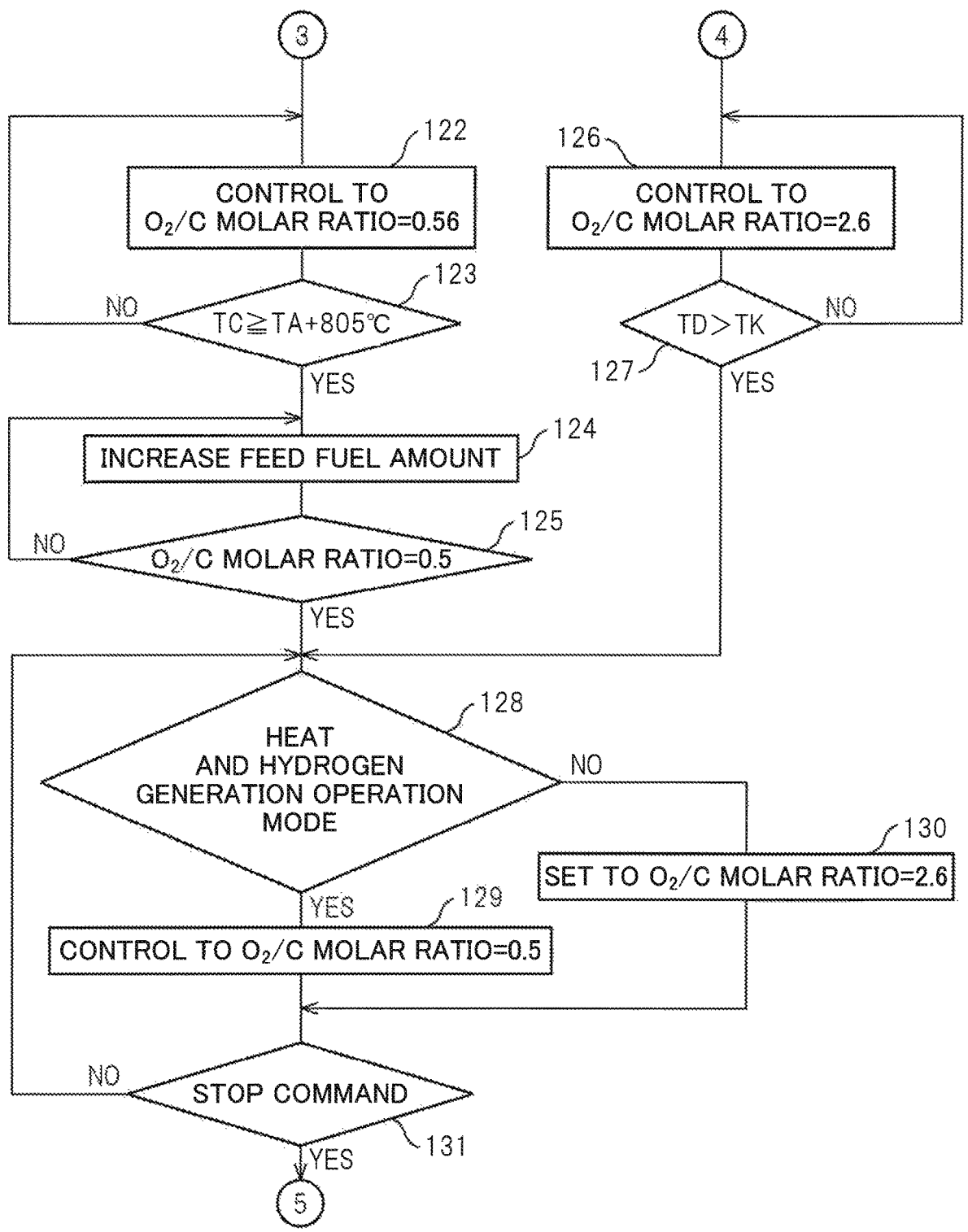
FIG. 14 is a flow chart for heat and hydrogen generation control.
Figure 15:
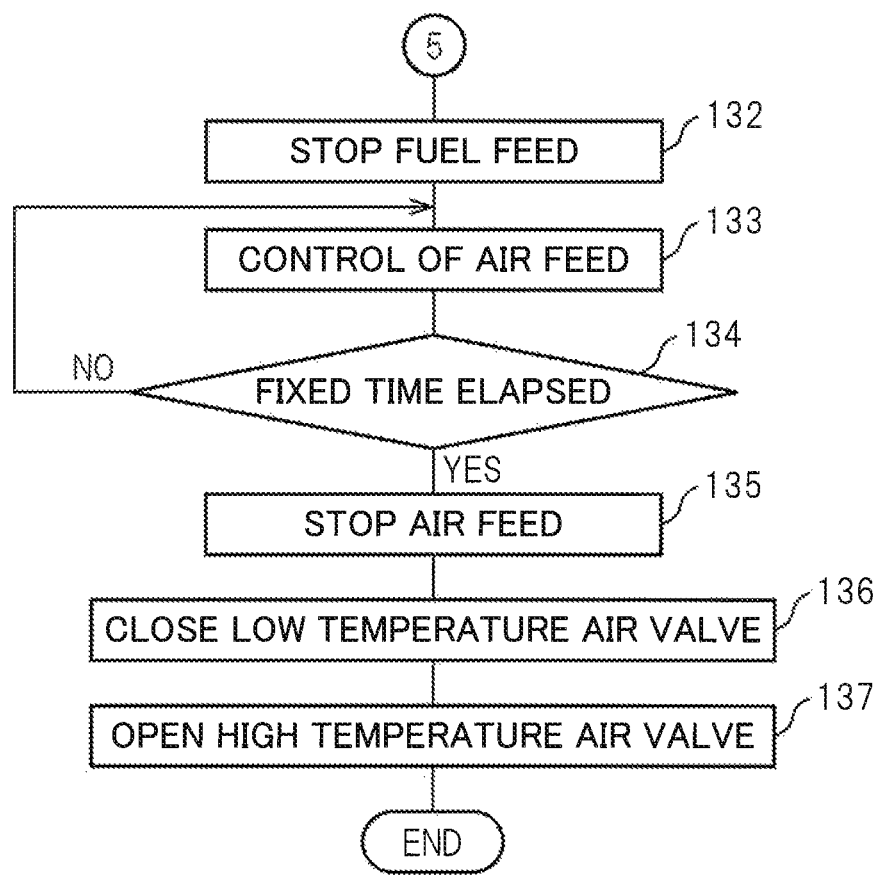
FIG. 15 is a flow chart for heat and hydrogen generation control.

At step 123 of FIG. 14, it is judged if the temperature TC of the downstream side end face of the reformer catalyst 54 reaches the sum (TA+805° C.) of the air temperature TA detected by the temperature sensor 73 and 805° C. As explained above, this temperature (TA+805° C.) shows the reaction equilibrium temperature TB when the partial oxidation reforming reaction is performed by an $O_2/C$ molar ratio=0.5 when the air temperature is TA° C. Therefore, at step 123, it is judged if the temperature TC of the downstream side end face of the reformer catalyst 54 reaches the reaction equilibrium temperature (TA+805° C.)

When it is judged that the temperature TC of the downstream side end face of the reformer catalyst 54 does not reach the reaction equilibrium temperature (TA+805° C.), the routine returns to step 122 where the $O_2/C$ molar ratio continues to be controlled so that the $O_2/C$ molar ratio becomes 0.56 by using the control routine shown FIG. 16. As opposed to this, when at step 123 it is judged that the temperature TC of the downstream side end face of the reformer catalyst 54 reaches the reaction equilibrium temperature (TA+805° C.), the routine proceeds to step 124 wherein in the state where the amount of discharge of the air pump 15 is maintained constant, the amount of fuel injection is gradually increased until the target feed fuel amount which is necessary to make the $O_2/C$ molar ratio 0.5. As a result, the $O_2/C$ molar ratio gradually decreases. Next, at step 125, it is judged if the $O_2/C$ molar ratio becomes 0.5. When it is judged that the $O_2/C$ molar ratio does not become 0.5, the routine returns to step 124. As opposed to this, when at step 125 it is judged that the $O_2/C$ molar ratio becomes 0.5, it is judged that the secondary warm-up operation is ended. When it is judged that the secondary warm-up operation is ended, the routine proceeds to step 128 where normal operation is performed.

On the other hand, when at step 121 it is judged that the temperature TD of the exhaust purification catalyst 14 is less than the activation temperature TK, the routine proceeds to step 126 where, as shown in FIG. 11, the operation mode is made the heat generation mode. That is, at step 126, the $O_2/C$ molar ratio is controlled so that the $O_2/C$ molar ratio becomes the target $O_2/C$ molar ratio of 2.6 by using the control routine shown FIG. 16. At this time, the amount of fuel which corresponds to the final fuel injection amount command value QFIO calculated by the control routine shown in FIG. 16 is injected into the burner combustion chamber 53 from the fuel injector 58, and air is discharged from the air pump 64 with the target feed air amount QA calculated by the control routine shown in FIG. 16. At this time, the complete oxidation reaction is continued under a lean air-fuel ratio of the $O_2/C$ molar ratio=2.6 and only heat is fed to the exhaust purification catalyst 14. Next, at step 127, it is judged if the temperature TD of the exhaust purification catalyst 14 reaches the activation temperature TK. When the temperature TD of the exhaust purification catalyst 14 does not reach the activation temperature TK, the routine returns to step 126. As opposed to this, when at step 127 it is judged that the temperature TD of the exhaust purification catalyst 14 reaches the activation temperature TK, the routine proceeds to step 128 where the normal operation is performed.

In this regard, in the embodiment of the present invention, as the operation modes at the time of the normal operation, two operation modes: a heat and hydrogen generation operation mode and a heat generation operation mode, can be selected. The heat and hydrogen generation operation mode is an operation mode where the partial oxidation reforming reaction is performed by the $O_2/C$ molar ratio=0.5. In this heat and hydrogen generation operation mode, heat and hydrogen are generated. On the other hand, the heat generation operation mode is for example an operation mode where the complete oxidation reaction is performed by the $O_2/C$ molar ratio=2.6. In this heat generation operation mode, hydrogen is not generated. Only heat is generated. These heat and hydrogen generation operation mode and heat generation operation mode are selectively used in accordance with need.

Namely, at step 128, it is judged if the mode is the heat and hydrogen generation operation mode. When at step 128 it is judged that the mode is the heat and hydrogen generation operation mode, the routine proceeds to step 129 where the $O_2/C$ molar ratio is controlled so that the $O_2/C$ molar ratio becomes 0.5 by using the control routine shown FIG. 16. At this time, the amount of fuel which corresponds to the final fuel injection amount command value QFIO calculated by the control routine shown in FIG. 16 is injected into the burner combustion chamber 53 from the fuel injector 58, and air is discharged from the air pump 64 with the target feed air amount QA calculated by the control routine shown in FIG. 16. At this time, the partial oxidation reforming reaction is performed under a rich air-fuel ratio of the $O_2/C$ molar ratio=0.5, and heat and hydrogen are fed to the exhaust purification catalyst 14. Next, the routine proceeds to step 131.

On the other hand, when at step 128 it is judged that the mode is not the heat and hydrogen generation operation mode, that is, when it is judged that the mode is the heat generation operation mode, the routine proceeds to step 130 where the $O_2/C$ molar ratio is controlled so that the $O_2/C$ molar ratio becomes 2.6 by using the control routine shown. FIG. 16. At this time, the amount of fuel which corresponds to the final fuel injection amount command value QFIO calculated by the control routine shown in FIG. 16 is injected into the burner combustion chamber 53 from the fuel injector 58, and air is discharged from the air pump 64 with the target feed air amount QA calculated by the control routine shown in FIG. 16. At this time, the complete oxidation reaction is performed under a lean air-fuel ratio of the $O_2/C$ molar ratio=2.6, and only heat is fed to the exhaust purification catalyst 14. Next, the routine proceeds to step 131.

At step 131, it is judged if the operation of the heat and hydrogen generation device 50 should be stopped. In this case, in the embodiment of the present invention, when the normal operation is continued for a fixed time period, when the temperature TD of the exhaust purification catalyst 14 reaches the target warm-up temperature, or when an instruction for stopping operation of the heat and hydrogen generation device 50 is issued for another reason, it is judged that operation of the heat and hydrogen generation device 50 should be stopped. When at step 131 it is judged that operation of the heat and hydrogen generation device 50 should not be stopped, the routine returns to step 128 where the normal operation is continued.

As opposed to this, when at step 131 it is judged that the operation of the heat and hydrogen generation device 50 should be stopped, the routine proceeds to step 132 where fuel injection from the burner 57 is stopped. Next, at step 133, to burn off the remaining fuel, air continues to be fed from the air pump 64. Next, at step 134, it is judged if a fixed time has elapsed. When it is judged that the fixed time has not elapsed, the routine returns to step 133. As opposed to this, when at step 134 it is judged that the fixed time has elapsed, the routine proceeds to step 135 where operation of the air pump 65 is stopped and the feed of air to the burner combustion chamber 53 is stopped. Next, at step 136, the low temperature air valve 66 is closed while, at step 137, the high temperature air valve 65 is opened. Next, while the operation of the heat and hydrogen generation device 50 is being made to stop, the low temperature air valve 66 continues closed and the high temperature air valve 65 continues open.

Figure 17:
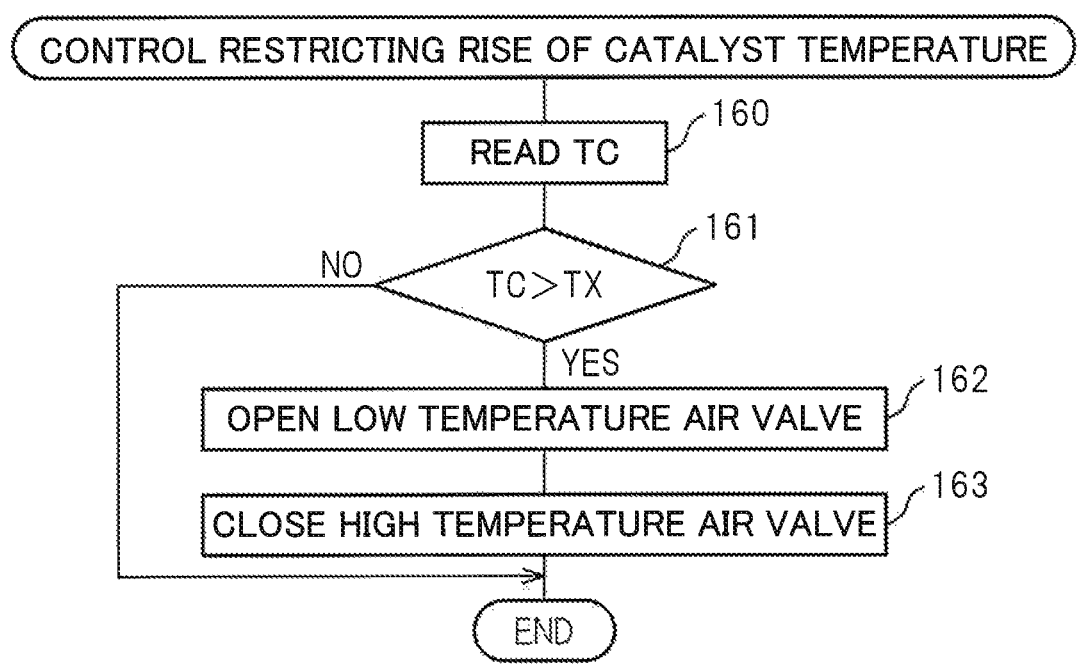
FIG. 17 is a flow chart for control for restricting the rise of the catalyst temperature.

Next, referring to FIG. 17, the control routine for restricting the rise of the catalyst temperature will be explained. This routine is executed by interruption every fixed time interval. Referring to FIG. 17, first, at step 160, the temperature TC of the downstream side end face of the reformer catalyst 54 detected by the temperature sensor 72 is read. Next, at step 161, it is judged if the temperature TC of the downstream side end face of the reformer catalyst 54 exceeds the allowable catalyst temperature TX. When it is judged that the temperature TC of the downstream side end face of the reformer catalyst 54 does not exceed the allowable catalyst temperature TX, the processing cycle is ended.

As opposed to this, when at step 161 it is judged that the temperature TC of the downstream side end face of the reformer catalyst 54 exceeds the allowable catalyst temperature TX, the routine proceeds to step 162 where the low temperature air valve 66 is opened. Next, at step 163, the high temperature air valve 65 is closed. Next, the processing cycle is ended. That is, during operation of the heat and hydrogen generation device 50, when the temperature TC of the downstream side end face of the reformer catalyst 54 exceeds the allowable catalyst temperature TX, the air flow route for feeding air to the burner combustion chamber 53 is switched from the high temperature air flow route for feeding high temperature air to the low temperature air flow route for feeding low temperature air, and thereby the temperature of the burner combustion-use air fed to the burner combustion chamber 53 is made to fall.

Figure 18:
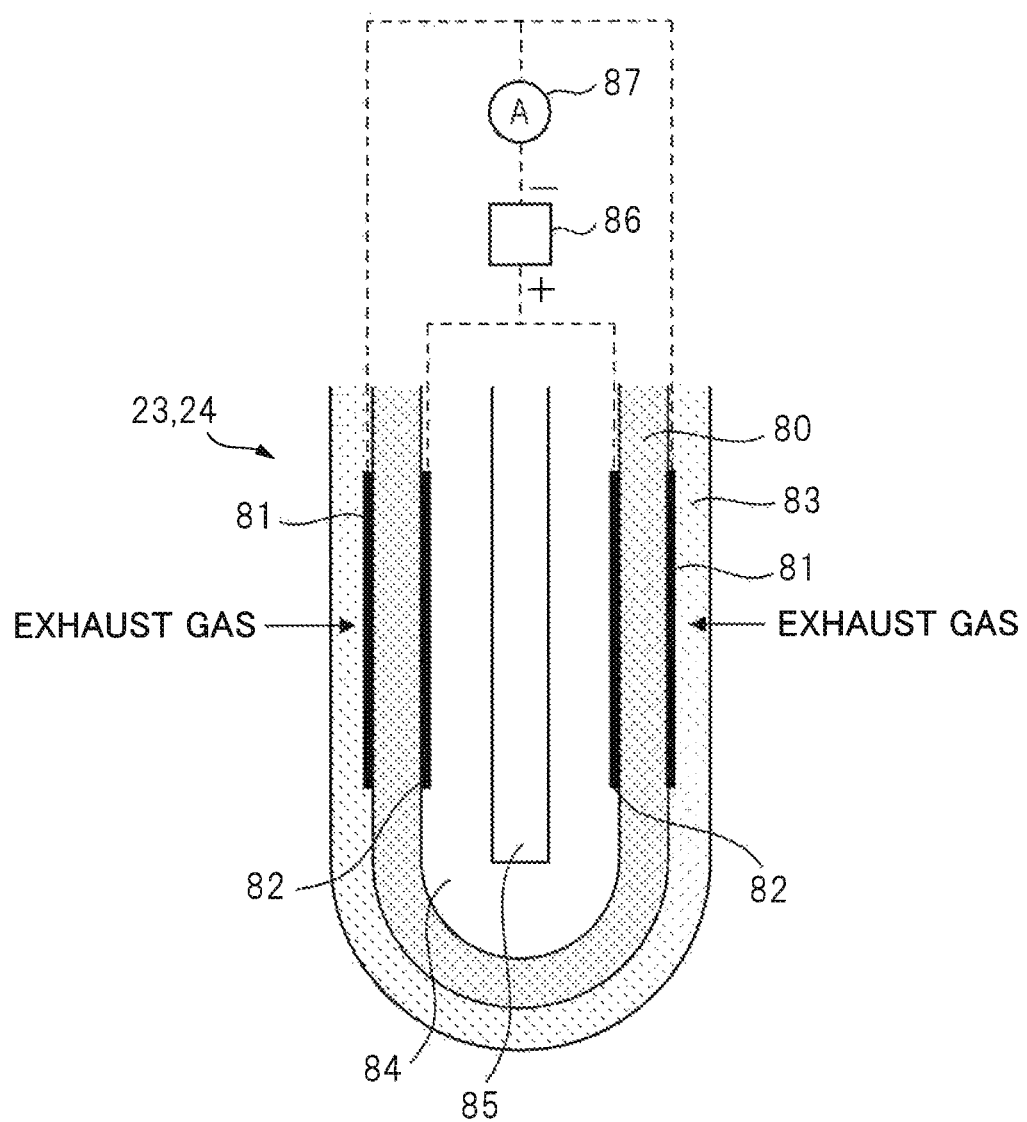
FIG. 18 is a cross-sectional side view of the detecting portion of an air-fuel ratio sensor.

Next, referring to FIG. 18, the structures of the upstream side air-fuel ratio sensor 23 and the downstream side air-fuel ratio sensor 24 shown in FIG. 1 will be briefly explained. The upstream side air-fuel ratio sensor 23 and downstream side air-fuel ratio sensor 24 shown in FIG. 1 are comprised of limiting current type air-fuel ratio sensors of the same cup-type structures. Each of these air-fuel ratio sensors 23 and 24 is provided with a solid electrolyte layer 80 comprised of zirconia, an exhaust side electrode 81 arranged on one side surface, an atmosphere side electrode 82 arranged on the other side surface, a diffusion regulating layer 83 regulating the speed of diffusion of the passing gas, for example, exhaust gas, a reference gas chamber 84, and a heater part 85 heating the air-fuel ratio sensor 23 or 24. The exhaust side electrode 81 and the atmosphere side electrode 82 are formed from platinum or another precious metal, while the diffusion regulating layer 83 is formed from alumina or another porous sintered body.

As shown in FIG. 18, a sensor applied voltage V is applied between the exhaust side electrode 81 and the atmosphere side electrode 82 by an applied voltage control device 86 controlled by the electronic control unit 30. When the sensor applied voltage V is applied, the current value I of the current which passes through the solid electrolyte layer 80 and flows between the electrodes 81 and 82 is detected by a current detector 87. The current value detected by this current detector 87 is the output current value I of the air-fuel ratio sensors 23 and 24, and the output current value of the air-fuel ratio sensors 23 and 24 is input to the electronic control unit 30.

Figure 19:
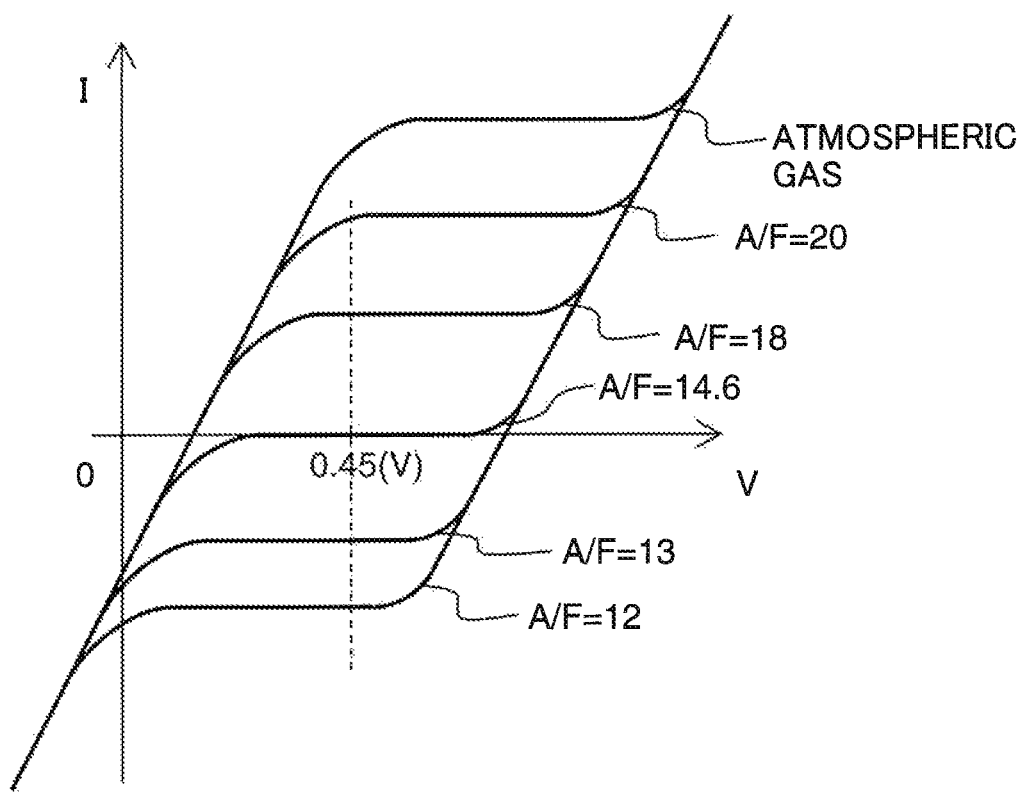
FIG. 19 is a view showing a change of the output electric current value of an air-fuel ratio sensor.
Figure 20:
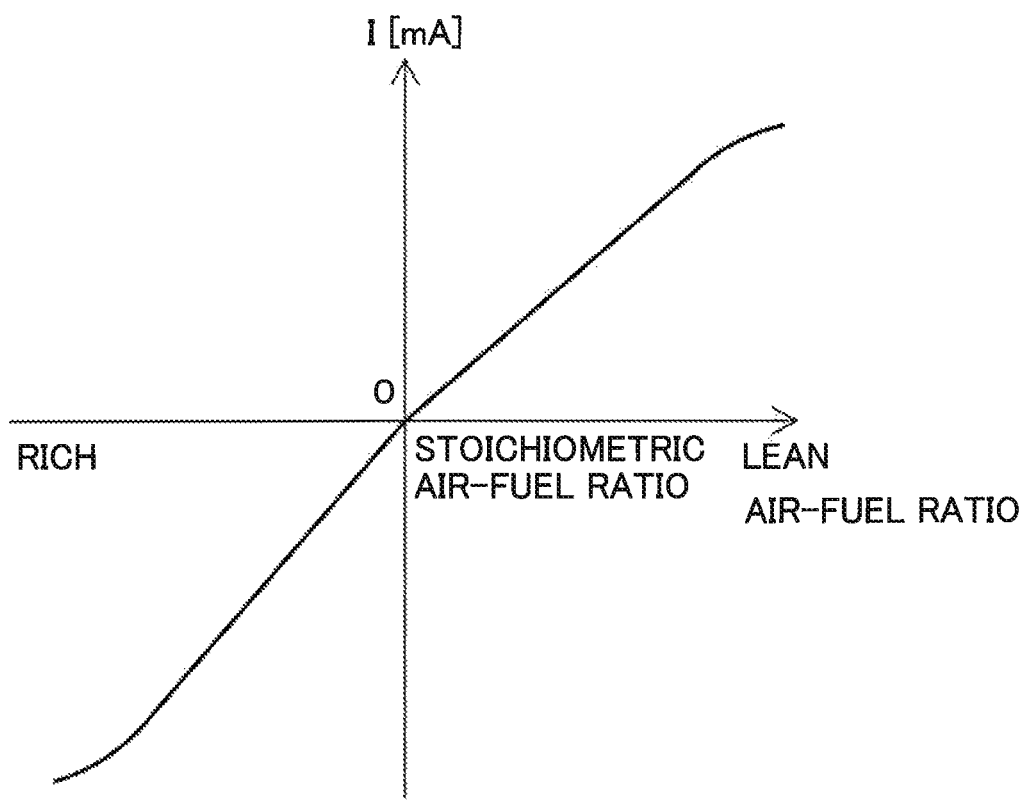
FIG. 20 is a view showing the relationship between an air-fuel ratio and the output electric current value of an air-fuel ratio sensor.

The air-fuel ratio sensors 23 and 24 configured in this way have the voltage-current (V-I) characteristic such as shown in FIG. 19. As will be understood from FIG. 19, the output current value I of the air-fuel ratio sensors 23 and 24 becomes larger the higher the air-fuel ratio A/F of the gas flowing around the air-fuel ratio sensors 23 and 24, for example, the air-fuel ratio A/F of the exhaust gas becomes, that is, the leaner the air-fuel ratio A/F of the exhaust gas becomes. On the other hand, FIG. 20 shows the relationship between the air-fuel ratio A/F of the gas flowing around the air-fuel ratio sensors 23 and 24 and the output current value I when maintaining the applied voltage V at a constant voltage of about 0.45V (broken line in FIG. 19). As will be understood from FIG. 20, the higher the air-fuel ratio A/F of the gas flowing around the air-fuel ratio sensors 23 and 24, that is, the leaner the air-fuel ratio A/F of the gas flowing around the air-fuel ratio sensors 23 and 24 is, the larger the output current value I from the air-fuel ratio sensors 23 and 24 becomes. Note that, when the air-fuel ratio A/F of the gas flowing around the air-fuel ratio sensors 23 and 24 is the stoichiometric air-fuel ratio, the output current value I of the air-fuel ratio sensors 23 and 24 becomes zero.

Now then, as explained above, in the embodiment of the present invention, the three-way catalyst is used as the exhaust purification catalyst 14. This three-way catalyst is comprised of a catalyst which can simultaneously reduce the HC, CO, and $NO_x$ contained in the gas when the air-fuel ratio of the gas flowing into the three-way catalyst, for example, the air-fuel ratio of the exhaust gas, is the stoichiometric air-fuel ratio. Therefore, when the three-way catalyst is used as the exhaust purification catalyst 14, the air-fuel ratio of the gas flowing into the exhaust purification catalyst 14 has to be maintained at the stoichiometric air-fuel ratio. Therefore, during engine operation, basically, the air-fuel ratio of the exhaust gas discharged from the engine is controlled to the stoichiometric air-fuel ratio so that the air-fuel ratio of the gas flowing into the exhaust purification catalyst 14 becomes the stoichiometric air-fuel ratio.

On the other hand, as explained above, in the heat and hydrogen generation device 50, fuel is burned under a rich air-fuel ratio or lean air-fuel ratio. Therefore, when the heat and hydrogen generation device 50 is made to operate, rich air-fuel ratio combustion gas or lean air-fuel ratio combustion gas is fed to the exhaust purification catalyst 14 from the heat and hydrogen generation device 50 through the feed passage 51. Therefore, when the heat and hydrogen generation device 50 is made to operate, even if the air-fuel ratio of the exhaust gas discharged from the engine is controlled to the stoichiometric air-fuel ratio, the air-fuel ratio of the gas flowing into the exhaust purification catalyst 14 no longer becomes the stoichiometric air-fuel ratio and the HC, CO, and $NO_x$ contained in the gas can no longer be removed. Therefore, in the embodiment of the present invention, even when the heat and hydrogen generation device 50 is made to operate, the air-fuel ratio of the gas flowing into the exhaust purification catalyst 14 is controlled to become the stoichiometric air-fuel ratio.

That is, as explained above, in the heat and hydrogen generation device 50, the target $O_2/C$ molar ratio corresponding to the operating state is set in advance. For example, when the partial oxidation reforming reaction is performed, this target $O_2/C$ molar ratio is made 0.5, while when the complete oxidation reaction is performed, this target $O_2/C$ molar ratio is made 2.6. On the other hand, as explained above, when $O_2/C$ molar ratio=1.4575, the ratio of air and fuel becomes the stoichiometric air-fuel ratio. In this case, if consdering the fact that the stoichiometric air-fuel ratio=14.6, an $O_2/C$ molar ratio=0.5 corresponds to a rich air-fuel ratio of an air-fuel ratio=5.0, while an $O_2/C$ molar ratio=2.6 corresponds to a lean air-fuel ratio of an air-fuel ratio=26.0. Therefore, it is possible to say instead that, in the heat and hydrogen generation device 50, a target set air-fuel ratio corresponding to the operating state is set in advance and, for example, when the partial oxidation reforming reaction is performed, this target set air-fuel ratio is made 5.0, while when the complete oxidation reaction is performed, this target set air-fuel ratio is made 26.0.

In the embodiment of the present invention, the air-fuel ratio of the exhaust gas discharged from the engine is adjusted in accordance the target set air-fuel ratio at the heat and hydrogen generation device 50 so that the air-fuel ratio of the gas flowing into the exhaust purification catalyst 14 becomes the stoichiometric air-fuel ratio. That is, if the target set air-fuel ratio at the heat and hydrogen generation device 50 becomes the rich air-fuel ratio, the air-fuel ratio of the exhaust gas discharged from the engine is made the lean air-fuel ratio so that the air-fuel ratio of the gas flowing into the exhaust purification catalyst 14 becomes the stoichiometric air-fuel ratio, while if the target set air-fuel ratio at the heat and hydrogen generation device 50 becomes the lean air-fuel ratio, the air-fuel ratio of the exhaust gas discharged from the engine is made the rich air-fuel ratio so that the air-fuel ratio of the gas flowing into the exhaust purification catalyst 14 becomes the stoichiometric air-fuel ratio. By adjusting the air-fuel ratio of the exhaust gas discharged from the engine in this way, the air-fuel ratio of the gas flowing into the exhaust purification catalyst 14 is maintained at the stoichiometric air-fuel ratio. As a result, in the exhaust purification catalyst 14, the HC, CO, and $NO_x$ contained in the gas can be simultaneously reduced.

That is, in the embodiment of the present invention, the heat and hydrogen generation device 50 able to generate only heat or heat and hydrogen by burning fuel and air, the exhaust purification catalyst 14 arranged in the engine exhaust passage and able to simultaneously reduce HC, CO, and $NO_x$ contained in gas flowing in when an air-fuel ratio of inflowing gas is a stoichiometric air-fuel ratio, and the electric control unit 30 are provided, and the combustion gas discharged from the heat and hydrogen generation device 50 is fed to the exhaust purification catalyst 14. In this case, the electric control unit 30 is configured to make an air-fuel ratio of the air and fuel made to burn in the heat and hydrogen generation device 50 a predetermined target set air-fuel ratio, and the electric control unit 30 is configured to control the air-fuel ratio of the exhaust gas discharged from the engine to a target adjusted air-fuel ratio required for making the air-fuel ratio of the gas flowing into the exhaust purification catalyst 14 the stoichiometric air-fuel ratio in accordance with the target set air-fuel ratio when the air-fuel ratio of the air and fuel made to burn in the heat and hydrogen generation device 50 is made the predetermined target set air-fuel ratio.

In this case, in the embodiment of the present invention, the sum of the amount of air made to burn in the heat and hydrogen generation device 50 and the amount of air made to burn in the engine and the sum of the amount of fuel made to burn in the heat and hydrogen generation device 50 and the amount of fuel made to burn in the engine are calculated, and the target adjusted air-fuel ratio is made the air-fuel ratio required for making the ratio of the above-mentioned sum of the amount of air and the above-mentioned sum of the amount of fuel the stoichiometric air-fuel ratio. Namely, in the embodiment of the present invention, the target adjusted air-fuel ratio is made the air-fuel ratio required for making, the ratio of the sum of the amount of air made to burn in the heat and hydrogen generation device 50 and the amount of air made to burn in the engine and the sum of the amount of fuel made to burn in the heat and hydrogen generation device 50 and the amount of fuel made to burn in the engine, the stoichiometric air-fuel ratio. In other words, the target adjusted air-fuel ratio is made the air-fuel ratio whereby the ratio of the sum of the amount of air made to burn in the engine and the heat and hydrogen generation device 50 and the sum of the amount of fuel made to burn in the engine and the heat and hydrogen generation device becomes the stoichiometric air-fuel ratio. In this case, specifically, the air-fuel ratio of the exhaust gas discharged from the engine is controlled to the target adjusted air-fuel ratio based on the output signal of the upstream side air-fuel ratio sensor 23.

In this regard, when, in this way, adjusting the air-fuel ratio of the exhaust gas discharged from the engine in accordance with the target set air-fuel ratio in the heat and hydrogen generation device 50 so that the air-fuel ratio of the gas flowing into the exhaust purification catalyst 14 becomes the stoichiometric air-fuel ratio, if the air-fuel ratio of the air and fuel made to burn in the heat and hydrogen generation device 50 precisely matches the target set air-fuel ratio, the air-fuel ratio of the gas flowing into the exhaust purification catalyst 14 is maintained at the stoichiometric air-fuel ratio. However, in actuality, due to aging etc., sometimes the air-fuel ratio of the air and fuel made to burn in the heat and hydrogen generation device 50 will not precisely match the target set air-fuel ratio.

Therefore, in the embodiment of the present invention, the air-fuel ratio of the exhaust gas discharged from the engine is precisely adjusted based on the upstream side air-fuel ratio sensor 23 in accordance with the target set air-fuel ratio at the heat and hydrogen generation device 50 so that the air-fuel ratio of the gas flowing into the exhaust purification catalyst 14 becomes the stoichiometric air-fuel ratio. At this time, it is detected by the downstream side air-fuel ratio sensor 24 whether the air-fuel ratio of the gas flowing into the exhaust purification catalyst 14 is the stoichiometric air-fuel ratio. If at this time the air-fuel ratio of the gas flowing into the exhaust purification catalyst 14 is not the stoichiometric air-fuel ratio, the air-fuel ratio of the air and fuel being made to burn in the heat and hydrogen generation device 50 does not precisely match the target set air-fuel ratio. In this case, if controlling the amount of feed of air or the amount of feed of fuel to the heat and hydrogen generation device 50 so that the air-fuel ratio of the air and fuel fed to the heat and hydrogen generation device 50 becomes the target set air-fuel ratio, it is possible to make the air-fuel ratio of the air and fuel made to burn in the heat and hydrogen generation device 50 precisely match the target set air-fuel ratio.

In this regard, in this case, if detecting the air-fuel ratio of the air and fuel made to burn in the heat and hydrogen generation device 50 by an air-fuel ratio sensor and controlling the air-fuel ratio of the air and fuel based on the output signal of this air-fuel ratio sensor, it becomes possible to make the air-fuel ratio of the air and fuel made to burn in the heat and hydrogen generation device 50 precisely match the target set air-fuel ratio. In this regard, however, when the partial oxidation reforming reaction is performed in the heat and hydrogen generation device 50, hydrogen is generated. Therefore, the gas detected by the air-fuel ratio sensor contains hydrogen. However, if the detected gas contains hydrogen, the hydrogen will rapidly diffuse in the diffusion regulating layer 83 of the air-fuel ratio sensor without being regulated much at all, so the air-fuel ratio detected by the air-fuel ratio sensor will end up deviating to the rich side. Therefore, when the combustion gas contains hydrogen, it is difficult to precisely detect the air-fuel ratio of gas by an air-fuel ratio sensor. Further, with a simple structure air-fuel ratio sensor such as shown in FIG. 18, it is not possible to detect a 5.0 or so rich air-fuel ratio. Therefore, it is difficult to detect the air-fuel ratio of air and fuel made to burn in the heat and hydrogen generation device 50 by an air-fuel ratio sensor and control the air-fuel ratio of the air and fuel made to burn in the heat and hydrogen generation device 50 so as to precisely match the target set air-fuel ratio based on the output signal of this air-fuel ratio sensor.

In this regard, as explained above, if controlling the amount of feed of air or the amount of feed of fuel to the heat and hydrogen generation device 50 so that the air-fuel ratio of the gas flowing into the exhaust purification catalyst 14 becomes the stoichiometric air-fuel ratio, it is possible to make the air-fuel ratio of the air and fuel made to burn in the heat and hydrogen generation device 50 precisely match the target set air-fuel ratio. Further, if the air-fuel ratio of the gas flowing into the exhaust purification catalyst 14 is controlled to the stoichiometric air-fuel ratio, the gas flowing out from the exhaust purification catalyst 14 does not contain almost any hydrogen and, therefore, the air-fuel ratio of the gas flowing out from the exhaust purification catalyst 14 can be accurately detected by the air-fuel ratio sensor. Therefore, in the embodiment of the present invention, the amount of feed of air or the amount of feed of fuel to the heat and hydrogen generation device 50 is controlled based on the downstream side air-fuel ratio sensor 24 arranged downstream of the exhaust purification catalyst 14 so that the air-fuel ratio of the gas flowing into the exhaust purification catalyst 14 becomes the stoichiometric air-fuel ratio. At this time, the air-fuel ratio of the air and fuel made to burn in the heat and hydrogen generation device 50 is made to precisely match the target set air-fuel ratio. Therefore, explained another way, it can be said that in the embodiment of the present invention, the air-fuel ratio of the air and fuel made to burn in the heat and hydrogen generation device 50 is controlled based on the downstream side air-fuel ratio sensor 24 to the target set air-fuel ratio.

On the other hand, as explained above, the air-fuel ratio sensor is affected by hydrogen, so as shown in FIG. 1, the upstream side air-fuel ratio sensor 23 is arranged in the exhaust pipe 13 upstream from the teed port 51*a* to the exhaust pipe 13 of combustion gas discharged from the heat and hydrogen generation device 50. That is, in the embodiment of the present invention, the upstream side air-fuel ratio sensor 23 is arranged in the engine exhaust passage upstream from the feed port 51*a* to the engine exhaust passage of combustion gas discharged from the heat and hydrogen generation device 50, the downstream side air-fuel ratio sensor 24 is arranged in the engine exhaust passage downstream from the exhaust purification catalyst 14, the air-fuel ratio of the exhaust gas discharged from the engine is controlled based on the upstream side air-fuel ratio sensor to the target adjusted air-fuel ratio required for making the air-fuel ratio of the gas flowing into the exhaust purification catalyst 14 the stoichiometric air-fuel ratio, and the air-fuel ratio of the air and fuel made to burn in the heat and hydrogen generation device 50 is controlled based on the downstream side air-fuel ratio sensor 24 to the target set air-fuel ratio.

In this case, in the embodiment of the present invention, when in the state where the air-fuel ratio of the exhaust gas discharged from the engine is controlled to the abovementioned target adjusted air-fuel ratio based on the upstream side air-fuel ratio sensor 23, it is detected by the downstream side air-fuel ratio sensor 24 whether the air-fuel ratio of the gas flowing out from the exhaust purification catalyst 14 deviates from the stoichiometric air-fuel ratio.

When it is detected by the downstream side air-fuel ratio sensor 14 that the air-fuel ratio of the gas flowing out from the exhaust purification catalyst 14 deviates from the stoichiometric air-fuel ratio, the air-fuel ratio of the air and fuel made to burn in the heat and hydrogen generation device 50 is controlled so that the air-fuel ratio of the gas flowing out from the exhaust purification catalyst 14 becomes the stoichiometric air-fuel ratio.

Now then, if explaining specifically one example of the control performed at the embodiment of the present invention, the target $O_2/C$ molar ratio corresponding to the operating state of the heat and hydrogen generation device 50, the target amount of feed of air QA to the heat and hydrogen generation device 50, and the target amount of feed of fuel QF to the heat and hydrogen generation device 50 are set in advance. On the other hand, the amount of feed of fuel QF to the engine is determined from the torque demanded for the engine. In this case, to make the air-fuel ratio of the gas flowing into the exhaust purification catalyst 14 the stoichiometric air-fuel ratio (=14.6), the amount of feed of air GA to the engine has to be made one like in the following formula.

Amount of feed of air GA to engine=(amount of feed of fuel GF to engine+target amount of feed of fuel QF to heat and hydrogen generation device 50)·14.6–amount of feed of air QA to heat and hydrogen generation device 50

That is, the air-fuel ratio of the exhaust gas discharged from the engine has to be controlled to the target air-fuel ratio $(A/F)_0$=GA/GF=((GF+QF)·14.6–QA)/GF.

Therefore, in the embodiment of the present invention, the amount of feed of air GA to the engine is controlled based on the upstream side air-fuel ratio sensor 23 so that the air-fuel ratio of the exhaust gas discharged from the engine accurately becomes the target air-fuel ratio $(A/F)_0$. In this case, there is a lag in control in the amount of feed of air GA to the engine, so if the air-fuel ratio of the exhaust gas discharged from the engine deviates from the target air-fuel ratio $(A/F)_0$, it is possible to control first the amount of feed of fuel GF to the engine so that the air-fuel ratio of the exhaust gas discharged from the engine becomes the target air-fuel ratio $(A/F)_0$ and then control the amount of feed of fuel GF to the engine so as to reduce it when the amount of feed of air GA to the engine approaches the control target value.

On the other hand, in the embodiment of the present invention, in the state where the air-fuel ratio of the exhaust gas discharged from the engine is controlled to the target air-fuel ratio $(A/F)_0$ based on the upstream side air-fuel ratio sensor 23, a learning value KG of the fuel injection amount command value QFI to the fuel injector 58 is controlled by the downstream side air-fuel ratio sensor 24 so that the air-fuel ratio of the gas flowing into the exhaust purification catalyst 14 becomes the stoichiometric air-fuel ratio. For example, when the air-fuel ratio of the gas flowing into the exhaust purification catalyst 14 becomes the rich side from the stoichiometric air-fuel ratio, the learning value KG is made to decrease and the final fuel injection amount command value QFIO (=KG·QFI) to the fuel injector 58 is made smaller. At this time, the amount of fuel injection from the fuel injector 58 is made to decrease. As opposed to this, when the air-fuel ratio of the gas flowing into the exhaust purification catalyst 14 becomes the lean side from the stoichiometric air-fuel ratio, the learning value KG is made to increase and the final fuel injection amount command value QFIO (=KG·QFI) from the fuel injector 58 is made larger. At this time, the fuel injection amount from the fuel injector 58 is made to increase. Thereby, the air-fuel ratio of the gas flowing into the exhaust purification catalyst 14 is controlled to the stoichiometric air-fuel ratio.

In this way, in the embodiment of the present invention, by controlling the learning value KG, the air-fuel ratio of the gas flowing into the exhaust purification catalyst 14 is controlled to the stoichiometric air-fuel ratio. In this case, in the embodiment of the present invention, in controlling the learning value KG, rich failure control or lean failure control is used. Therefore, next, these rich failure control and lean failure control will be briefly explained.

Now then, as explained above, in addition to a precious metal such as platinum Pt, palladium Pd and rhodium Rh, cerium Ce is carried on the three-way catalyst. This cerium Ce has an oxygen storage ability. The three-way catalyst has the function of simultaneously removing unburned HC and CO and $NO_x$ if the air-fuel ratio of the gas flowing into the three-way catalyst is maintained at the stoichiometric air-fuel ratio, but if the exhaust purification catalyst 14 has an oxygen storage ability, even if the air-fuel ratio of the gas flowing into the exhaust purification catalyst 14 deviates somewhat from the stoichiometric air-fuel ratio to the rich side or the lean side, unburned HC and CO and $NO_x$ are simultaneously removed.

That is, if the exhaust purification catalyst 14 has an oxygen storage ability, when the air-fuel ratio of the gas flowing into the exhaust purification catalyst 14 becomes somewhat lean, the excess oxygen contained in the gas is stored in the exhaust purification catalyst 14 and the surface of the exhaust purification catalyst 14 is maintained at the stoichiometric air-fuel ratio. As a result, the unburned HC and CO and $NO_x$ simultaneously are removed on the surface of the exhaust purification catalyst 14. At this time, the air-fuel ratio of the exhaust gas flowing out from the exhaust purification catalyst 14 becomes the stoichiometric air-fuel ratio. On the other hand, when the air-fuel ratio of the gas flowing into the exhaust purification catalyst 14 becomes somewhat rich, the amount of oxygen not sufficient for reducing the unburned HC, CO, etc. contained in the gas is released from the exhaust purification catalyst 14. In this case as well, the surface of the exhaust purification catalyst 14 is maintained at the stoichiometric air-fuel ratio. As a result, the unburned HC and CO and $NO_x$ are simultaneously removed on the surface of the exhaust purification catalyst 14 and the air-fuel ratio of the gas flowing out from the exhaust purification catalyst 14 at this time becomes the stoichiometric air-fuel ratio.

When, in this way, the exhaust purification catalyst 14 has an oxygen storage ability, even if the air-fuel ratio of the gas flowing into the exhaust purification catalyst 14 deviates somewhat from the stoichiometric air-fuel ratio to the rich side or the lean side, the unburned HC and CO and $NO_x$ are simultaneously removed and the air-fuel ratio of the gas flowing out from the exhaust purification catalyst 14 becomes the stoichiometric air-fuel ratio. In this case, if the amount of oxygen stored in the exhaust purification catalyst 14 becomes zero, when the air-fuel ratio of the gas flowing into the exhaust purification catalyst 14 deviates from the stoichiometric air-fuel ratio to the rich side, unburned HC and CO will not be removed but will flow out from the exhaust purification catalyst 14 and the air-fuel ratio of the gas flowing out from the exhaust purification catalyst 14 will become rich. This is called "rich failure" or "rich malfunction". On the other hand, if the amount of oxygen stored in the exhaust purification catalyst 14 becomes saturated, when the air-fuel ratio of the gas flowing into the exhaust purification catalyst 14 deviates from the stoichiometric air-fuel ratio to the lean side, the $NO_x$ will not be removed but will flow out from the exhaust purification catalyst 14 and the air-fuel ratio of the gas flowing out from the exhaust purification catalyst 14 will become lean. This is called "lean failure" or "lean malfunction".

Figure 21:
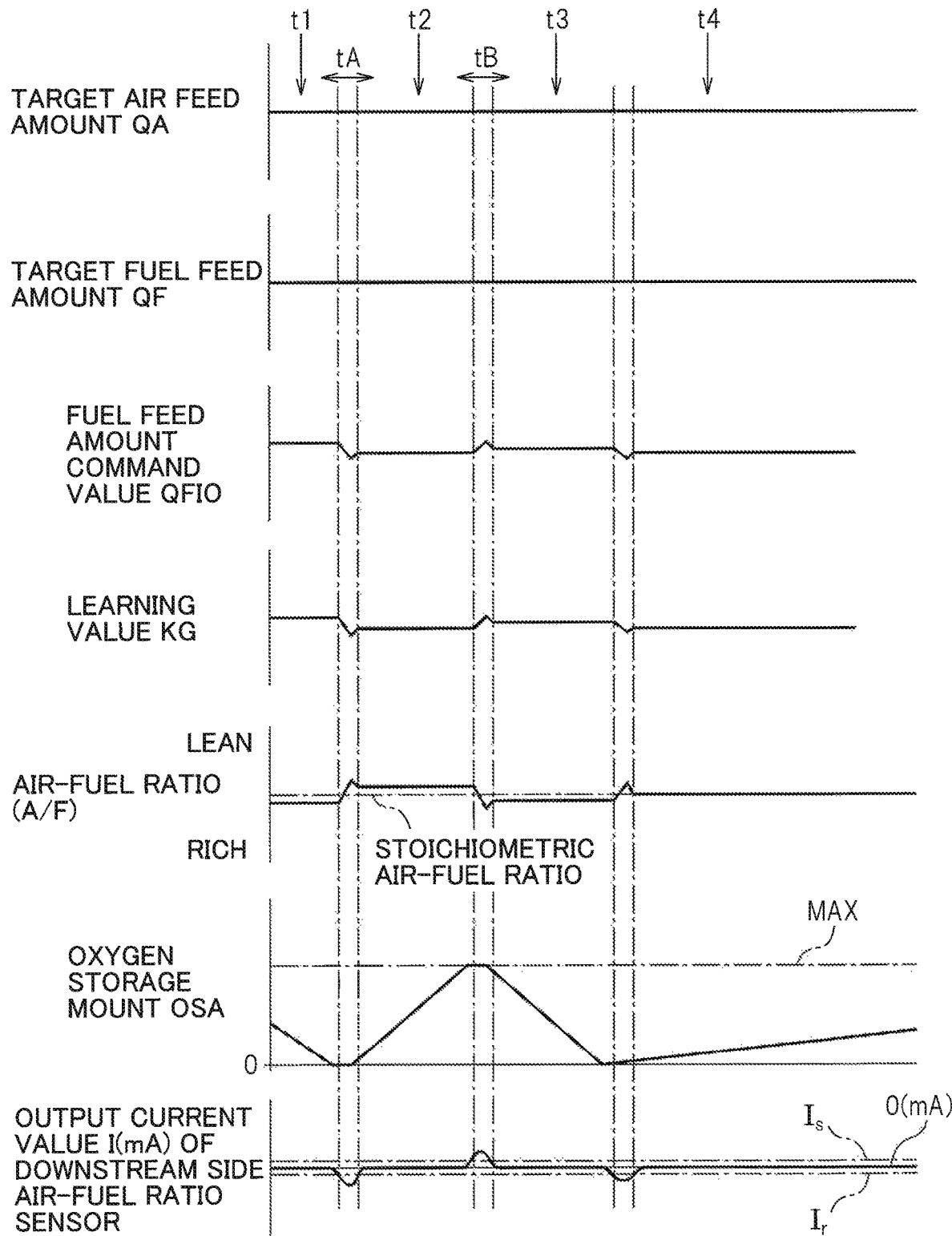
FIG. 21 is a time chart for explaining a rich failure control and a lean failure control.
Figure 22:
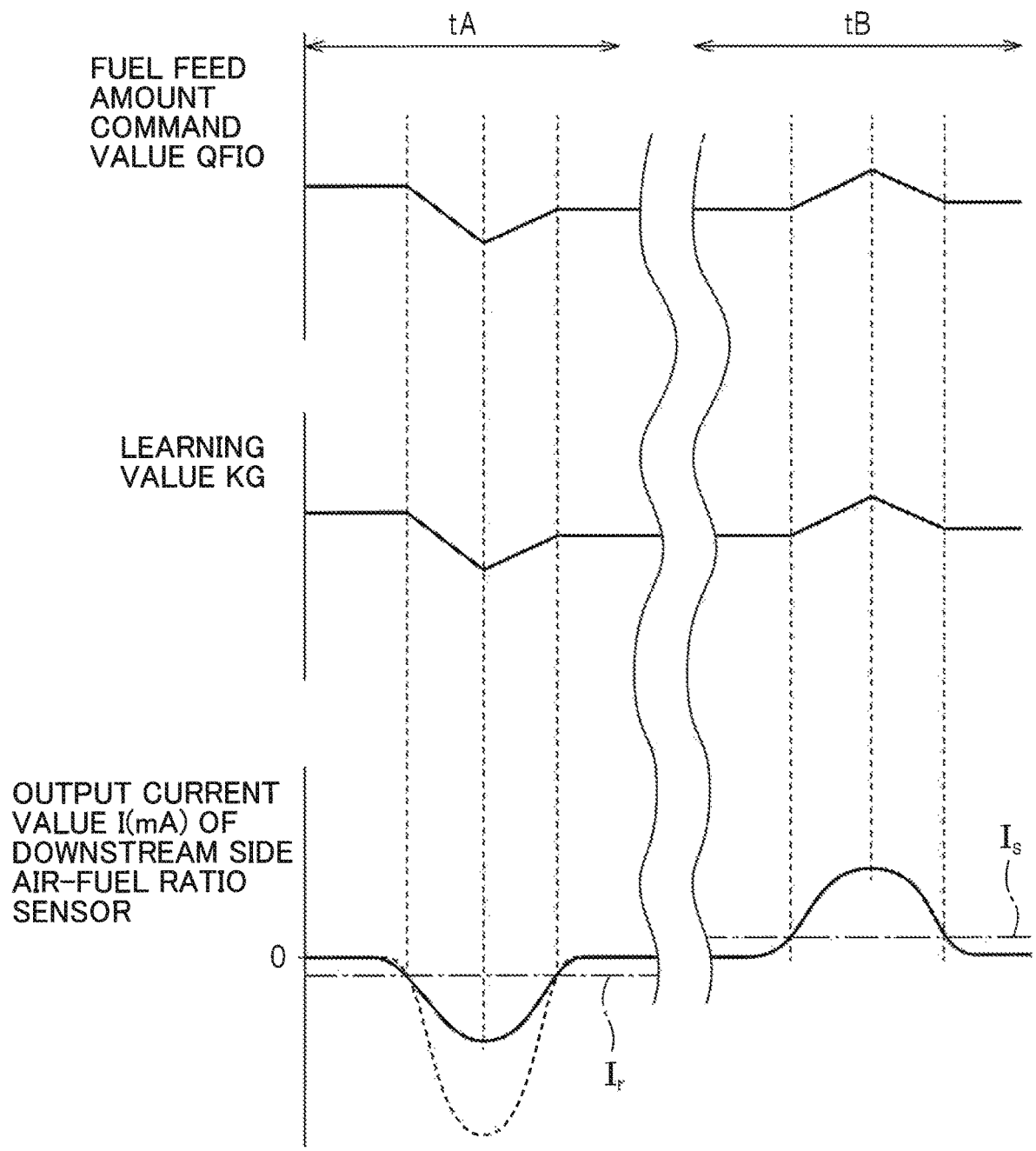
FIG. 22 is an enlarged view of changes of the output electric current value of a downstream side air-fuel ratio sensor at the period tA and the period tB etc.

In the embodiment of the present invention, such rich failure and lean failure are utilized to control the learning value KG. Below, the method of control of the learning value KG will be explained while referring to FIG. 21 and FIG. 22. FIG. 21 shows the changes in the target amount of feed of air QA to the heat and hydrogen generation device 50, the target amount of feed of fuel QF to the heat and hydrogen generation device 50, the final fuel injection amount command value QFIO to the fuel injector 58, the learning value KG, the air-fuel ratio (A/F) of the exhaust gas flowing out from the exhaust purification catalyst 14, the oxygen storage amount OSA stored in the exhaust purification catalyst 14, and the output current value I of the downstream side air-fuel ratio sensor 24. On the other hand, FIG. 22 is an enlarged view of the changes in the final fuel injection amount command value QFIO to the fuel injector 58, the learning value KG, and the output current value I of the downstream side air-fuel ratio sensor 24 in the time period tA and time period tis in FIG. 21. Note that, the oxidation reduction reaction of unburned NC and CO and $NO_x$ on the exhaust purification catalyst 14 does not occur unless the temperature TD of the exhaust purification catalyst 14 becomes the three-way activity temperature TE or more. Therefore, the control of the learning value KG is performed when the temperature TD of the exhaust purification catalyst 14 exceeds the three-way activity temperature TE.

Referring to FIG. 21, when, like at the time t1, the air-fuel ratio (A/F) of the exhaust gas flowing out from the exhaust purification catalyst 14 is just slightly rich, the oxygen stored in the exhaust purification catalyst 14 is consumed, therefore the oxygen storage amount OSA gradually decreases. Next, if the oxygen storage amount OSA becomes zero, the rich failure occurs and the air-fuel ratio (A/F) of the exhaust gas flowing out from the exhaust purification catalyst 14 becomes rich. As a result, the output current value I of the downstream side air-fuel ratio sensor 24 becomes a negative value. If the output current value I of the downstream side air-fuel ratio sensor 24 becomes the rich failure judgment value it or less, as shown by the time period tA of FIG. 22, the learning value KG is made to decrease proportional to the speed of fall of the output current value I of the downstream side air-fuel ratio sensor 24. As a result, the amount of feed of fuel to the heat and hydrogen generation device 50 is made to decrease.

Next, if the air-fuel ratio (A/F) of the exhaust gas flowing out from the exhaust purification catalyst 14 becomes lean, the output current value I of the downstream side air-fuel ratio sensor 24 reaches the lower limit peak. Next, the learning value KG rises by a speed slower than the speed of decrease after the rich failure until the output current value I of the downstream side air-fuel ratio sensor 24 rises to the rich failure judgment value Ir. If the output current value I of the downstream side air-fuel ratio sensor 24 reaches the rich failure judgment value Ir, after that, the learning value KG is held constant. The learning value KG at this time becomes smaller than the learning value KG before the rich failure occurred. Note that, at this time, the air-fuel ratio (A/F) of the exhaust gas flowing out from the exhaust purification catalyst 14 is just slightly lean. Therefore, as shown at the time t2 of FIG. 21, the oxygen storage amount OSA gradually increases.

Next, if the oxygen storage amount OSA reaches the stored oxygen saturation amount MAX, this time, the lean failure occurs and the air-fuel ratio (A/F) of the exhaust gas flowing out from the exhaust purification catalyst 14 becomes lean. As a result, the output current value I of the downstream side air-fuel ratio sensor 24 becomes a positive value. If the output current value I of the downstream side air-fuel ratio sensor 24 becomes the lean failure judgment value Is or more, as shown in the time period tB of FIG. 22, the learning value KG is made to increase by a speed somewhat slower than the speed of decrease at the time of the previous rich failure in proportion to the speed of rise of the output current value I of the downstream side air-fuel ratio sensor 24. As a result, the amount of feed of fuel to the heat and hydrogen generation device 50 is made to increase.

Next, if the air-fuel ratio (A/F) of the exhaust gas flowing out from the exhaust purification catalyst 14 becomes rich, the output current value I of the downstream side air-fuel ratio sensor 24 reaches the upper limit peak. Next, the learning value KG is decreased by a speed slower than the speed of rise after the lean failure until the output current value I of the downstream side air-fuel ratio sensor 24 is reduced down to the lean failure judgment value Is. If the output current value I of the downstream side air-fuel ratio sensor 24 reaches the lean failure judgment value Is, after that, the learning value KG is held constant. The learning value KG at this time becomes larger compared with the learning value KG before the lean failure occurred. Note that, at this time, the air-fuel ratio (A/F) of the exhaust gas flowing out from the exhaust purification catalyst 14 becomes just slightly rich. Therefore, the oxygen storage amount OSA gradually decreases such as at the time t3 of FIG. 21.

Next, if the oxygen storage amount OSA becomes zero, the rich failure again occurs and the air-fuel ratio (A/F) of the exhaust gas flowing out from the exhaust purification catalyst 14 becomes rich. If the output current value I of the downstream side air-fuel ratio sensor 24 becomes the rich failure judgment value Ir or less, the learning value KG is made to decrease by a speed somewhat slower than the speed of rise at the time of the previous lean failure in proportion to the speed of fall of the output current value I of the downstream side air-fuel ratio sensor 24. Next, if the output current value I of the downstream side air-fuel ratio sensor 24 reaches the lower limit peak, the learning value KG is increased by a speed slower than the speed of fall after the rich failure until the output current value I of the downstream side air-fuel ratio sensor 24 increases to the rich failure judgment value Ir.

In this way, the learning value KG gradually approaches a value where the air-fuel ratio (A/F) of the exhaust gas flowing out from the exhaust purification catalyst 14 becomes the stoichiometric air-fuel ratio. If the learning value KG approaches a value where the air-fuel ratio (A/F) of the exhaust gas flowing out from the exhaust purification catalyst 14 becomes the stoichiometric air-fuel ratio, as shown at the time t4 of FIG. 21, the speed of change of the oxygen storage amount. OSA becomes slower. In this case, in the embodiment of the present invention, when the elapsed time "t" from the rich failure to the lean failure or the elapsed time "t" from the lean failure to the rich failure exceeds a predetermined reference time tMAX, it is judged that the learning has been completed and the learning value KG when the learning is completed is used until, next learning is stated.

Figure 23:
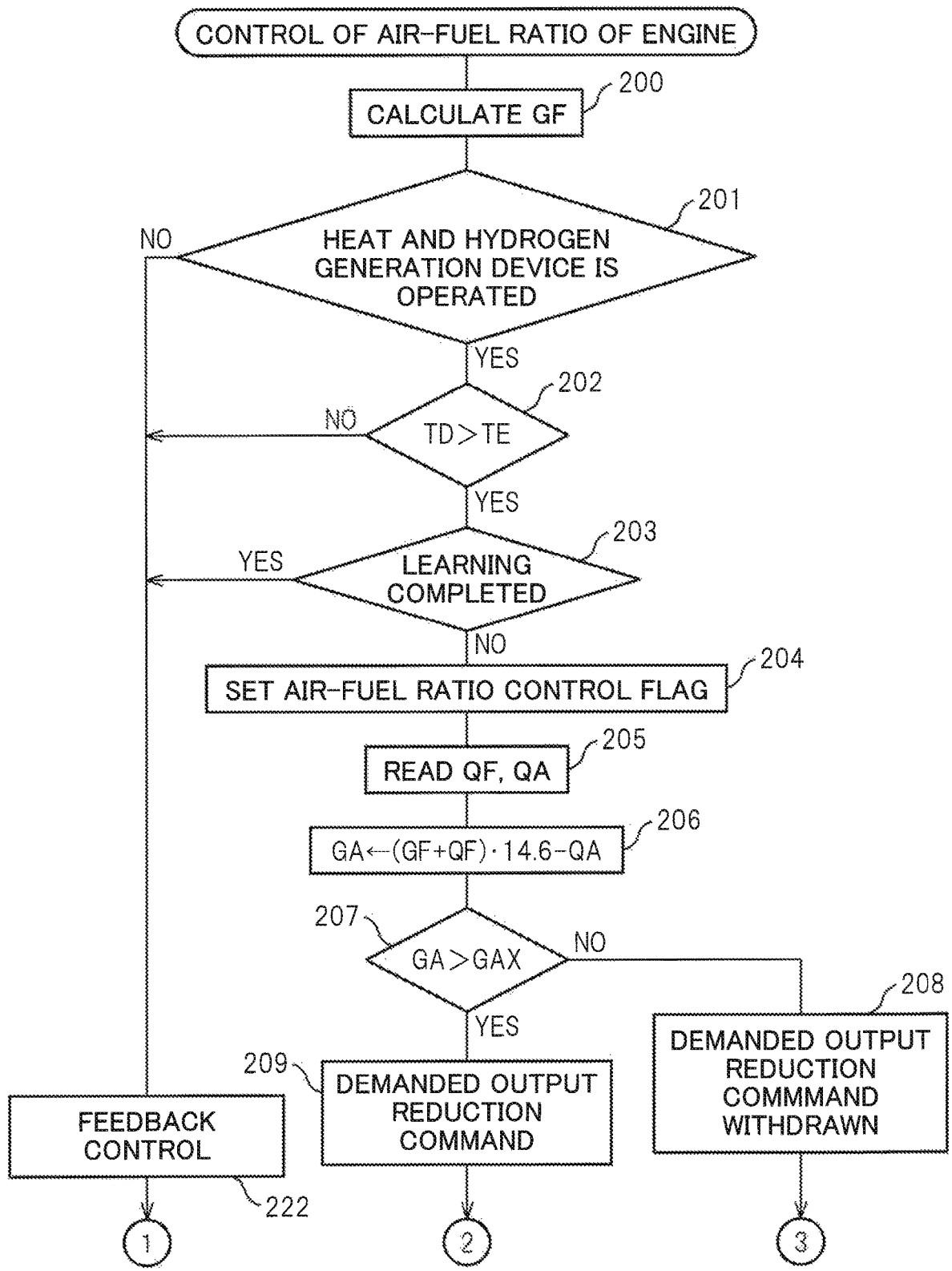
FIG. 23 is a flow chart for performing an air-fuel ratio control of an engine.
Figure 24:
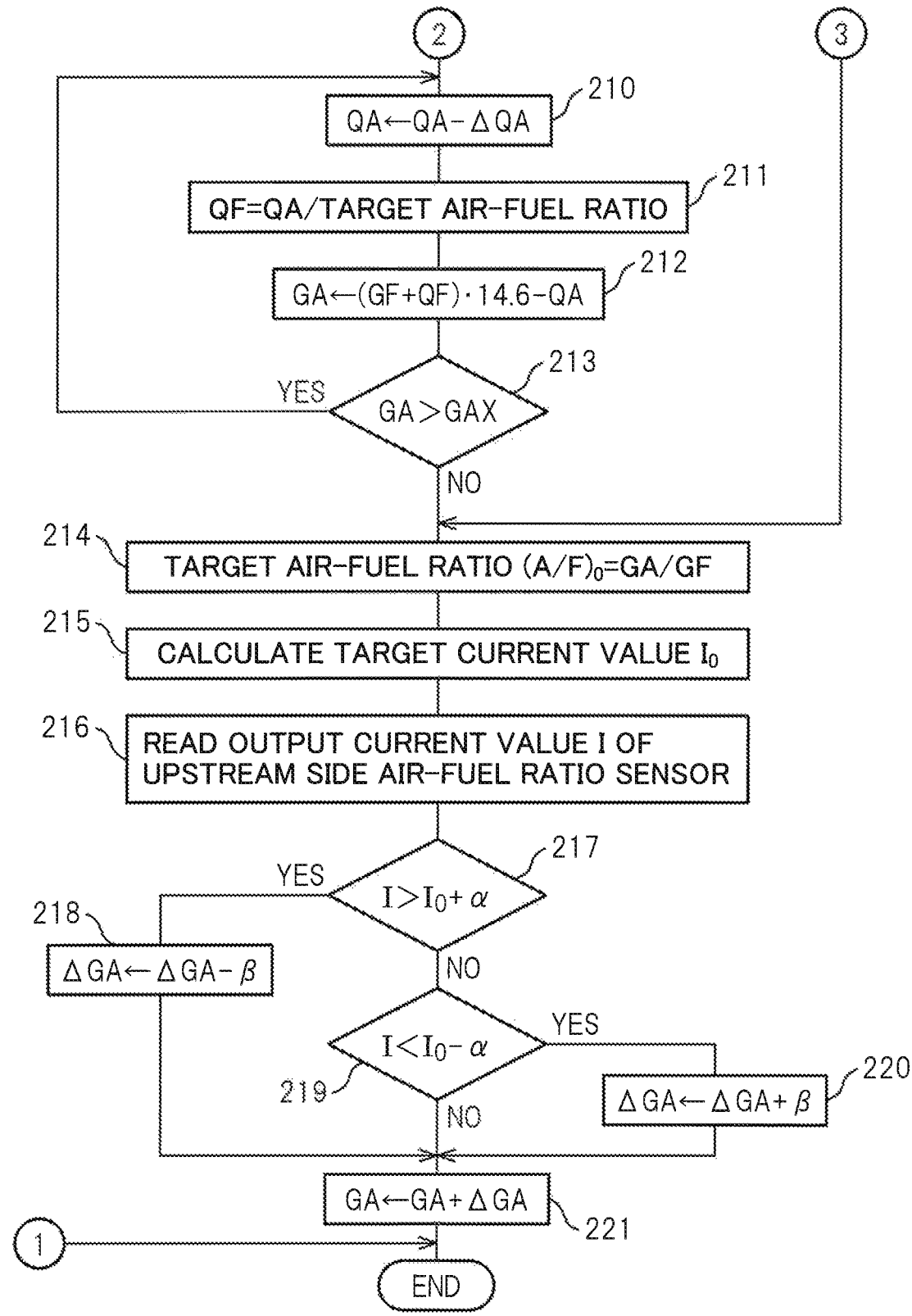
FIG. 24 is a flow chart for performing an air-fuel ratio control of an engine.

Next, referring to FIG. 23 and FIG. 24, the air-fuel ratio control routine of an engine will be explained. This air-fuel ratio control routine is executed by interruption every fixed time period. Referring to FIG. 23, first, at step 200, for example, the amount of feed of fuel GF to the engine is calculated based on the torque demanded for the engine. Next, at step 201, it is judged if the heat and hydrogen generation device 50 is being made to operate. When the heat and hydrogen generation device 50 is not being made to operated, the routine proceeds to step 222 where feedback control of the engine air-fuel ratio is performed based on the output signals of the upstream side air-fuel ratio sensor 23 and the downstream side air-fuel ratio sensor 24 so that the air-fuel ratio of the exhaust gas flowing out from the exhaust purification catalyst 14 becomes the stoichiometric air-fuel ratio or lean air-fuel ratio. Explanation of this feedback control will be omitted.

As opposed to this, when at step 201 it is judged that the heat and hydrogen generation device 50 is being made to operate, the routine proceeds to step 202 where it is judged if the temperature TD of the exhaust purification catalyst 14 is higher than the three-way activity temperature TE. When the temperature TD of the exhaust purification catalyst 14 is lower than the three-way activity temperature TE, the routine proceeds to step 222. As opposed to this, when the temperature TD of the exhaust purification catalyst 14 is higher than the three-way activity temperature TE, the routine proceeds to step 203 where it is judged if the learning using the learning value KG has been completed. When the learning has been completed, the routine proceeds to step 222. As opposed to this, when the learning has not been completed, the routine proceeds to step 204 where an air-fuel ratio control flag showing that the air-fuel ratio of the exhaust gas discharged from the engine should be accurately controlled to the target air-fuel ratio $(A/F)_0$ is set. If this air-fuel ratio control flag is set, air-fuel ratio control is started for controlling the air-fuel ratio of the exhaust gas discharged from the engine to the target adjusted air-fuel ratio required for the air-fuel ratio of the gas flowing into the exhaust purification catalyst 14 to become the stoichiometric air-fuel ratio.

If the air-fuel ratio control flag is set, the routine proceeds to step 205 where the target amount of feed of fuel QF to the heat and hydrogen generation device 50 and the target amount of feed of air QA to the heat and hydrogen generation device 50 are read. Next, at step 206, based on the following formula, the amount of feed of air GA to the engine necessary for making the air-fuel ratio of the gas flowing into the exhaust purification catalyst 14 the stoichiometric air-fuel ratio is calculated.

Amount of feed of air GA to engine=(amount of feed of fuel GF to engine+target amount of feed of fuel QF to heat and hydrogen generation device 50)·14.6–amount of feed of air QA to heat and hydrogen generation device 50

Next, at step 207, it is judged if the calculated amount of feed of air GA to the engine is larger than the maximum amount of feed of air GAX able to be fed in the current engine operating state. For example, the engine operating state sometimes becomes one where the exhaust turbocharger 8 is not operating, so the maximum amount of feed of air GAX able to be fed to the engine is small and, as a result, the calculated amount of feed of air GA to the engine cannot be fed to the engine. This maximum amount of feed of air GAX corresponding to the engine operating state is found in advance and stored in advance.

When at step 207 it is judged that the calculated amount of feed of air GA to the engine is larger than the maximum amount of feed of air GAX, to reduce the calculated amount of feed of air GA to the engine down to at least the maximum amount of feed of air GAX, it is necessary to lower the amount of feed of air QA to the heat and hydrogen generation device 50. For this reason, it is necessary to lower the demanded output of the heat and hydrogen generation device 50. Therefore, when at step 207 it is judged that the calculated amount of feed of air GA to the engine is larger than the maximum amount of feed of air GAX, the routine proceeds to step 209 where a demanded output reduction command for reducing the demanded output of the heat and hydrogen generation device 50 is issued. The processing routine when the demanded output reduction command is issued will be explained later.

When at step 207 it is judged that the calculated amount of feed of air GA to the engine is smaller than the maximum amount of feed of air GAX, the routine proceeds to step 208 where when the demanded output reduction command is issued, the demanded output reduction command is withdrawn. Next, the routine proceeds to step 214 where the target air-fuel ratio $(A/F)_0$=GA/GF of the exhaust gas discharged from the engine is calculated from the calculated amount of feed of air GA to the engine and the calculated amount of feed of fuel GF to the engine. Next, at step 215, the target current value $I_0$ of the upstream side air-fuel ratio sensor 23 corresponding to this target air-fuel ratio $(A/F)_0$ is calculated from the relationship shown in FIG. 20. Next, at step 216, the output current value I of the upstream side air-fuel ratio sensor 23 is read.

Next, at step 217, it is judged if the output current value I of the upstream side air-fuel ratio sensor 23 is larger than the target current value $I_0+\alpha$ ($\alpha$ is a small constant value) When $I>I_0+\alpha$, the routine proceeds to step 218 where a constant value $\beta$ is subtracted from the correction value $\Delta GA$ of the amount of feed of air GA to the engine. Next, the routine proceeds to step 221 where the correction value $\Delta GA$ is added to the amount of feed of air GA to the engine. At this time, the amount of feed of air GA to the engine is made to decrease. As opposed to this, when at step 217 it is judged that $I>I_0+\alpha$ does not stand, the routine proceeds to step 219 where it is judged if the output current value I of the upstream side air-fuel ratio sensor 23 is smaller than the target current value $I_0-\alpha$. When $I>I_0-\alpha$, the routine proceeds to step 220 where the constant value $\beta$ is added to the correction value $\Delta GA$ of the amount of feed of air GA to the engine. Next, the routine proceeds to step 221. At this time, the amount of feed of air GA to the engine is made to increase. In this way, the air-fuel ratio of the exhaust gas discharged from the engine is accurately controlled to the target air-fuel ratio $(A/F)_0$.

On the other hand, when at step 207 it is judged that the calculated amount of feed of air GA to the engine is larger than the maximum amount of feed of air GAX, as explained above, the routine proceeds to step 209 where the demanded output reduction command is issued. Next, at step 210, a constant value $\Delta QA$ is subtracted from the target amount of feed of air QA to the heat and hydrogen generation device 50. Next, at step 211, the calculated target amount of feed of air QA is divided by the current target air-fuel ratio at the heat and hydrogen generation device 50 to thereby calculate the target amount of feed of fuel QF to the heat and hydrogen generation device 50. Next, at step 212, based on the following formula, the amount of feed of air GA to the engine required for making the air-fuel ratio of the gas flowing into the exhaust purification catalyst 14 the stoichiometric air-fuel ratio is calculated.

Amount of feed of air GA to engine=(amount of feed of fuel GF to engine+target amount of feed of fuel QF to heat and hydrogen generation device 50)·14.6−amount of feed of air QA to heat and hydrogen generation device 50

Next, at step 213, it is judged if the calculated amount of feed of air GA to the engine is larger than the maximum amount of feed of air GAX able to be fed in the current operating state of the engine.

When the amount of feed of air GA to the engine is larger than the maximum amount of feed of air GAX, the routine returns to step 210. As opposed to this, when the amount of feed of air GA to the engine becomes smaller than the maximum amount of feed of air GAX, the routine proceeds to step 214 where the target air-fuel ratio $(A/F)_0 = GA/GF$ of the exhaust gas discharged from the engine is calculated from the amount of feed of fuel GF to the engine corresponding to the demanded torque and the amount of feed of air GA to the engine when the demanded output of the heat and hydrogen generation device 50 is made to decrease. That is, when the amount of feed of air GA to the engine is larger than the maximum amount of feed of air GAX, the demanded output of the heat and hydrogen generation device 50 is made to decrease until the amount of feed of air GA to the engine becomes the maximum amount of feed of air GAX. In the state where the demanded output of the heat and hydrogen generation device 50 is made to decrease, the air-fuel ratio of the exhaust gas discharged from the engine is controlled to the target air-fuel ratio $(A/F)_0$.

On the other hand, if at step 209 the demanded output reduction command is issued, the control routine of the $O_2/C$ molar ratio shown in FIG. 16 proceeds from step 153 to step 154 where the target amount of feed of fuel QF and target amount of feed of air QA when the demanded output of the heat and hydrogen generation device 50 is reduced are read. Next, at step 155, the fuel injection amount command value QFI required for making fuel be injected from the fuel injector 58 by the target amount of feed of fuel QF read at step 154 is calculated. Next, at step 156, the final fuel injection amount command value QFIO (=KG·QFI) is calculated. Next, at step 157, fuel corresponding to this final fuel injection amount command value QFIO is fed from the fuel injector 58 to the burner combustion chamber 53. Next, at step 158, air is discharged from the air pump 64 with the target amount of feed of air QA read at step 154.

Figure 25:
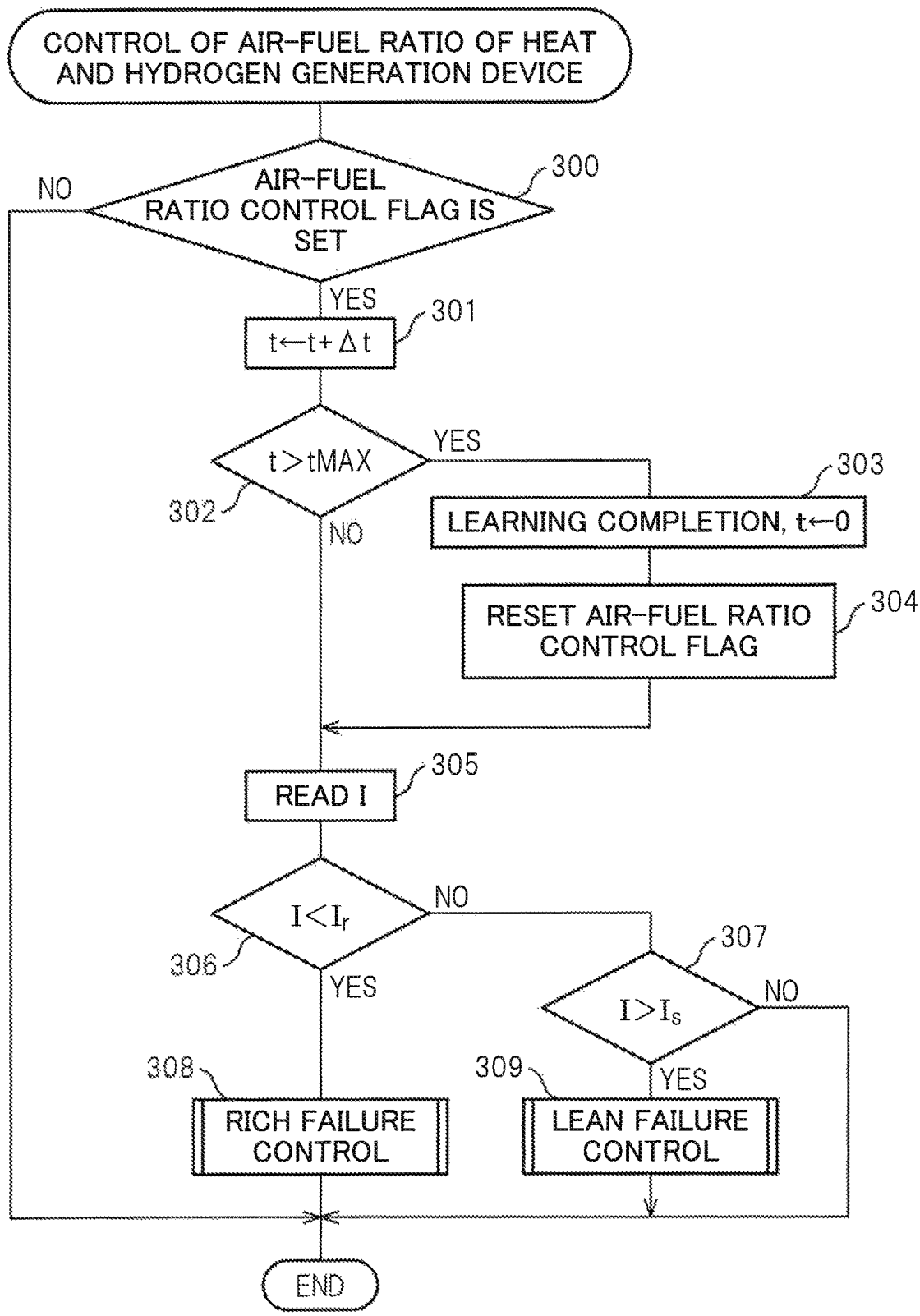
FIG. 25 is a flow chart for performing an air-fuel ratio control of a heat and hydrogen generation device.

Next, referring to FIG. 25, the air-fuel ratio control routine of the heat and hydrogen generation device will be explained. This air-fuel ratio control routine is also executed by interruption every fixed time. Referring to FIG. 25, first, at step 300, it is judged if the air-fuel ratio control flag is set. This air-fuel ratio control flag is set at step 203 of FIG. 23. When the air-fuel ratio control flag is not set, the processing cycle is completed. Therefore, when the air-fuel ratio control flag is not set, air-fuel ratio control of the heat and hydrogen generation device 50 is not performed. As opposed to this, when at step 300 it is judged that the air-fuel ratio control flag is set, the routine proceeds to step 301 where the interrupt time interval Δt is added to the elapsed time "t". Next, at step 302, it is judged if the elapsed time "t" exceeds the reference time tMAX. When the elapsed time "t" does not exceed the reference time tMAX, the routine proceeds to step 305.

Figure 26:
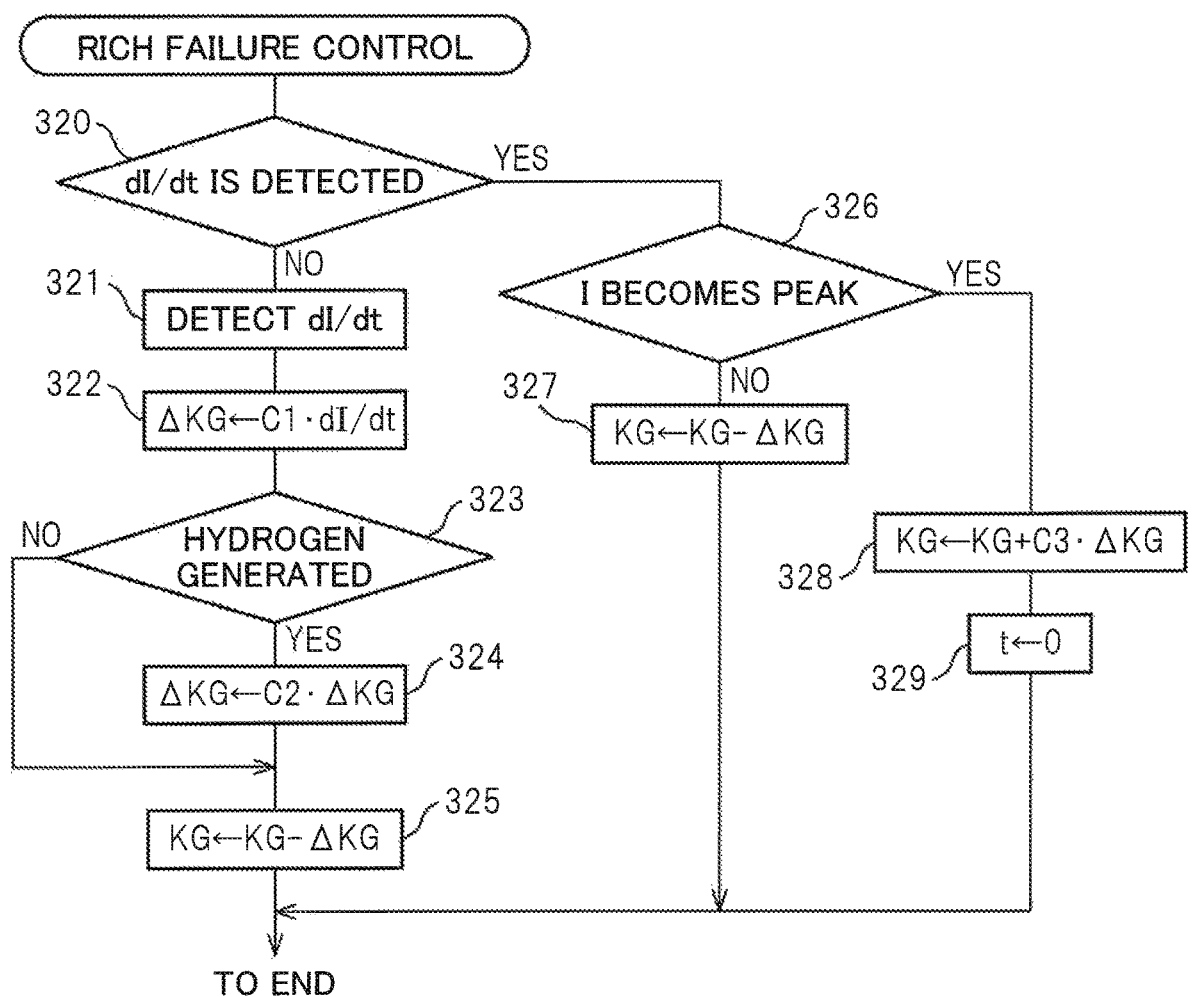
FIG. 26 is a flow chart for performing a rich failure control.
Figure 27:
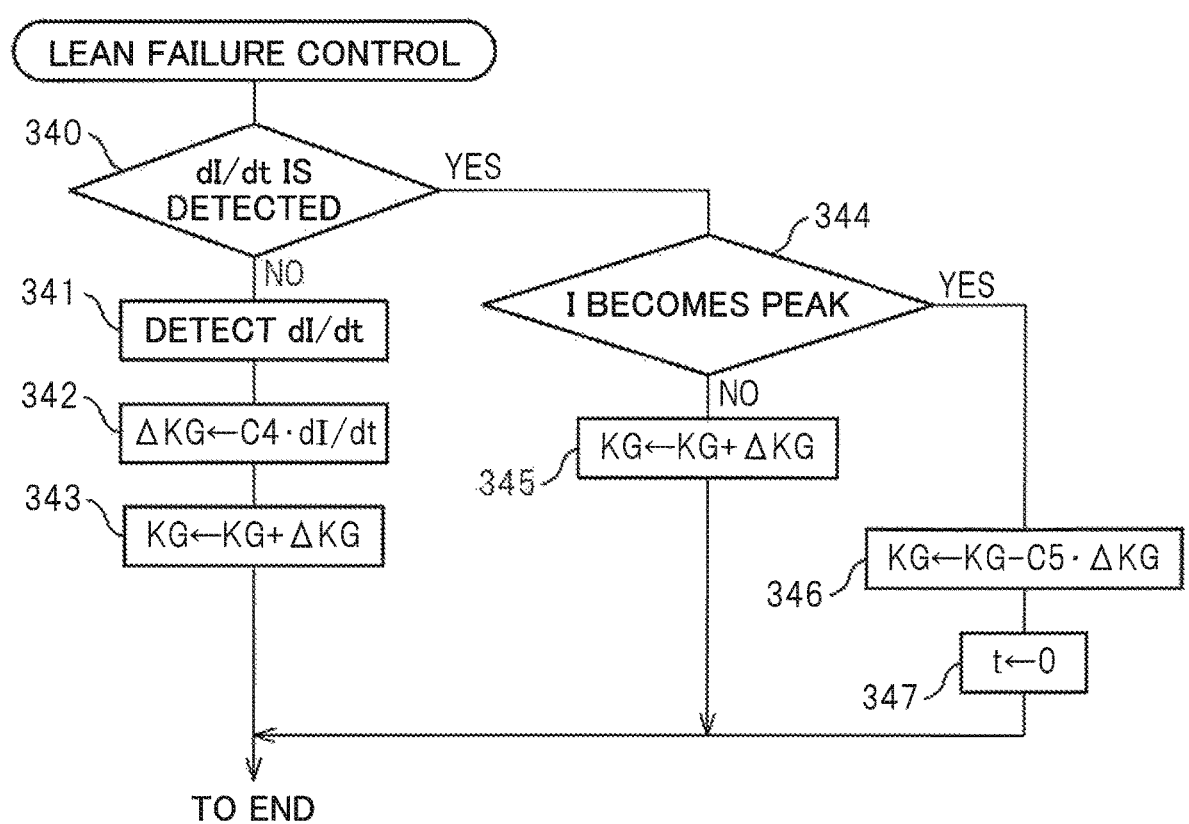
FIG. 27 is a flow chart for performing a lean failure control.

At step 305, the output current value I of the downstream side air-fuel ratio sensor 24 is read. Next, at step 306, it is judged if the output current value I of the downstream side air-fuel ratio sensor 24 becomes less than the rich failure judgment value Ir. When the output current value I of the downstream side air-fuel ratio sensor 24 becomes less than the rich failure judgment value Ir, the routine proceeds to step 308 where the rich failure control is started. This rich failure control is shown in FIG. 26. On the other hand, when at step 306 it is judged that the output current value I of the downstream side air-fuel ratio sensor 24 is the rich failure judgment value Ir or more, the routine proceeds to step 307 where it is judged if the output current value I of the downstream side air-fuel ratio sensor 24 becomes more than the lean failure judgment value Is. When the output current value I of the downstream side air-fuel ratio sensor 24 becomes more than the lean failure judgment value Is, the routine proceeds to step 309 where the lean failure control is started. This lean failure control is shown in FIG. 27.

If the rich failure control shown in FIG. 26 is started, first, at step 320, it is judged if a rate of change dI/dt of the output current value I of the downstream side air-fuel ratio sensor 24 has been detected. When the rate of change dI/dt of the output current value I of the downstream side air-fuel ratio sensor 24 has not been detected after the rich failure occurs, the routine proceeds to step 321 where the rate of change dI/dt of the output current value I of the downstream side air-fuel ratio sensor 24 is detected. Next, at step 322, the correction value ΔKG for the learning value KG is made a value (C1·dI/dt) obtained by multiplying the rate of change dI/dt of the output current value I of the downstream side air-fuel ratio sensor 24 with a constant C1. Next, at step 323, it is judged if hydrogen is being generated at the heat and hydrogen generation device 50. When hydrogen is not being generated at the heat and hydrogen generation device 50, the routine jumps to step 325 where the correction value ΔKG is subtracted from the learning value KG. At this time, the learning value KG is made to decrease by exactly the correction value ΔKG.

On the other hand, when at step 323 it is judged that hydrogen is being generated at the heat and hydrogen generation device 50, the routine proceeds to step 324 where a constant C2 (<1.0) is multiplied with the correction value ΔKG. Next, the routine proceeds to step 325. Therefore, when hydrogen is being generated in the heat and hydrogen generation device 50, compared to when hydrogen is not being generated in the heat and hydrogen generation device 50, the correction value ΔKG is made smaller. That is, when hydrogen is being generated at the heat and hydrogen generation device 50, if the rich failure occurs, part of the hydrogen flowing into the exhaust purification catalyst 14 slips through the exhaust purification catalyst 14 and reaches the downstream side air-fuel ratio sensor 24. In this regard, however, as explained above, if hydrogen is fed to the downstream side air-fuel ratio sensor 24, the output current value I of the downstream side air-fuel ratio sensor 24 becomes offset to the rich side and, in the time period to of FIG. 22, as shown by the broken line, the rate of change dI/dt of the output current value I of the downstream side air-fuel ratio sensor 24 appears larger than the case where hydrogen is not being fed to the downstream side air-fuel ratio sensor 24. Therefore, when hydrogen is being generated in the heat and hydrogen generation device 50, to correct the rate of change dI/dt of the output current value I of the downstream side air-fuel ratio sensor 24 to a small rate of change dI/dt, at step 324, the correction value ΔKG is made smaller.

On the other hand, when at step 320 it is judged that the rate of change dI/dt of the output current value I of the downstream side air-fuel ratio sensor 24 has been detected, the routine proceeds to step 326 where it is judged if the output current value I of the downstream side air-fuel ratio sensor 24 becomes the lower limit peak. When the output current value I of the downstream side air-fuel ratio sensor 24 has still not become the lower limit peak, the routine proceeds to step 327 where the correction value ΔKG is subtracted from the learning value KG. After that, the learning value KG is made to decrease a little by little by the correction value ΔKG until the output current value I of the downstream side air-fuel ratio sensor 24 reaches the lower limit peak. On the other hand, when at step 326 it is judged if the output current value I of the downstream side air-fuel ratio sensor 24 becomes the lower limit peak, the routine proceeds to step 338 where a constant C3·correction value ΔKG (C3<1.0) is added to the learning value KG. Therefore, after the output current value I of the downstream side air-fuel ratio sensor 24 reaches the lower limit peak, the correction value ΔKG is made to rise by a speed slower than the speed of fall before the output current value I of the downstream side air-fuel ratio sensor 24 becomes the lower limit peak. Next, at step 329, the elapsed time "t" is made zero.

On the other hand, if the lean failure control shown in FIG. 27 is started, first, at step 340, it is judged if the rate of change dI/dt of the output current value I of the downstream side air-fuel ratio sensor 24 has been detected. When the rate of change dI/dt of the output current value I of the downstream side air-fuel ratio sensor 24 has not been detected after the occurrence of the lean failure, the routine proceeds to step 341 where the rate of change dI/dt of the output current value I of the downstream side air-fuel ratio sensor 24 is detected. Next, at step 342, the correction value ΔKG with respect to the learning value KG is made a value (C4·dI/dt) obtained by multiplying the rate of change dI/dt of the output current value I of the downstream side air-fuel ratio sensor 24 with a constant C4. Next, at step 343, the correction value ΔKG is added to the learning value KG. At this time, the learning value KG is made to increase by exactly the correction value ΔKG.

On the other hand, when at step 340 it is judged that the rate of change dI/dt of the output current value I of the downstream side air-fuel ratio sensor 24 has been detected, the routine proceeds to step 344 where it is judged if the output current value I of the downstream side air-fuel ratio sensor 24 becomes the upper limit peak. When the output current value I of the downstream side air-fuel ratio sensor 24 has still not become the upper limit peak, the routine proceeds to step 345 where the correction value ΔKG is added to the learning value KG. After that, the learning value KG is made to increase a little by little by the correction value ΔKG until the output current value I of the downstream side air-fuel ratio sensor 24 reaches the upper limit peak. On the other hand, when at step 344 it is judged that the output current value I of the downstream side air-fuel ratio sensor 24 reaches the upper limit peak, the routine proceeds to step 346 where a constant C5·correction value ΔKG (C5<1.0) is subtracted from the learning value KG. Therefore, after the output current value I of the downstream side air-fuel ratio sensor 24 reaches the upper limit peak, the correction value ΔKG is made to fall by a slower speed compared with the speed of rise before the output current value I of the downstream side air-fuel ratio sensor 24 becomes the upper limit peak. Next, at step 347, the elapsed time "t" is made zero.

As will be understood from FIG. 26, when the rich failure control is ended, the elapsed time "t" is made zero. As will be understood from FIG. 27, when the lean failure control is ended as well, the elapsed time "t" is made zero. The action of increasing this elapsed time "t" is started at step 301 of FIG. 25 when the rich failure control is ended or the lean failure control is ended. Therefore, this elapsed time "t" shows the elapsed time after the rich failure control is ended or after the lean failure control is ended. If at step 302 of FIG. 25 it is judged that the elapsed time "t" exceeds the reference time tMAX, the routine proceeds to step 303 where it is judged that the learning using the learning value KG has been completed and the elapsed time "t" is made zero. Next, at step 304, the air-fuel ratio control flag is reset.

Note that, the rich failure control and the lean failure control shown in FIG. 21, FIG. 22, FIG. 26, and FIG. 27 just show examples, and other known various rich failure control methods and lean failure control methods other than those shown in FIG. 21, FIG. 22, FIG. 26, and FIG. 27 can be used.

The invention claimed is:

1. An exhaust purification system of an internal combustion engine comprising:
    a heat and hydrogen generation device able to generate only heat or heat and hydrogen by burning fuel and air,
    an exhaust purification catalyst arranged in an engine exhaust passage and able to simultaneously reduce HC, CO, and NOx contained in gas flowing in when an air-fuel ratio of inflowing gas is a stoichiometric air-fuel ratio, a combustion gas discharged from the heat and hydrogen generation device being fed to the exhaust purification catalyst, and
    an electric control unit, wherein
    said electric control unit is configured to make an air-fuel ratio of the air and fuel made to burn in the heat and hydrogen generation device a predetermined target set air-fuel ratio, and
    said electric control unit is configured to control the air-fuel ratio of the exhaust gas discharged from the engine to a target adjusted air-fuel ratio required for making the air-fuel ratio of the gas flowing into the exhaust purification catalyst the stoichiometric air-fuel ratio in accordance with the target set air-fuel ratio when the air-fuel ratio of the air and fuel made to burn in the heat and hydrogen generation device is made the predetermined target set air-fuel ratio,
    wherein an upstream side air-fuel ratio sensor is arranged in the engine exhaust passage upstream from a feed port of combustion gas discharged from the heat and hydrogen generation device to the inside of the engine exhaust passage, a downstream side air-fuel ratio sensor is arranged in the engine exhaust passage downstream from the exhaust purification catalyst, the air-fuel ratio of the exhaust gas discharged from the engine is controlled to said target adjusted air-fuel ratio based on said upstream side air-fuel ratio sensor, and the air-fuel ratio of the air and fuel made to burn in the heat and hydrogen generation device is controlled to said target set air-fuel ratio based on said downstream side air-fuel ratio sensor.

2. The exhaust purification system of an internal combustion engine as claimed in claim 1, wherein said target adjusted air-fuel ratio is an air-fuel ratio required for making, the ratio of the sum of the amount of air made to burn in the heat and hydrogen generation device and the amount of air made to burn in the engine and the sum of the amount of fuel made to burn in the heat and hydrogen generation device and the amount of fuel made to burn in the engine, the stoichiometric air-fuel ratio.

3. The exhaust purification system of an internal combustion engine as claimed in claim 1, wherein said electric control unit is configured to detect by the downstream side air-fuel ratio sensor if the air-fuel ratio of the gas flowing out from said exhaust purification catalyst deviates from the stoichiometric air-fuel ratio when in a state where the air-fuel ratio of the exhaust gas discharged from the engine is controlled to said target adjusted air-fuel ratio based on the upstream side air-fuel ratio sensor, and said electric control unit is configured to control the air-fuel ratio of the air and fuel made to burn in the heat and hydrogen generation device so that the air-fuel ratio of the gas flowing out from the exhaust purification catalyst becomes the stoichiometric air-fuel ratio when it is detected by the downstream side air-fuel ratio sensor that the air-fuel ratio of the gas flowing out from said exhaust purification catalyst deviates from the stoichiometric air-fuel ratio.

\* \* \* \* \*